(12) United States Patent
Babaei

(10) Patent No.: US 11,470,488 B1
(45) Date of Patent: Oct. 11, 2022

(54) BEAM FAILURE DETECTION AND RECOVERY

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 17/717,412

(22) Filed: Apr. 11, 2022

Related U.S. Application Data

(60) Provisional application No. 63/174,140, filed on Apr. 13, 2021.

(51) Int. Cl.
| | | |
|---|---|---|
| *H04L 12/28* | (2006.01) | |
| *H04W 24/04* | (2009.01) | |
| *H04W 24/08* | (2009.01) | |
| *H04W 76/27* | (2018.01) | |
| *H04J 1/16* | (2006.01) | |

(52) U.S. Cl.
CPC ........... *H04W 24/04* (2013.01); *H04W 24/08* (2013.01); *H04W 76/27* (2018.02)

(58) Field of Classification Search
CPC .. H04B 7/088; H04L 41/0668; H04W 36/305; H04W 72/046; H04W 76/27
USPC .................................. 370/216, 252, 329, 386
See application file for complete search history.

(56) References Cited

U.S. PATENT DOCUMENTS

| | | | | |
|---|---|---|---|---|
| 2021/0100059 | A1* | 4/2021 | Xu | ........................ H04L 5/0048 |
| 2021/0298081 | A1* | 9/2021 | Babaei | .............. H04W 74/0816 |
| 2022/0046750 | A1* | 2/2022 | Jeon | ....................... H04W 36/06 |
| 2022/0110184 | A1* | 4/2022 | Jeon | .................. H04W 74/0841 |

OTHER PUBLICATIONS

3GPP TS 38.211 V16.5.0 (Mar. 2021); Technical Specification; 3rd Generation Partnership Project; Technical Specification Group Radio Access Network; NR; Physical channels and modulation; (Release 16).
3GPP TS 38.212 V16.5.0 (Mar. 2021); Technical Specification; 3rd Generation Partnership Project; Technical Specification Group Radio Access Network; NR; Multiplexing and channel coding; (Release 16).
3GPP TS 38.213 V16.5.0 (Mar. 2021); Technical Specification; 3rd Generation Partnership Project; Technical Specification Group Radio Access Network; NR; Physical layer procedures for control; (Release 16).

(Continued)

*Primary Examiner* — John Pezzlo
(74) *Attorney, Agent, or Firm* — Alireza Babaei

(57) ABSTRACT

A wireless device may receive message(s) comprising first configuration parameter(s), that are applicable for beam failure detection and/or recovery while the wireless device is in an RRC connected state, and second configuration parameter(s) that are applicable for beam failure detection and/or recovery while the wireless device is in an RRC inactive state. While in the RRC connected state, the wireless device may detect a beam failure or trigger a beam failure recovery based on the first configuration parameter(s). While in the RRC inactive state, the wireless device may detect a beam failure or trigger a beam failure recovery based on the second configuration parameter(s).

20 Claims, 39 Drawing Sheets

(56) References Cited

OTHER PUBLICATIONS

3GPP TS 38.214 V16.5.0 (Mar. 2021); Technical Specification; 3rd Generation Partnership Project; Technical Specification Group Radio Access Network; NR; Physical layer procedures for data; (Release 16).
3GPP TS 38.300 V16.5.0 (Mar. 2021); Technical Specification; 3rd Generation Partnership Project; Technical Specification Group Radio Access Network; NR; NR and NG-RAN Overall Description; Stage 2; (Release 16).
3GPP TS 38.321 V16.4.0 (Mar. 2021); Technical Specification; 3rd Generation Partnership Project; Technical Specification Group Radio Access Network; NR; Medium Access Control (MAC) protocol specification; (Release 16).
3GPP TS 38.331 V16.4.0 (Mar.2021); Technical Specification; 3rd Generation Partnership Project; Technical Specification Group Radio Access Network; NR; Radio Resource Control (RRC); Protocol specification; (Release 16).
3GPP RAN WG2 Meeting #112e; R2-2010108; eMeeting Nov. 2-13, 2020; Agenda Item: 8.6.5; Source: InterDigital; Title: Beam selection and maintenance for CG-based SDT; Document for: Discussion, Decision.
3GPP TSG-RAN WG2 Meeting #112 electronic; R2-2010432; Online, Nov. 2-13, 2020; Agenda Item: 3.6.5; Source: ASUSTeK; Title: Association between Pre-configured PUSCH resources and beam; Document for Discussion and Decision.
3GPP TSG-RAN WG2 Meeting #113-electronic; R2-2100139; Online, Jan. 25-Feb. 5, 2021; Source: vivo; Title: Discussion on User Plane Aspect of Small Data Transmission; Agenda Item: 8.6.2; Document for: Discussion and Decision.
3GPP TSG-RAN2 Meeting #113 Electronic; R2-2100146; Jan. 25-Feb. 5, 2021; Agenda item: 8.6.2; Source: Samsung; Title: User Plane Common Aspects of RACH and CG based SDT; Document for: Discussion & Decision.
3GPP TSG-RAN WG2 Meeting #113 electronic; R2-2100294; Online, Jan. 25-Feb. 5, 2021; Source: CATT; Title: User plane common aspects of SDT; Agenda Item: 8.6.2; Document for: Discussion and Decision.
3GPP TSG-RAN WG2 Meeting #113-e; R2-2100365; Online, Jan. 25-Feb. 5, 2021; Agenda item: 8.6.2; Source: Intel Corporation; Title: Common User plane aspects for SDT; Document for: Discussion and Decision.
3GPP TSG-RAN WG2 Meeting #113-e; R2-2100419; Resubmission of R2-2009132; Online, Jan. 25-Feb. 5, 2021; Agenda Item: 8.6.2 (User plane common aspects); Source: Fujitsu; Title: Identified issue in [Post111-e] [926]: CA and PDCP CA duplication; Document for: Decision.
3GPP TSG-RAN WG2 #113 electronic; R2-2100749; E-Meeting, Jan. 25-Feb. 5, 2021; Source: NEC; Agenda item: 8.6.2 User plane common aspects; Title: Handling of new arriving data during SDT; Document for: Discussion.
3GPP TSG-RAN2 Meeting #113-e; R2-2100775; Online, Jan. 25-Feb. 5, 2021; Agenda Item : 8.6.5; Title : Discussion on beam operations for small data enhancements; Source : Google Inc.; Work Item : NR_SmallData_INACTIVE-Core Document for: Discussion and Decision.
3GPP TSG-RAN WG2 Meeting #113 electronic; R2-2101136; E-meeting, Jan. 25-Feb. 5, 2021; Agenda item: 8.6.2; Source: Lenovo, Motorola Mobility; Title: The UP common issues for small data transmissions; Document for: Discussion and Decision.
3GPP TSG-RAN WG2 #113-e; R2-2101145; E-Meeting, Jan. 25-Feb. 5, 2021; Agenda Item: 8.6.2; Source: MediaTek Inc.; Title: Handling of non-SDT DRB; Document for: Discussion and decision.
3GPP TSG-RAN WG2 #113-e; R2-2101146; E-Meeting, Jan. 25-Feb. 5, 2021; Agenda Item: 8.6.3; Source: MediaTek Inc.; Title: Subsequent Transmission of Small data in INACTIVE; Document for: Discussion and decision.
3GPP TSG-RAN WG2 #113e; R2-2101160; eMeeting, Jan. 25-Feb. 5, 2021; Agenda item: 8.6.2; Source: ZTE, Sanechips; Title: The issues on user plane common aspects for SDT; Document for: Discussion and Decision.
3GPP TSG-RAN WG2 #113e; R2-2101176; Electronic meeting, Jan. 25-Feb. 5, 2021; Agenda Item: 8.6.2; Source: Ericsson; Title: Common aspects for SDT; Document for: Discussion, Decision.
3GPP TSG-RAN WG2 #113-e; R2-2101183; E-meeting, Jan. 25-Feb. 5, 2021; Agenda item: 8.6.2; Source: Huawei, HiSilicon; Title: User plane common aspects for SDT; Document for: Discussion.
3GPP TSG-RAN WG2 Meeting #113 Electronic; R2-2101203; Elbonia, Jan. 25-Feb. 5, 2021; Agenda item: 8.6.2; Source: Nokia, Nokia Shanghai Bell; Title: User Plane common aspects; WID/SID: NR_SmallData_INACTIVE-Release 17; Document for: Discussion and Decision.
3GPP TSG-RAN WG2 Meeting #113e; R2-2101221; Online, Jan. 25- Feb. 5, 2020; Agenda item: 8.6.2; Source: Qualcomm Incorporated; Title: Remaining issues on user plane aspects of NR small data transmission; WID/SID: NR_SmallData_INACTIVE-Core-Release 17; Document for: Discussion and Decision.
3GPP TSG-RAN WG2 Meeting #113-e; R2-2101370; E-meeting, Jan. 25-Feb. 5, 2021; Agenda Item: 8.6.2; Source: Apple; Title: Non-SDB handling during the SDT procedure; Document for: Discussion and Decision.
3GPP TSG-RAN WG2 Meeting #113 electronic; R2-2101674; E-Meeting, Jan. 25-Feb. 5, 2021; Source: Beijing Xiaomi Mobile Software; Title: Collision between SDT and RACH; Agenda Item: 8.6.2; Document for: Discussion and Decision.
3GPP TSG-RAN WG2 Meeting #113 electronic; R2-2101750; Online, Jan. 25-Feb. 5, 2021; Agenda Item: 8.6.2; Source: ASUSTeK; Title: Handling non-SDT data arrival during subsequent SDT; Document for: Discussion and Decision.
3GPP TSG-RAN WG2 Meeting #113 electronic; R2-2101752; Online, Jan. 25-Feb. 5, 2021; Agenda Item: 8.6.5; Source: ASUSTeK; Title: Beam selection for CG-SDT; Document for: Discussion and Decision.
3GPP TSG-RAN WG2 Meeting #113 electronic; R2-2101837; Online, Jan. 25-Feb. 5, 2021; Agenda item: 8.6.5; Source: Asia Pacific Telecom, FGI; Title: Beam operation for CG-SDT; Document for: Discussion and decision.
3GPP TSG-RAN WG2 Meeting #113 bis electronic; R2-2103265; Online, Apr. 12-Apr. 20, 2021; Agenda item: 8.6.5; Source: Asia Pacific Telecom, FGI; Title: CG-SDT based on beam operation; Document for: Discussion and decision.
3GPP TSG-RAN WG2 Meeting #113bis electronic; R2-2103455; Online, Apr. 12-20, 2021; Agenda Item: 8.6.3; Source: ASUSTeK; Title: Beam management in SDT; Document for: Discussion and Decision.
3GPP TSG-RAN WG2 Meeting #113bis electronic; R2-2103457; Online, Apr. 12-20, 2021; Resubmission of R2-2101752; Agenda Item: 8.6.5; Source: ASUSTeK; Title: Beam selection for CG-SDT; Document for: Discussion and Decision.
3GPP TSG-RAN WG2 Meeting #113bis-e; R2-2103674; Online, Apr. 12-20, 2021; Agenda Item: 8.6.2; Title: Discussion on beam operations for small data transmission; Source: Google Inc.; Work Item: NR_SmallData_INACTIVE-Core; Document for: Discussion and Decision.

* cited by examiner

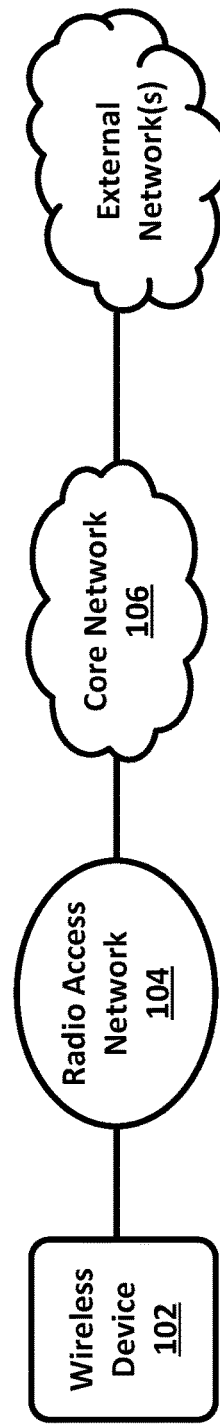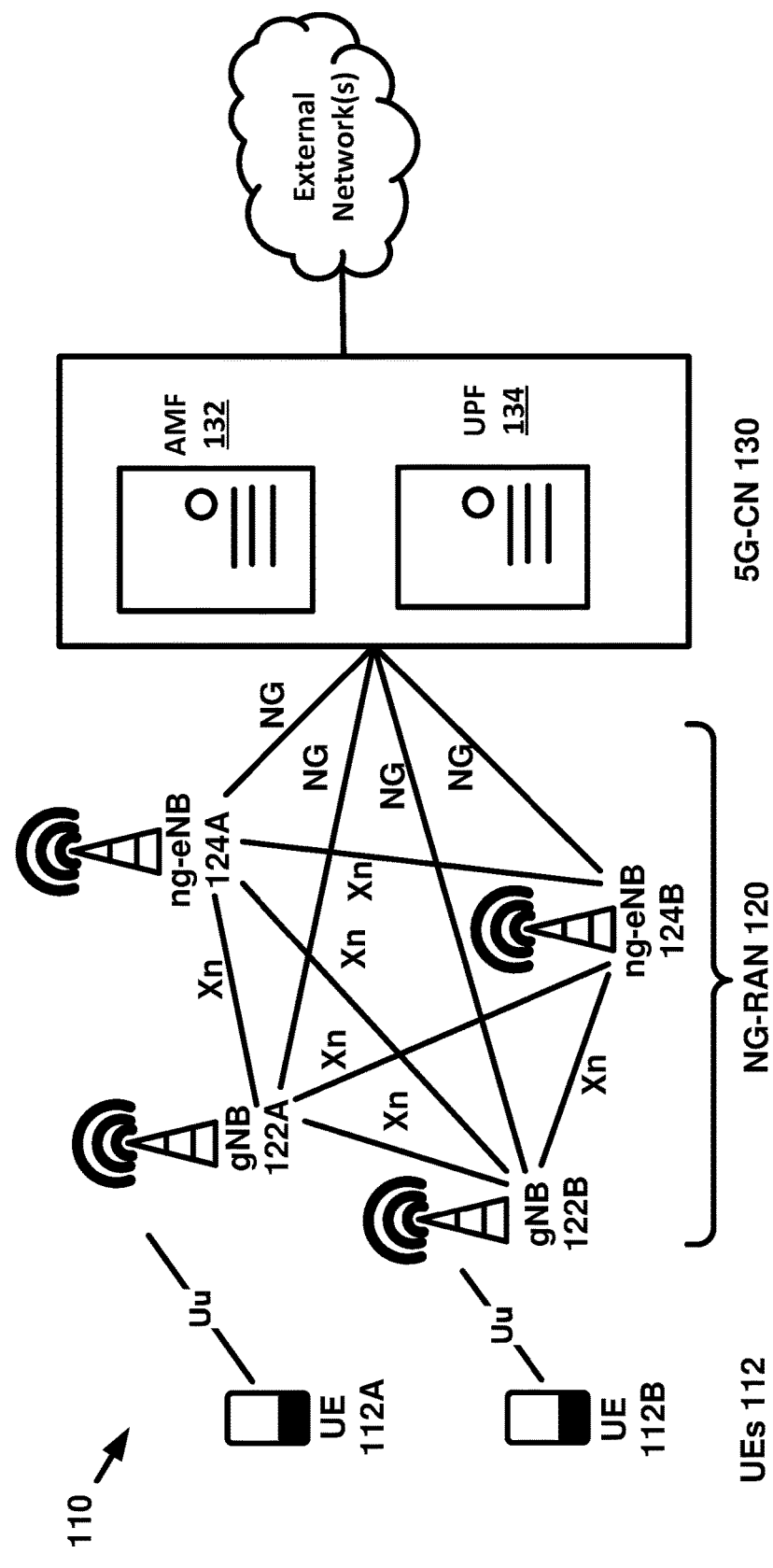

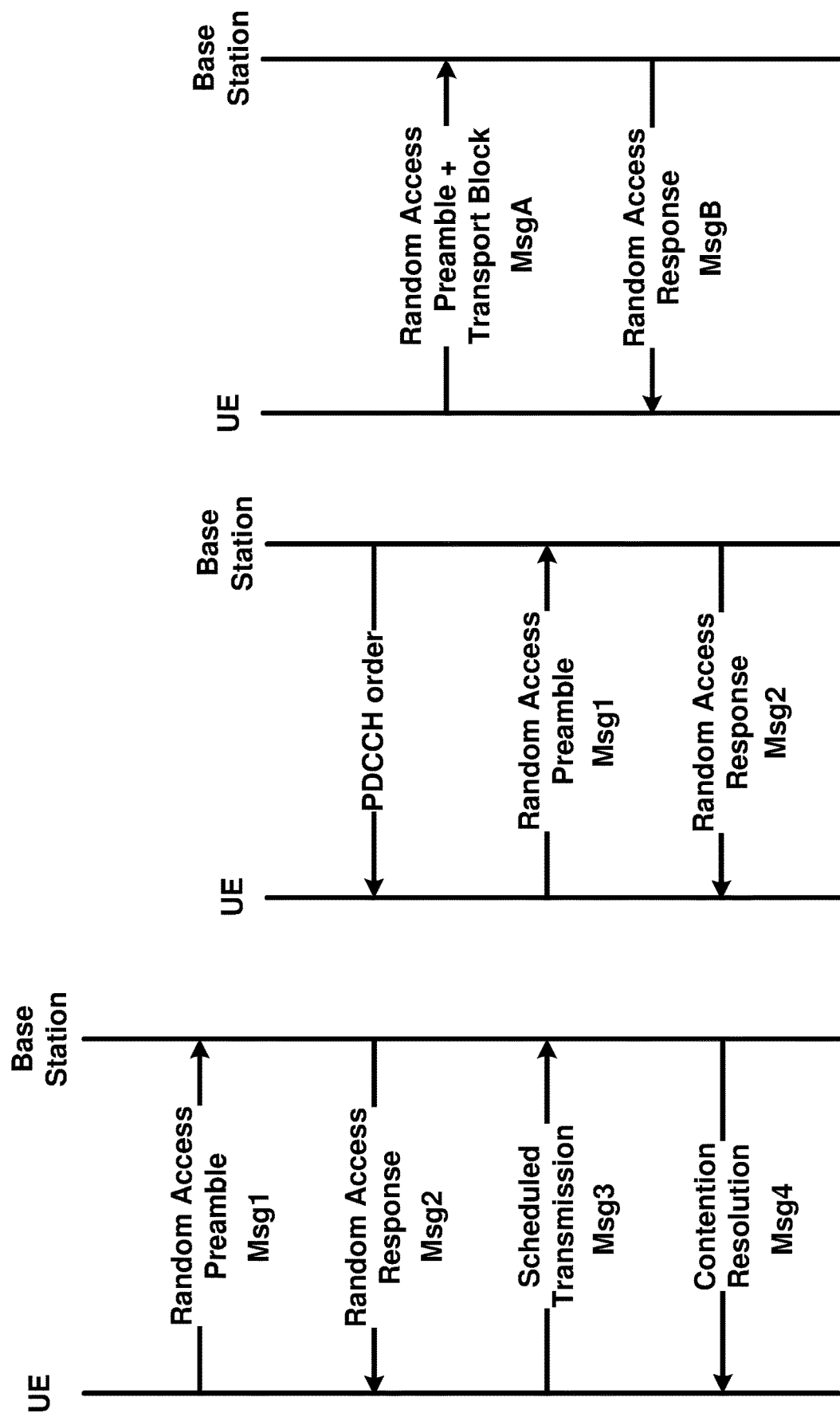

BEAM FAILURE DETECTION AND RECOVERY

CROSS-REFERENCE TO RELATED APPLICATIONS

This application claims the benefit of U.S. Provisional Application No. 63/174,140, filed Apr. 13, 2021, which is hereby incorporated by reference in its entirety.

BRIEF DESCRIPTION OF THE DRAWINGS

FIG. 1A and FIG. 1B show examples of mobile communications systems in accordance with several of various embodiments of the present disclosure.

FIG. 12A, FIG. 12B and FIG. 12C show example random access processes in accordance with several of various embodiments of the present disclosure.

DETAILED DESCRIPTION

Figure 2A:
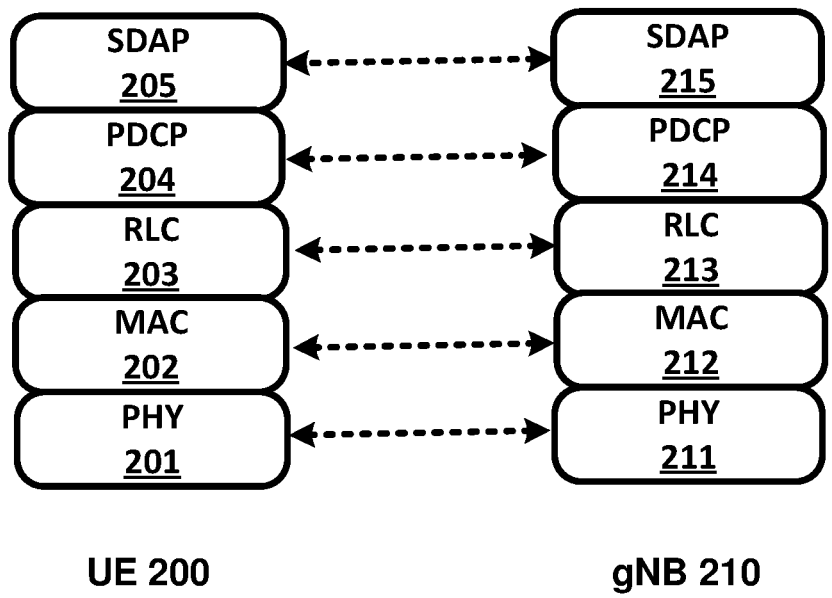
FIG. 2A and FIG. 2B show examples of user plane and control plane protocol layers in accordance with several of various embodiments of the present disclosure.

The exemplary embodiments of the disclosed technology enable processes for a wireless device and/or one or more base stations for beam management. The exemplary disclosed embodiments may be implemented in the technical field of wireless communication systems. More particularly, the embodiments of the disclosed technology may enhance beam failure detection and/or recovery.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNBs 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
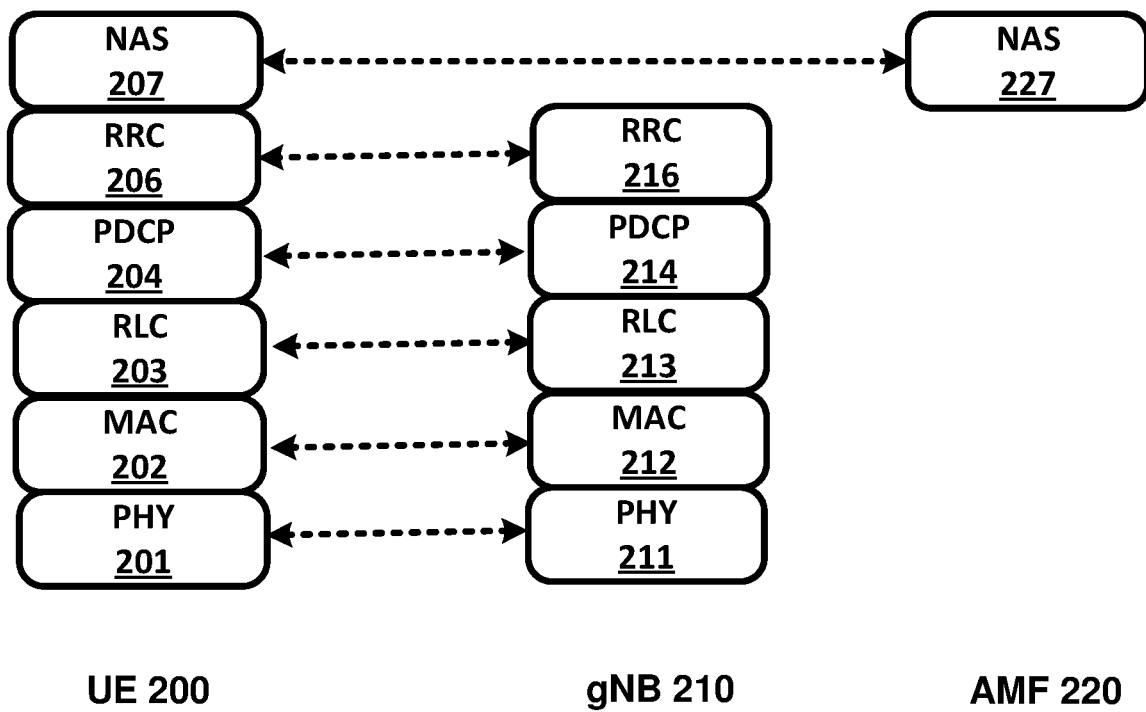

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
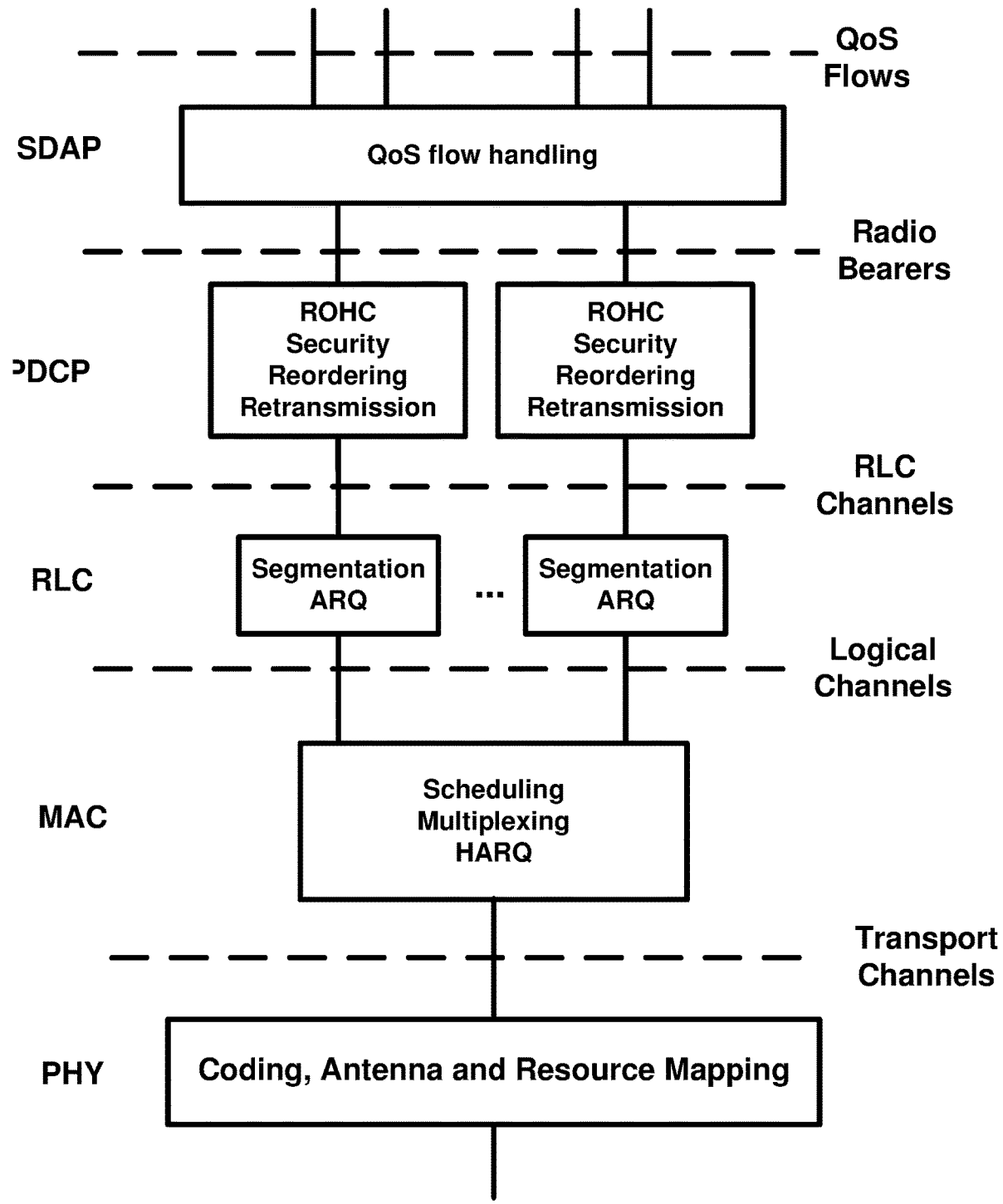
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
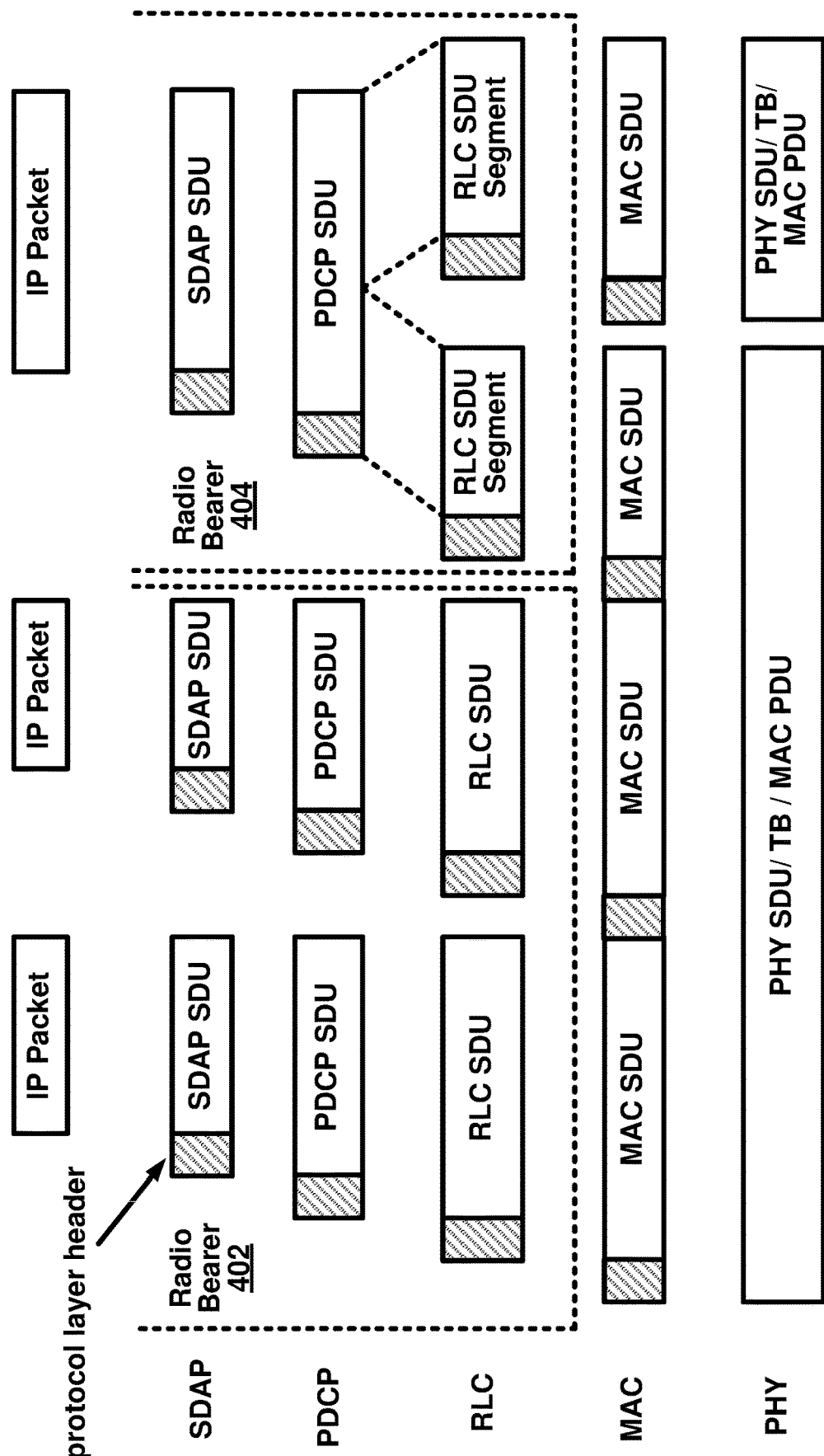
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
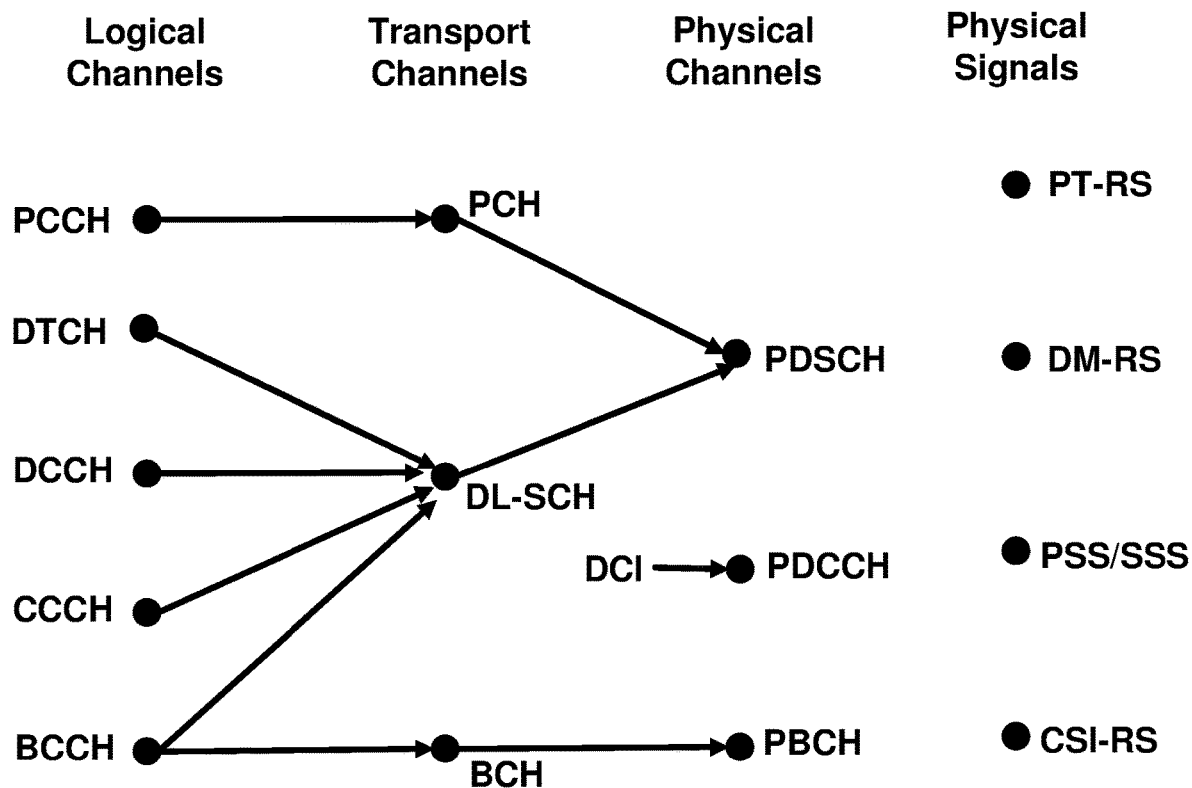
FIG. 5A shows example mapping of channels between layers of the protocol stack and different physical signals in downlink in accordance with several of various embodiments of the present disclosure.
Figure 5B:
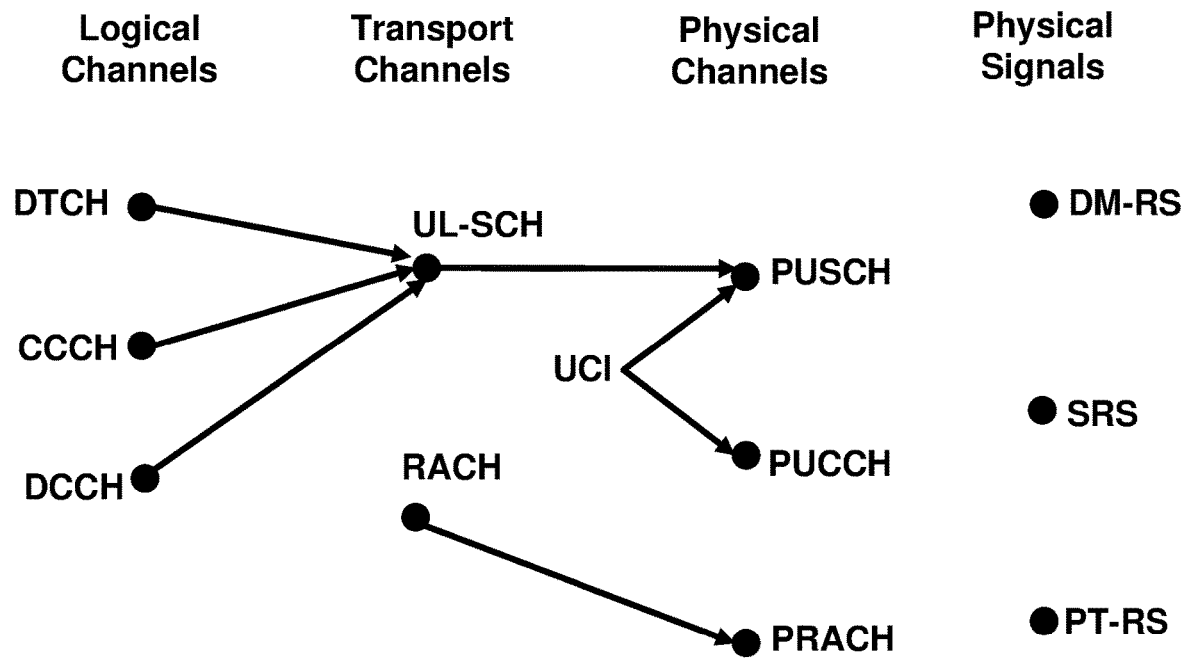
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
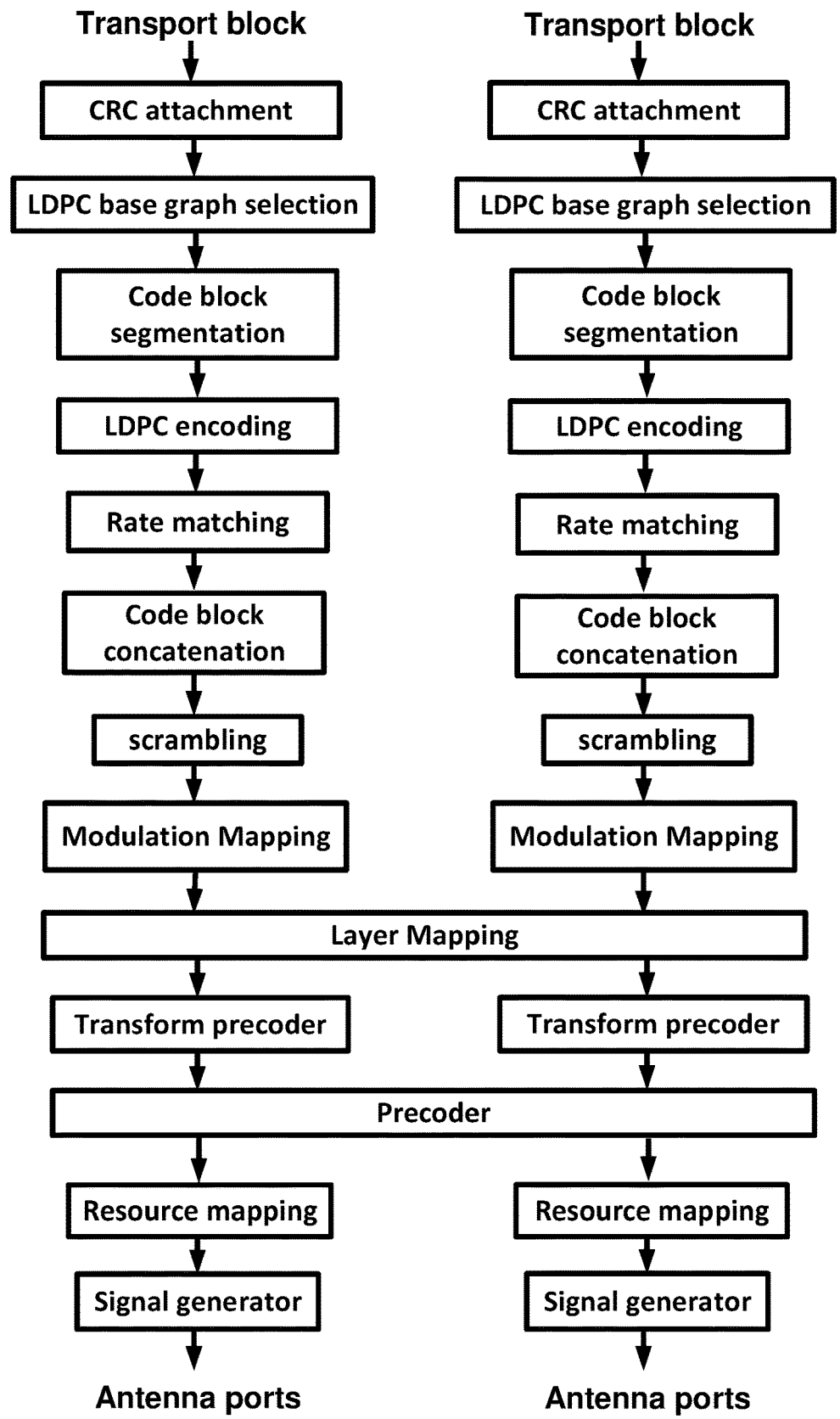
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
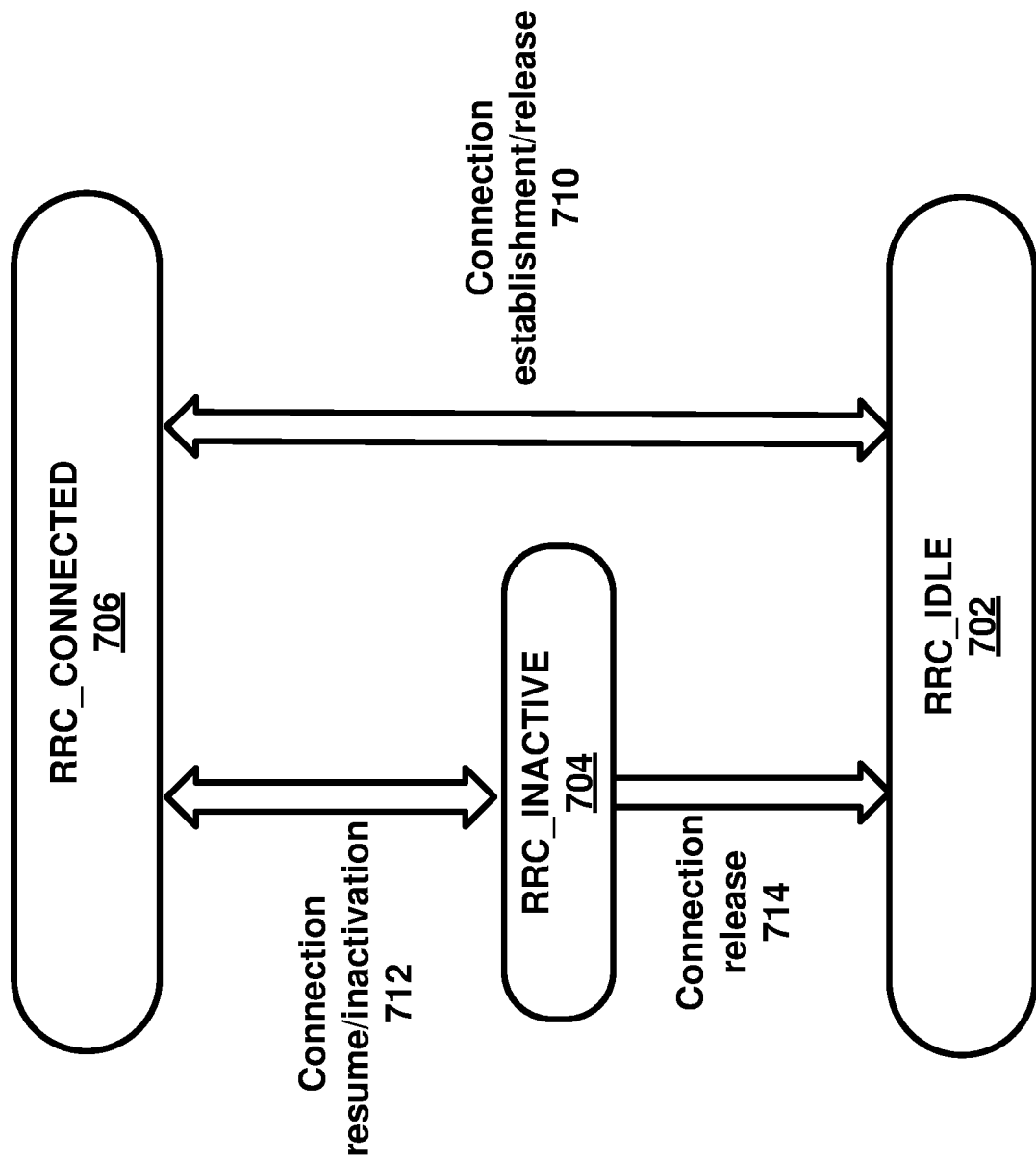
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 µs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 0.15$ KHz ($\mu = 0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g., the µ value).

Figure 8:
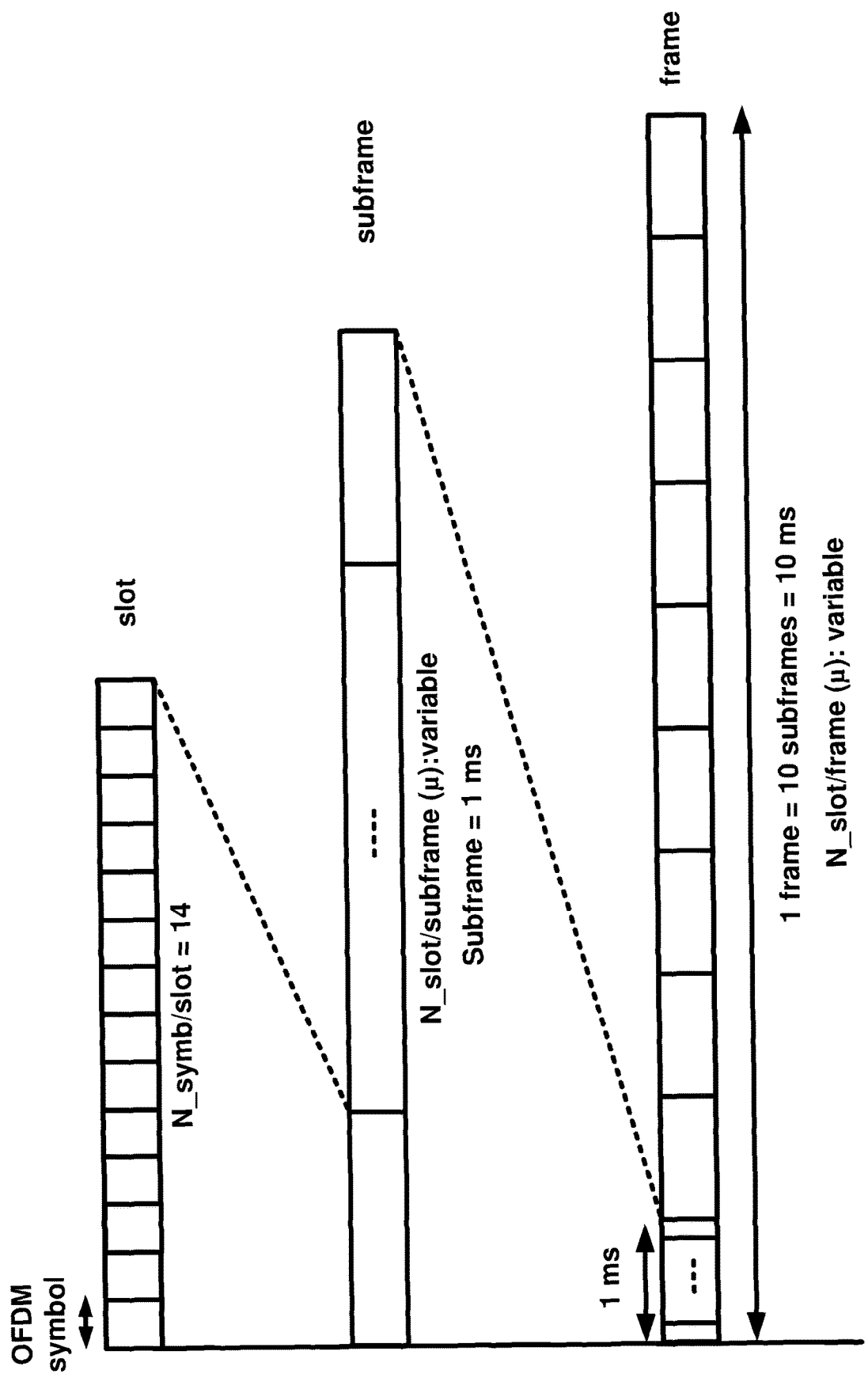
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of µ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
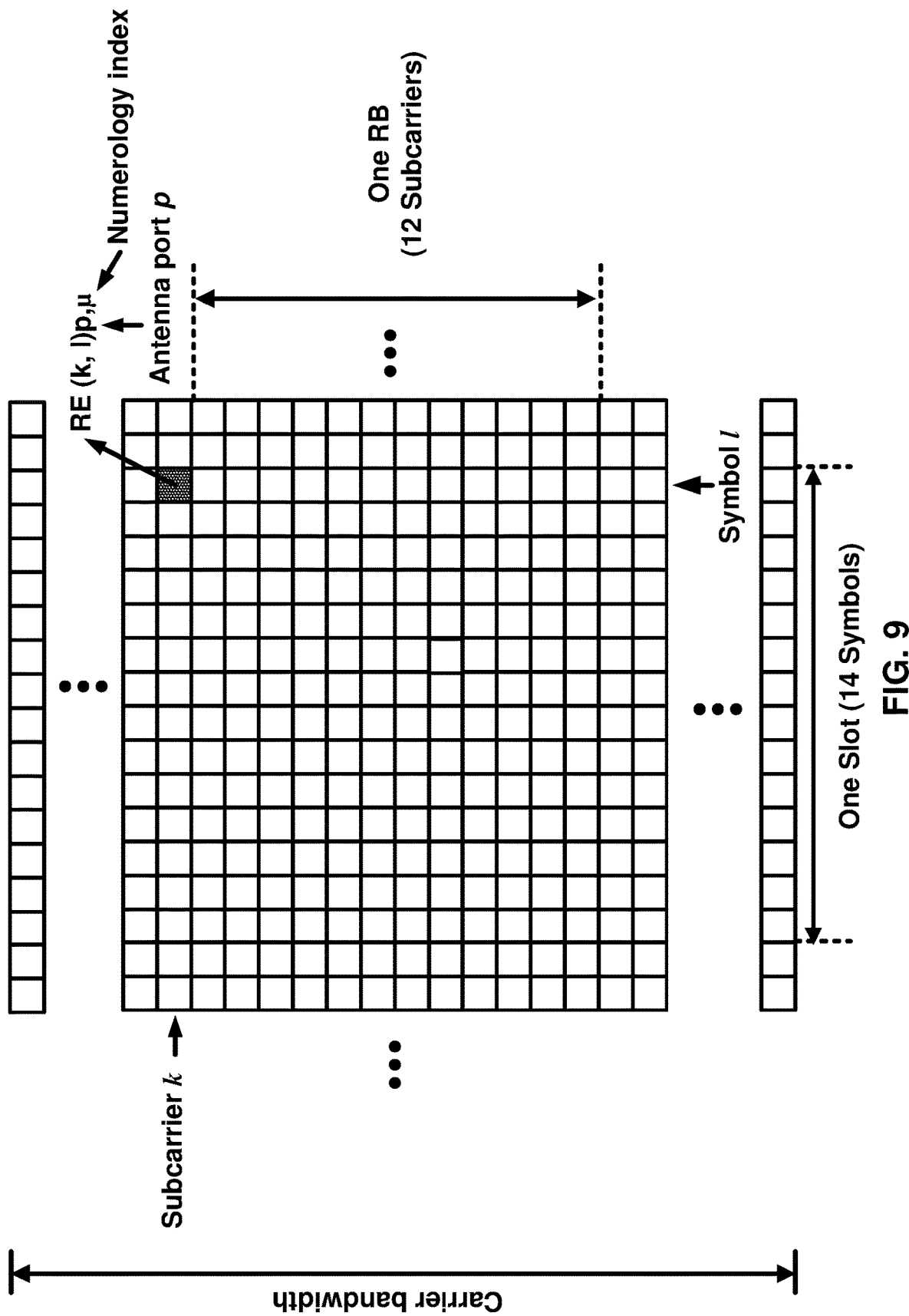
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration µ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., µ=0), a resource block may be 180 KHz and for a subcarrier spacing of 30 KHz (e.g., µ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
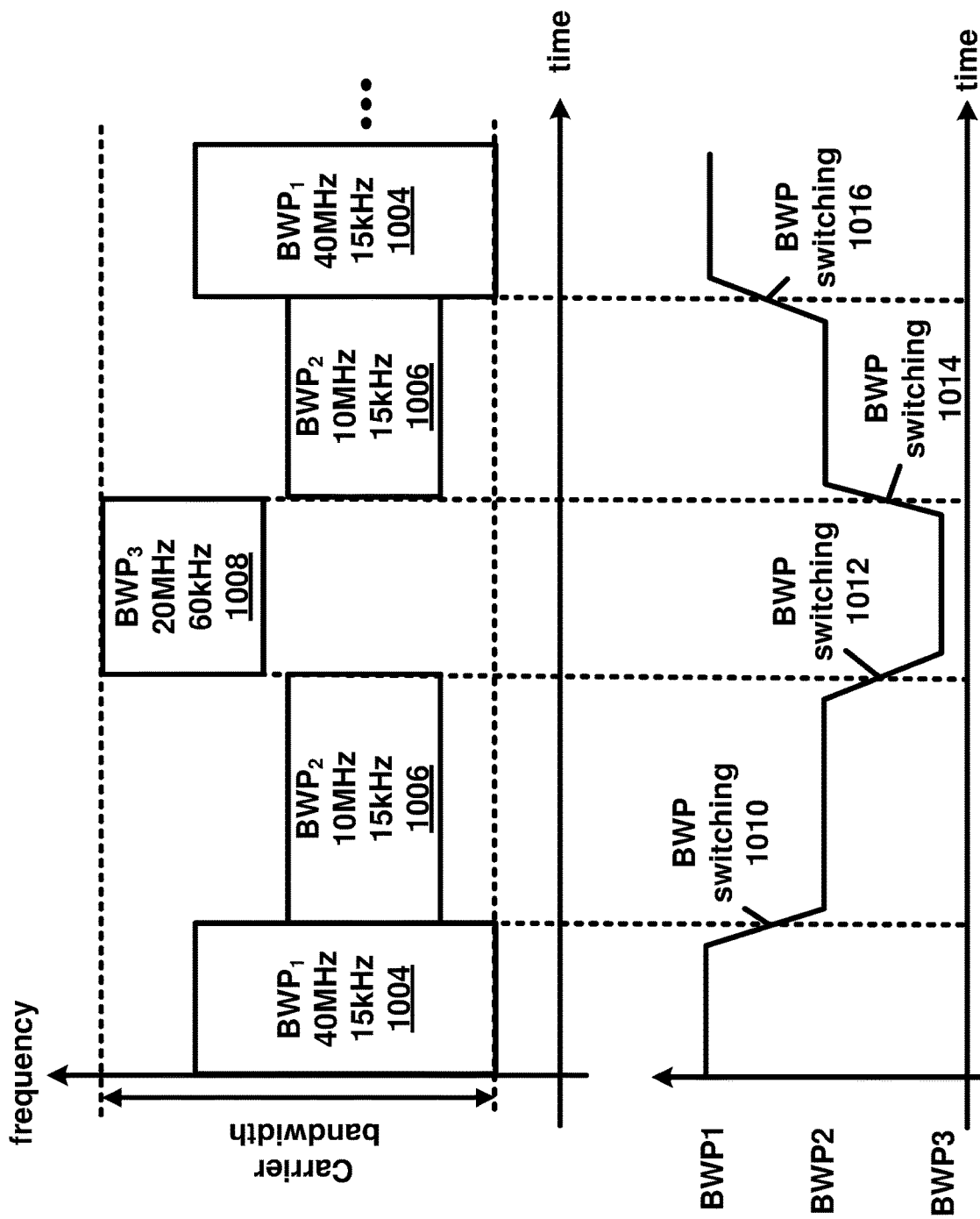
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
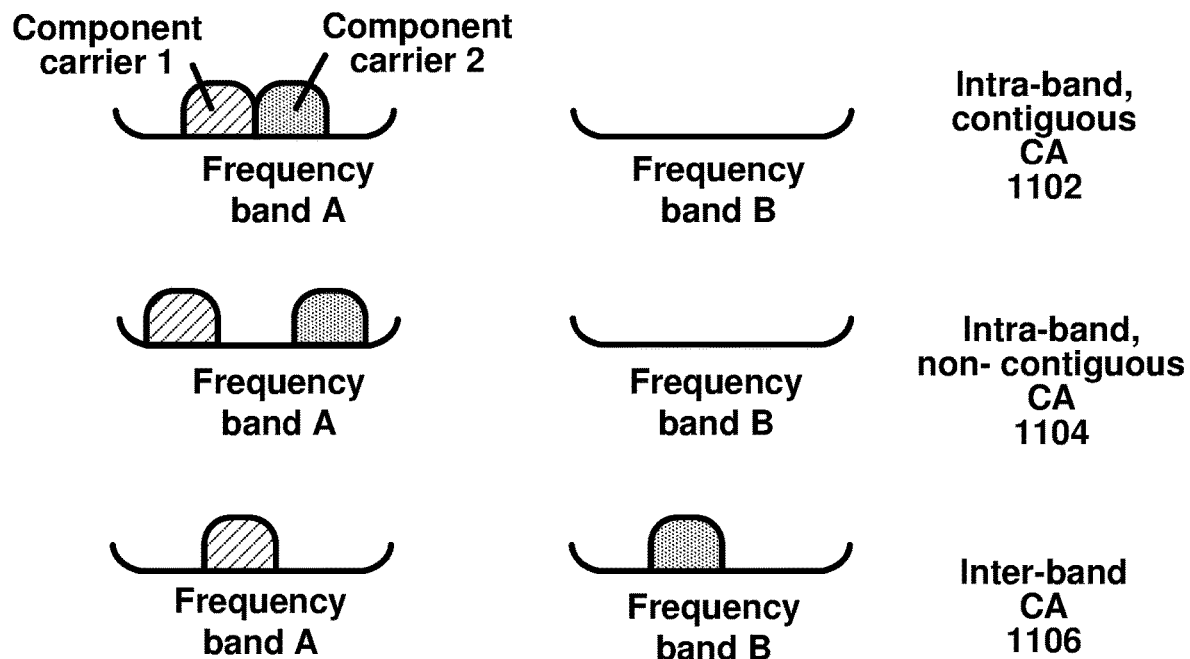
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
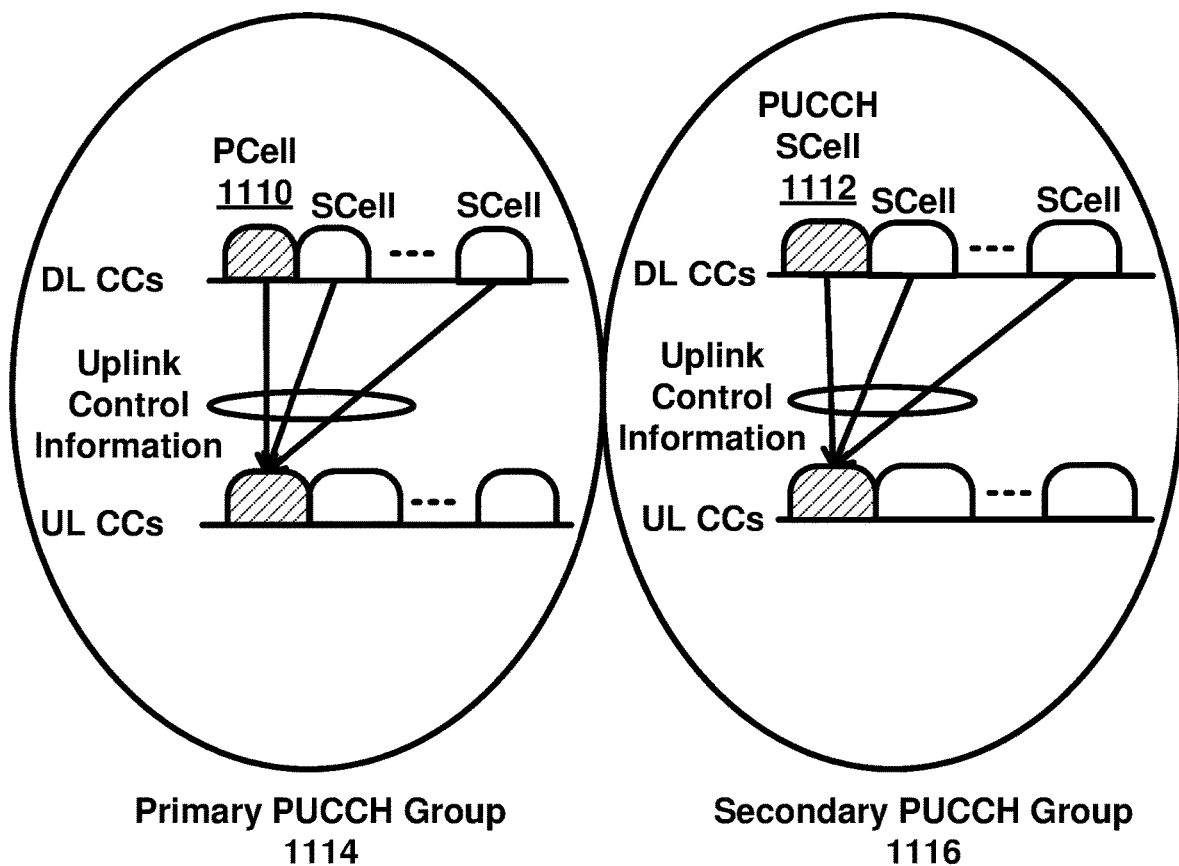
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
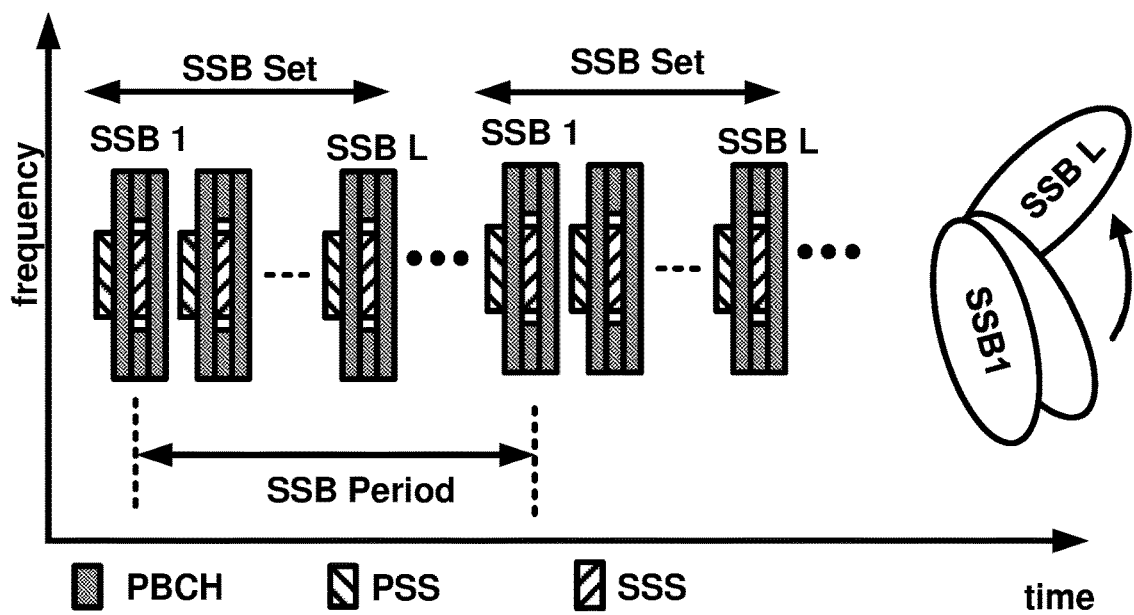
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
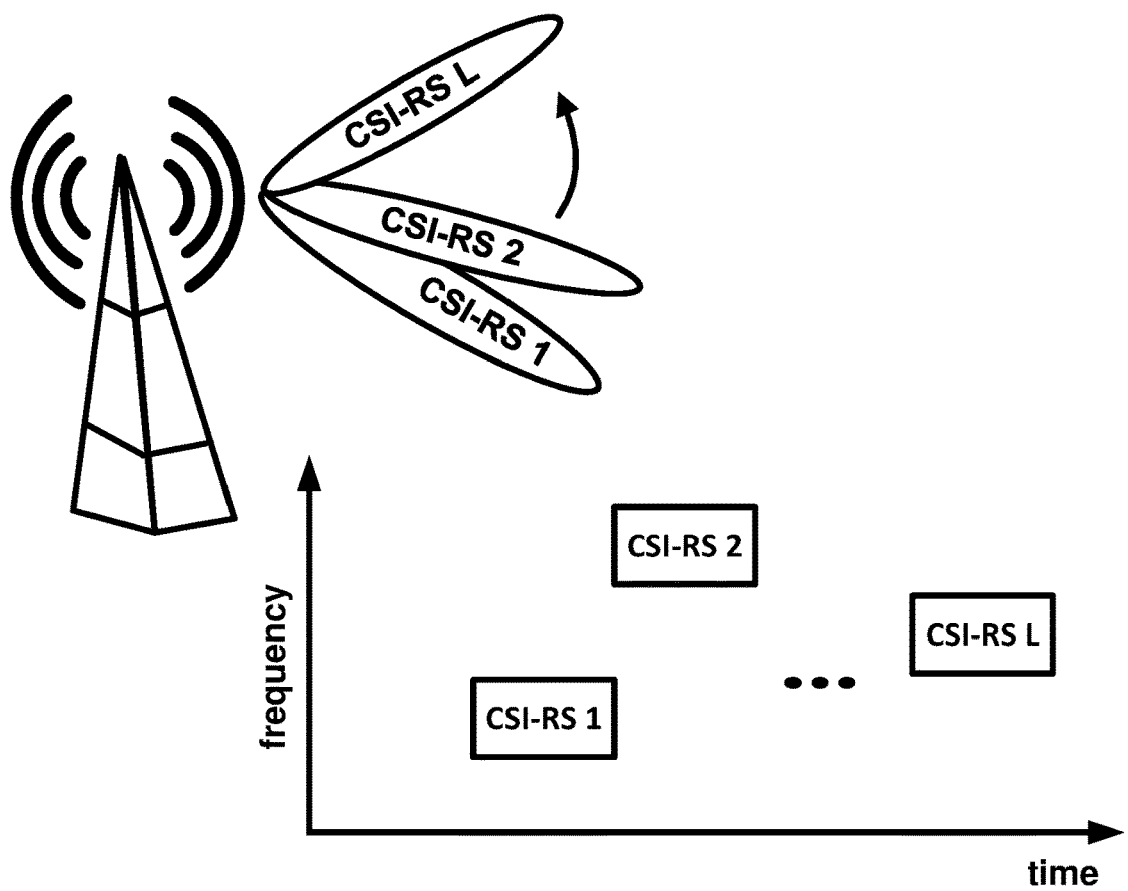
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
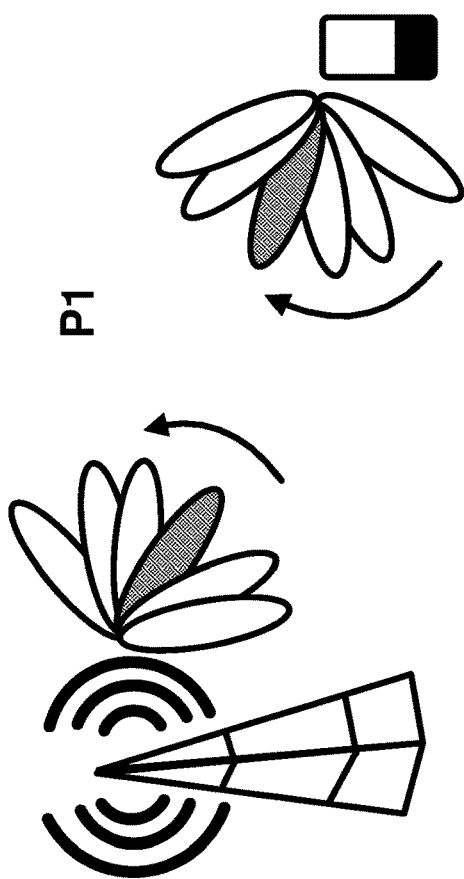
FIG. 14A, FIG. 14B and FIG. 14C show example beam management processes in accordance with several of various embodiments of the present disclosure.
Figure 14C:
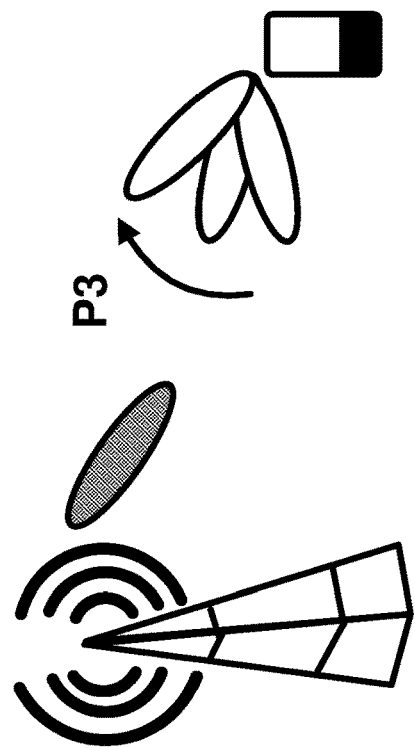
Figure 14B:
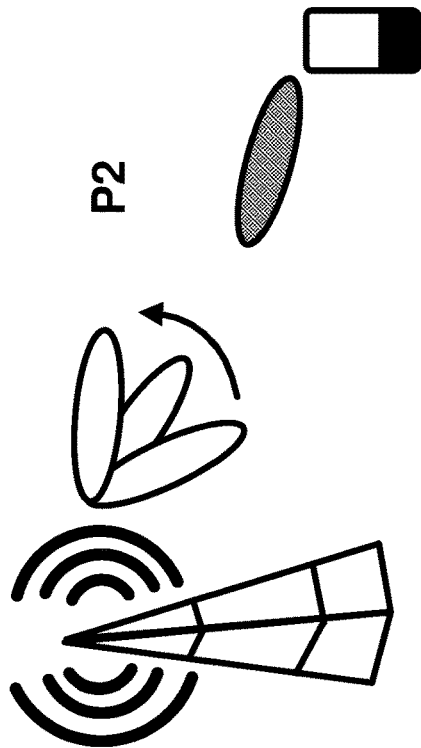

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configuring different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
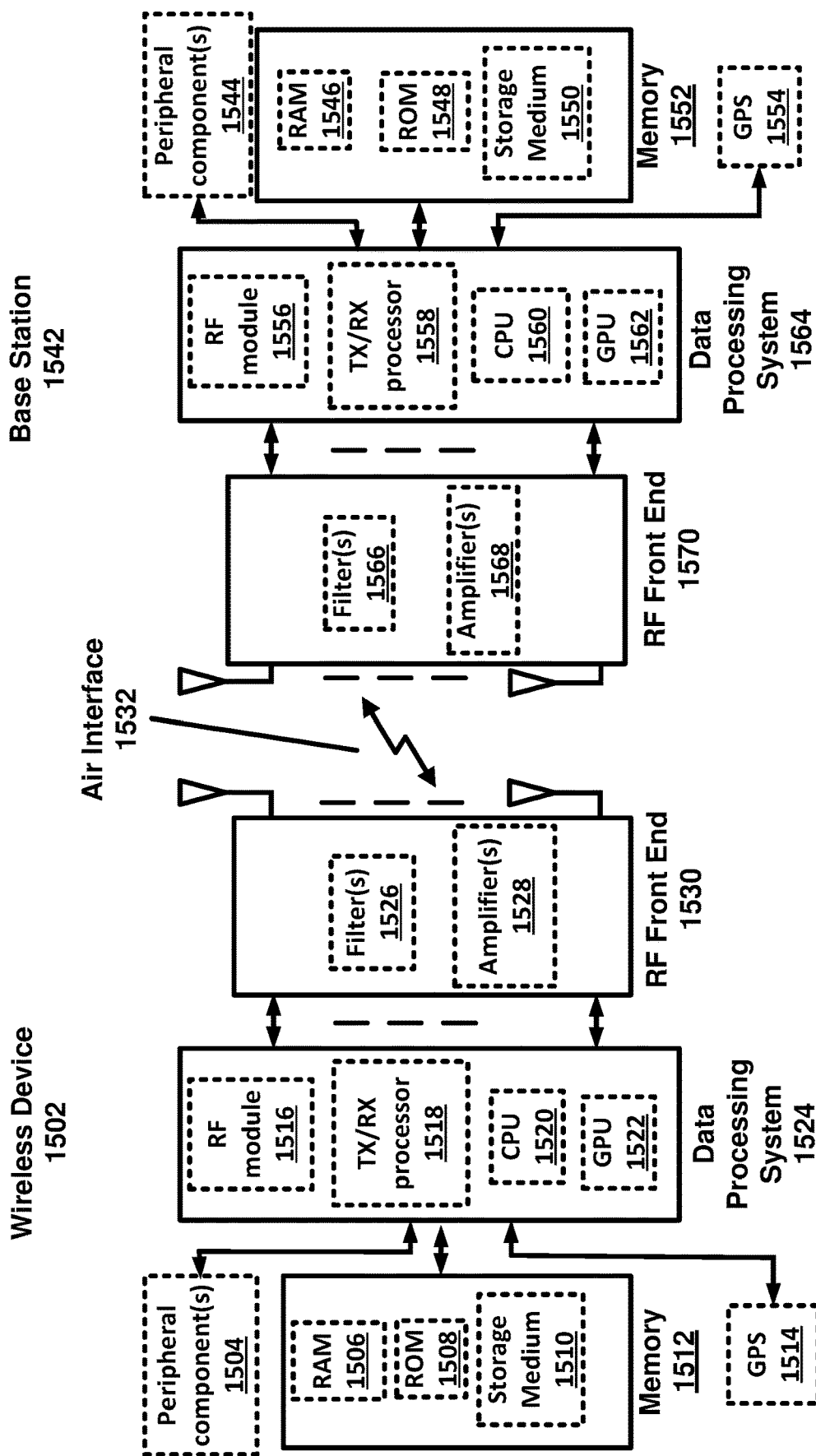
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, an IE ConfiguredGrantConfig may be used to configure uplink transmission without dynamic grant according to two possible schemes. The actual uplink grant may either be configured via RRC (type1) or provided via the PDCCH (addressed to CS-RNTI) (type2). In an example, multiple Configured Grant configurations may be configured in one BWP of a serving cell. A field/parameter cg-RetransmissionTimer may indicate the initial value of the configured retransmission timer in multiples of periodicity. The value of cg-RetransmissionTimer may be less than or equal to the value of configuredGrantTimer. This field may be configured for operation with shared spectrum channel access together with harq-ProcID-Offset. A field/parameter configuredGrantConfigIndex may indicate the index of the Configured Grant configurations within the BWP. A field/parameter configuredGrantTimer may indicate the initial value of the configured grant timer in multiples of periodicity. When cg-RetransmissonTimer is configured, if HARQ processes are shared among different configured grants on the same BWP, configuredGrantTimer*periodicity may be set to the same value for the configurations that share HARQ processes on this BWP. A field/parameter frequencyDomainAllocation may indicate the frequency domain resource allocation. A field/parameter harq-ProcID-Offset for operation with shared spectrum channel access may configure the range of HARQ process IDs which can be used for this configured grant where the UE can select a HARQ process ID within [harq-procID-offset, . . . , (harq-procID-offset+nrofHARQ-Processes−1)]. A field/parameter harq-ProcID-Offset2 may indicate the offset used in deriving the HARQ process IDs. A field/parameter nrofHARQ-Processes may indicate the number of HARQ processes configured. A field/parameter periodicity may indicate a periodicity for UL transmission without UL grant for type 1 and type 2.

In an example, an IE ConfiguredGrantConfigIndex may be used to indicate the index of one of multiple UL Configured Grant configurations in one BWP.

In an example, there may be two types of transmission without dynamic grant in the uplink: configured grant Type 1 and configured grant Type 2. For configured grant Type 1, an uplink grant may be provided by RRC, and stored as configured uplink grant. For configured grant Type 2, an uplink grant may be provided by PDCCH, and stored or cleared as configured uplink grant based on L1 signaling indicating configured uplink grant activation or deactivation.

In an example, Type 1 and Type 2 configured grants may be configured by RRC for a Serving Cell per BWP. Multiple configurations may be active simultaneously in the same BWP. For Type 2, activation and deactivation may be independent among the Serving Cells. For the same BWP, the MAC entity may be configured with both Type 1 and Type 2.

In an example, RRC may configure the following parameters when the configured grant Type 1 is configured: cs-RNTI (CS-RNTI for retransmission); periodicity (periodicity of the configured grant Type 1); timeDomainOffset (offset of a resource with respect to SFN=time- ReferenceSFN in time domain); timeDomainAllocation (Allocation of configured uplink grant in time domain which contains startSymbolAndLength or startSymbol); nrofHARQ-Processes (the number of HARQ processes for configured grant); harq-ProcID-Offset (offset of HARQ process for configured grant for operation with shared spectrum channel access); harq-ProcID-Offset2 (offset of HARQ process for configured grant); timeReferenceSFN (SFN used for determination of the offset of a resource in time domain). In an example, the UE may use the closest SFN with the indicated number preceding the reception of the configured grant configuration.

In an example, RRC may configure the following parameters when the configured grant Type 2 is configured: cs-RNTI (CS-RNTI for activation, deactivation, and retransmission); periodicity (periodicity of the configured grant Type 2); nrofHARQ-Processes (the number of HARQ processes for configured grant); harq-ProcID-Offset (offset of HARQ process for configured grant for operation with shared spectrum channel access); harq-ProcID-Offset2 (offset of HARQ process for configured grant).

In an example, RRC may configure the following parameters when retransmissions on configured uplink grant is configured: cg-RetransmissionTimer (the duration after a configured grant (re)transmission of a HARQ process when the UE may not autonomously retransmit that HARQ process).

In an example, upon configuration of a configured grant Type 1 for a BWP of a Serving Cell by upper layers, the MAC entity may: store the uplink grant provided by upper layers as a configured uplink grant for the indicated BWP of the Serving Cell; initialize or re-initialize the configured uplink grant to start in the symbol according to timeDomainOffset, timeReferenceSFN, and S (derived from SLIV or provided by startSymbol), and to reoccur with periodicity.

In an example, after an uplink grant is configured for a configured grant Type 1, the MAC entity may consider sequentially that the Nth (N>=0) uplink grant occurs in the symbol for which:

[(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+$S$+$N$×periodicity) modulo (1024×numberOfSlotsPerFrame×numberOfSymbolsPerSlot).

In an example, after an uplink grant is configured for a configured grant Type 2, the MAC entity may consider sequentially that the Nth (N>=0) uplink grant occurs in the symbol for which:

[(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+$N$×periodicity] modulo (1024×numberOfSlotsPerFrame×numberOfSymbolsPerSlot), where SFNstart time, slotstart time, and symbolstart time are the SFN, slot, and symbol, respectively, of the first transmission opportunity of PUSCH where the configured uplink grant was (re-)initialized.

In an example, if cg-nrofPUSCH-InSlot or cg-nrofSlots is configured for a configured grant Type 1 or Type 2, the MAC entity may consider the uplink grants occur in those additional PUSCH allocations.

In an example, when the configured uplink grant is released by upper layers, the corresponding configurations may be released and corresponding uplink grants may be cleared.

In an example, at least one configured uplink grant confirmation may have been triggered and not cancelled; and the MAC entity may have UL resources allocated for new transmission. If, in this MAC entity, at least one configured uplink grant is configured by configuredGrantConfigToAddModList: the MAC entity may instruct the Multiplexing and Assembly procedure to generate a Multiple Entry Configured Grant Confirmation MAC CE. Otherwise, the MAC entity may instruct the Multiplexing and Assembly procedure to generate a Configured Grant Confirmation MAC CE. The MAC entity may cancel triggered configured uplink grant confirmation(s).

In an example, for a configured grant Type 2, the MAC entity may clear the configured uplink grant(s) immediately after first transmission of Configured Grant Confirmation MAC CE or Multiple Entry Configured Grant Confirmation MAC CE which confirms the configured uplink grant deactivation.

In an example, retransmissions may use: repetition of configured uplink grants; or received uplink grants addressed to CS-RNTI; or configured uplink grants with cg-RetransmissionTimer configured.

In an example, an IE BeamFailureRecoveryConfig may be used to configure the UE with RACH resources and candidate beams for beam failure recovery in case of beam failure detection. In an example, a field/parameter beamFailureRecoveryTimer may indicate a timer value for beam failure recovery timer. Upon expiration of the timer, the UE may not use CFRA for BFR. The value of timer may be in ms. Value ms10 may correspond to 10 ms, value ms20 may correspond to 20 ms, and so on. A field/parameter candidateBeamRSList, may indicate the list of reference signals (CSI-RS and/or SSB) identifying the candidate beams for recovery and the associated RA parameters. The UE may consider this list to include elements of candidateBeamRSList (without suffix). The network may configure these reference signals to be within the linked DL BWP (e.g., within the DL BWP with the same bwp-Id) of the UL BWP in which the BeamFailureRecoveryConfig is provided. In an example, a field/parameter msg1-SubcarrierSpacing may indicate subcarrier spacing for contention free beam failure recovery. A field/parameter rsrp-ThresholdSSB may indicate L1-RSRP threshold used for determining whether a candidate beam may be used by the UE to attempt contention free random access to recover from beam failure. A field/parameter ra-prioritization may indicate parameters which may apply for prioritized random access procedure for BFR. A field/parameter ra-PrioritizationTwoStep may indicate parameters which apply for prioritized 2-step random access procedure for BFR. A field/parameter ra-ssb-OccasionMaskIndex may be explicitly signalled PRACH Mask Index for RA Resource selection. The mask may be valid for all SSB resources. A field rach-ConfigBFR may indicate configuration of contention free random access occasions for BFR. In an example, a field/parameter recoverySearchSpaceI may indicate search space to use for BFR RAR. The network may configure this search space to be within the linked DL BWP (e.g., within the DL BWP with the same bwp-Id) of the UL BWP in which the BeamFailureRecoveryConfig is provided. The CORESET associated with the recovery search space may not be associated with another search space. In an example, network may configure the UE with a value for this field when contention free random access resources for BFR are configured. A field/parameter rootSequenceIndex-BFR may indicate PRACH root sequence index for beam failure recovery. A field/parameter ssb-perRACH-Occasion may indicate number of SSBs per RACH occasion for CF-BFR.

A field/parameter csi-RS may indicate the ID of a NZP-CSI-RS-Resource configured in the CSI-MeasConfig of this serving cell. This reference signal may determine a candidate beam for beam failure recovery (BFR). A field/parameter ra-OccasionList may indicate RA occasions that the UE may use when performing BFR upon selecting the candidate beam identified by this CSI-RS. In an example, the network may ensure that the RA occasion indexes provided herein are also configured by prach-ConfigurationIndex and msg1-FDM. Each RACH occasion may be sequentially numbered, first, in increasing order of frequency resource indexes for frequency multiplexed PRACH occasions; second, in increasing order of time resource indexes for time multiplexed PRACH occasions within a PRACH slot and third, in increasing order of indexes for PRACH slots. If the field is absent the UE may use the RA occasion associated with the SSB that is QCLed with this CSI-RS. A field/parameter ra-PreambleIndex may indicate the RA preamble index to use in the RA occasions associated with this CSI-RS. If the field is absent, the UE may use the preamble index associated with the SSB that is QCLed with this CSI-RS. A field/parameter ra-PreambleIndex may indicate the preamble index that the UE may use when performing BFR upon selecting the candidate beams identified by this SSB. A field/parameter ssb may indicate the ID of an SSB transmitted by this serving cell. It may determine a candidate beam for beam failure recovery (BFR).

In an example, the IE BeamFailureRecoverySCellConfig may be used to configure the UE with candidate beams for beam failure recovery in case of beam failure detection in SCell. A field/parameter candidateBeamConfig may indicates the resource (e.g., SSB or CSI-RS) defining this beam resource. A field/parameter candidateBeamRSSCellList may indicate a list of reference signals (CSI-RS and/or SSB) identifying the candidate beams for recovery. The network may configure this parameter in every instance of this IE. A field/parameter rsrp-ThresholdBFR may indicate L1-RSRP threshold used for determining whether a candidate beam may be included by the UE be in BFR MAC CE. The network may configure this parameter in every instance of this IE.

In an example, an IE RadioLinkMonitoringConfig may be used to configure radio link monitoring for detection of beam- and/or cell radio link failure. A field/parameter beamFailureDetectionTimer may indicate a timer for beam failure detection. A field/parameter beamFailureInstanceMaxCount may determine after how many beam failure events the UE may trigger beam failure recovery. A field/parameter failureDetectionResourcesToAddModList may indicate a list of reference signals for detecting beam failure and/or cell level radio link failure (RLF). A field/parameter purpose may determine whether the UE may monitor the associated reference signal for the purpose of cell- and/or beam failure detection. For SCell, network may configure the value to beamFailure.

In an example, an IE RACH-ConfigGeneric may be used to specify the random-access parameters both for regular random access as well as for beam failure recovery.

In an example, an IE MAC-CellGroupConfig may be used to configure MAC parameters for a cell group, including DRX. A field/parameter schedulingRequestID-BFR-SCell may indicate the scheduling request configuration applicable for BFR on SCell.

Example embodiments may enable small data transmission in RRC_INACTIVE state. In an example, uplink small data transmissions may be RACH-based (e.g., 2-step or 4-step RACH). In an example, small data packets from INACTIVE state may be transmitted using MSGA or MSG3. In an example, small data packets from INACTIVE state may be transmitted via pre-configured PUSCH resources for example, using the configured grant type 1. The transmission of small data packets in INACTIVE state may be when timing advance (TA) is valid.

In example embodiments, small data may be transmitted with an RRC message for RA-based and CG based small data transmission schemes. In an example, RRC-less data transmission may be used in some scenarios. In an example, 2-step RACH or 4-step RACH may be applied to RACH-based uplink small data transmission in RRC_INACTIVE. In an example, the uplink small data may be sent in MSGA of 2-step RACH or msg3 of 4-step RACH. In an example, small data transmission may be configured by the network for a wireless device on a per radio bearer (e.g., per data radio bearer (DRB)) basis. In example embodiments, data volume threshold may be used for the wireless device to decide whether to do small data transmission (SDT) or not. In an example an SDT specific RSRP threshold may be used to determine whether the UE should do SDT. In example embodiments, uplink/downlink transmission may be performed following uplink SDT without transitioning to RRC_CONNECTED. In example embodiments, when the wireless device is in RRC_INACTIVE, it may be possible to send multiple uplink and downlink packets as part of the same SDT mechanism and without transitioning to RRC_CONNECTED on dedicated grant.

In example embodiments, for small data transmission using RACH-based and configured grant (CG)-based mechanisms, when the UE receives RRC release with a suspend config IE, the UE may at least perform the following actions: MAC may be reset and default MAC cell group configuration ne released, RLC entities for signaling radio bearer SRB1 may be re-established, signaling radio bearers (SRBs) and data radio bearers (DRBs) may be suspended except SRB0.

In example embodiments, for RACH and CG based mechanisms, upon initiating RESUME procedure for SDT initiation (e.g., for first SDT transmission), the UE may re-establish at least the SDT PDCP entities and may resume the SDT DRBs that are configured for small data transmission (along with the SRB1).

In example embodiments, the first uplink message (e.g., MSG3 for 4-step RACH, MSGA payload for 2-step RACH and the CG transmission for CG) may contain at least the following contents (depending on the size of the message): CCCH message. In an example, the logical channel prioritization (LCP) may be used to determine the priority of the following content that may be included: DRB data from one or more DRBs which may be configured by the network for small data transmission, one or more MAC CEs (e.g., buffer status report (BSR)), padding bits.

In example embodiments, for RACH and CG, the unified access (UAC) procedure may be used to determine whether access attempt is allowed.

In example embodiments, SDT may be transparent to NAS layer (e.g., NAS may generate one of the existing resume causes and AS may decide SDT vs non-SDT access).

In example embodiments, for RACH based solutions, upon successful completion of contention resolution, the UE may monitor the C-RNTI.

In example embodiments, the RACH resource, e.g., RACH occasion and/or preamble, may be different between SDT and non-SDT.

In example embodiments, the configuration of configured grant resource for UE uplink small data transfer may be contained in the RRCRelease message. In an example, the configuration of configured grant resource may include type 1 CG configuration.

In example embodiments, a new timing advance (TA) timer for TA maintenance specified for configured grant based small data transfer in RRC_INACTIVE may be used. In an example, the TA timer may be configured together with the CG configuration in the RRCRelease message.

In example embodiments, the configuration of configured grant resource for UE small data transmission may be valid in the same serving cell.

In example embodiments, the UE may use configured grant based small data transfer if at least the following criteria is fulfilled: user data is smaller than the data volume threshold; configured grant resource is configured and valid; and UE has valid TA.

In example embodiments, an association between CG resources and SSBs may exist for CG-based SDT.

In example embodiments, SS-RSRP threshold may be configured for SSB selection. The UE may select one of the SSB with SS-RSRP above the threshold and may select the associated CG resource for UL data transmission.

In example embodiments, CG-SDT resource configuration may be provided to UEs in RRC_Connected within the RRCRelease message.

In example embodiments, CG-PUSCH resources may be separately configured for normal uplink (NUL) carrier and supplementary uplink (SUL) carrier. In an example, CG-PUSCH resource on NUL and SUL carrier may be configured at the same time.

In example embodiments, the RRC release message may be used to reconfigure or release the CG-SDT resources while UE is in RRC_INACTIVE.

In example embodiments, for CG-SDT, the subsequent data transmission (e.g., retransmission after an initial transmission) may use the CG resource or dynamic grant (DG, e.g., dynamic grant addressed to UE's C-RNTI).

In example embodiments, time alignment timer used for small data transmission in INACTIVE state (e.g., TAT-SDT) may be started upon receiving the TAT-SDT configuration from gNB, e.g., RRCrelease message, and may be (re)started upon reception of TA command.

In example embodiments, a TA validation mechanism for SDT based on RSRP change may be used and RSRP-based threshold(s) may be configured.

In example embodiments, it may be a network configuration whether to support multiple CG-SDT configurations per carrier in RRC_INACTIVE.

In example embodiments, the UE may release CG-SDT resources when TAT expires in RRC_Inactive state.

In example embodiments, for RA-SDT, up to two preamble groups (corresponding to two different payload sizes for MSGA/MSG3) may be configured by the network. In an example, if RACH procedure is initiated for SDT (e.g., RA-SDT initiated), the UE may first perform RACH type selection.

In example embodiments, RRCRelease message may be sent by the base station to terminate the SDT procedure from RRC point of view. The RRCRelease sent at the end of the SDT may contain the CG resource.

In example embodiments an RSRP threshold may be used to select between SDT and non-SDT procedure. The RSRP threshold to select between SDT and non-SDT procedure may be used for CG-SDT, RA-SDT, or both. In an example, the RSRP threshold may be the same for CG-SDT and RA-SDT.

In example embodiments, beam failure detection and recovery may be supported/performed in RRC_INACTIVE. In example, CG-SDT and/or RA-SDT may be used for beam failure recovery.

In an example, there may be an association between CG resources and SSBs. With the association, UE may indicate the downlink beam it is receiving to gNB by transmitting on the corresponding CG resource. The UE may perform beam failure detection and/or beam failure recovery during subsequent data transmission.

In an example, during subsequent transmission, in order to receive downlink data successfully, UE may perform beam failure detection. If beam failure happens, UE may perform beam failure recovery to change downlink beam. Otherwise, UE may not be able to receive downlink data during the subsequent transmission period. In an example, beam failure detection and recovery may be performed in subsequent transmission period.

In an example, UE may constantly perform beam failure detection in RRC_CONNECTED. In an example in RRC_INACTIVE, maintaining downlink beam alignment all the time may not be needed due to excessive UE power and network resource consumption. If there are new data arriving in buffer, UE may initiate RA-SDT or CG-SDT. UE may select a SSB before proceeding with the rest of the procedure so conducting beam failure detection or beam failure recovery may not be needed when it is not in a subsequent data transmission period. In an example, beam failure detection may not be performed out of subsequent transmission period.

In an example, for RA-SDT and CG-SDT procedures, UE may select a SSB and uses the corresponding PRACH resource or CG resource to transmit a transmission. According to the resource used for the transmission, gNB may determine that the downlink beam is changed. In an example, beam failure recovery may be performed through RA-SDT and CG-SDT.

In an example, for SDT and for both RA-SDT and CG-SDT, dynamic grant may be supported for subsequent uplink transmission, for which the UE may need to monitor PDCCH. In an example, L1 ACK may be used for CG-SDT. In an example, beam failure recovery may be supported for SDT.

In an example, the downlink beam indicated by the UE to the network through CG-SDT transmission (based on CG-SDT to SSB mapping) may not always be suitable beam for the UE, e.g., due to the UE's mobility. If the beam becomes unsuitable and UE keeps monitoring the beam indicated to the network by CG-SDT, the UE may not be able to receive PDCCH. In an example, if the UE has to perform retransmission for the previous un-acknowledged CG transmission, the transmission may serve as BFR that may indicate a new beam to the network.

In an example, an RRCRelease message may be used to command the release of an RRC connection or the suspension of the RRC connection. The RRC release message may comprise a SuspendConfig field/IE. The SuspendConfig IE may comprise a ran-NotificationAreaInfo field. The network may ensure that the UE in RRC_INACTIVE has a valid ran-NotificationAreaInfo. The SuspendConfig IE may comprise a ran-PagingCycle field/parameter. The ran-PagingCycle field/parameter may refer to the UE specific cycle for RAN-initiated paging. The SuspendConfig IE may comprise a t380 field/parameter indicating a timer that triggers the periodic RNAU (RAN notification Area Update) procedure in UE.

In an example, an RRCResume message may be used to resume the suspended RRC connection. An IE idleMode-MeasurementReq may indicate that the UE may report the idle/inactive measurements, if available, to the network in the RRCResumeComplete message. An IE radioBearerConfig may indicate configuration of Radio Bearers (DRBs, SRBs) including SDAP/PDCP.

In an example, an RRCResumeComplete message may be used to confirm the successful completion of an RRC connection resumption. In an example, an RRCResumeRequest message may be used to request the resumption of a suspended RRC connection or perform an RNA update.

In example embodiments, a MAC entity may be configured by RRC per Serving Cell with a beam failure recovery procedure which may be used for indicating to the serving gNB of a new SSB or CSI-RS when beam failure is detected on the serving SSB(s)/CSI-RS(s). Beam failure may be detected by counting beam failure instance indication from the lower layers to the MAC entity. If beamFailureRecoveryConfig is reconfigured by upper layers during an ongoing Random Access procedure for beam failure recovery for SpCell, the MAC entity may stop the ongoing Random Access procedure and may initiate a Random Access procedure using the new configuration.

In example embodiments, RRC may configure the following parameters in one or more IEs (e.g., the BeamFailureRecoveryConfig, BeamFailureRecoverySCellConfig, and the RadioLinkMonitoringConfig) for the Beam Failure Detection and Recovery procedure: beamFailureInstanceMaxCount (for the beam failure detection); beamFailureDetectionTimer (for the beam failure detection); beamFailureRecovery Timer (for the beam failure recovery procedure); rsrp-ThresholdSSB (an RSRP threshold for the SpCell beam failure recovery); rsrp-ThresholdBFR (an RSRP threshold for the SCell beam failure recovery); powerRampingStep (powerRampingStep for the SpCell beam failure recovery); powerRampingStepHighPriority (powerRampingStepHighPriority for the SpCell beam failure recovery); preambleReceivedTargetPower (preambleReceivedTargetPower for the SpCell beam failure recovery); preambleTransMax (preambleTransMax for the SpCell beam failure recovery); scalingFactorBI (scalingFactorBI for the SpCell beam failure recovery); ssb-perRACH-Occasion (ssb-perRACH-Occasion for the SpCell beam failure recovery using contention-free Random Access Resources); ra-ResponseWindow (the time window to monitor response(s) for the SpCell beam failure recovery using contention-free Random Access Resources); prach-ConfigurationIndex (prach-ConfigurationIndex for the SpCell beam failure recovery using contention-free Random Access Resources); ra-ssb-OccasionMaskIndex (ra-ssb-OccasionMaskIndex for the SpCell beam failure recovery using contention-free Random Access Resources); ra-OccasionList (ra-OccasionList for the SpCell beam failure recovery using contention-free Random Access Resources); candidateBeamRSList (list of candidate beams for SpCell beam failure recovery); candidateBeamRSSCellList (list of candidate beams for SCell beam failure recovery).

In an example, the following UE variable may be used for the beam failure detection procedure: BFI_COUNTER (per Serving Cell) as a counter for beam failure instance indication which may be initially set to 0.

In an example, if beam failure instance indication has been received from lower layers: the MAC entity may, for each Serving Cell configured for beam failure detection, start or restart the beamFailureDetectionTimer and may increment BFI_COUNTER by 1.

In an example, if beam failure instance indication has been received from lower layers: if the Serving Cell is SCell, the MAC entity may, for each Serving Cell configured for beam failure detection, trigger a BFR for this Serving Cell.

In an example, if beam failure instance indication has been received from lower layers: if the Serving Cell is not a SCell (e.g., if the Serving Cell is SpCell), the MAC entity may, for each Serving Cell configured for beam failure detection, initiate a Random Access procedure on the SpCell.

In an example, if the beamFailureDetectionTimer expires; or if beamFailureDetectionTimer, beamFailureInstanceMaxCount, or any of the reference signals used for beam failure detection is reconfigured by upper layers associated with this Serving Cell: the MAC entity may, for each Serving Cell configured for beam failure detection, set BFI_COUNTER to 0.

In an example, if the Serving Cell is SpCell and the Random Access procedure initiated for SpCell beam failure recovery is successfully completed, the MAC entity may, for each Serving Cell configured for beam failure detection, set BFI_COUNTER to 0; stop the beamFailureRecoveryTimer, if configured; and consider the Beam Failure Recovery procedure successfully completed.

In an example, if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or if the SCell is deactivated, the MAC entity may, for each Serving Cell configured for beam failure detection, set BFI_COUNTER to 0; and consider the Beam Failure Recovery procedure successfully completed and cancel all the triggered BFRs for this Serving Cell.

In an example, if the Beam Failure Recovery procedure determines that at least one BFR has been triggered and not cancelled for an SCell for which evaluation of the candidate beams has been completed: if UL-SCH resources are available for a new transmission and if the UL-SCH resources can accommodate the BFR MAC CE plus its subheader as a result of LCP: the MAC entity may instruct the Multiplexing and Assembly procedure to generate the BFR MAC CE.

In an example, if the Beam Failure Recovery procedure determines that at least one BFR has been triggered and not cancelled for an SCell for which evaluation of the candidate beams has been completed: if UL-SCH resources are available for a new transmission and if the UL-SCH resources can accommodate the Truncated BFR MAC CE plus its subheader as a result of LCP: the MAC entity may instruct the Multiplexing and Assembly procedure to generate the Truncated BFR MAC CE.

In an example, if the Beam Failure Recovery procedure determines that at least one BFR has been triggered and not cancelled for an SCell for which evaluation of the candidate beams has been completed: if UL-SCH resources are not available for a new transmission or if the UL-SCH resources can not accommodate the BFR MAC CE plus its subheader or the Truncated BFR MAC CE plus its subheader as a result of LCP, the MAC entity may trigger the SR for SCell beam failure recovery for each SCell for which BFR has been triggered, not cancelled, and for which evaluation of the candidate beams has been completed.

In an example, BFRs triggered for an SCell may be cancelled when a MAC PDU is transmitted and this PDU includes a BFR MAC CE or Truncated BFR MAC CE which contains beam failure information of that SCell.

Figure 16:
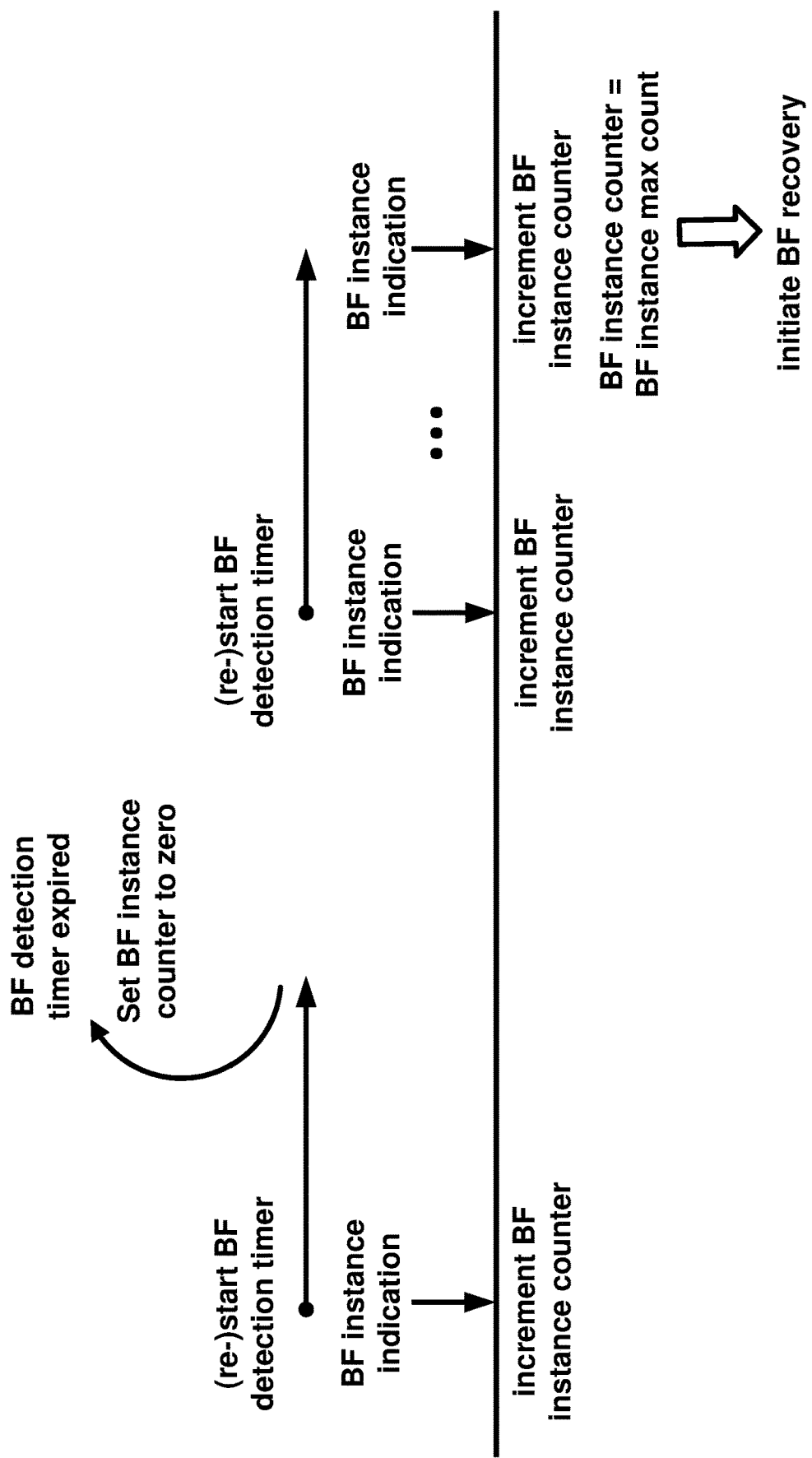
FIG. 16 shows an example process in accordance with several of various embodiments of the present disclosure.

In example embodiments as shown in FIG. 16, a MAC layer of the wireless device may receive beam failure instance indications from the lower layers (e.g., Physical layer) of the wireless device. A beam failure instance indication may be based on measuring reference signals (e.g., synchronization signal block (SSB) or channel state information reference signal (CSI-RS)) associated with (e.g., received via) a downlink beam. For example, a beam failure instance indication may be in response to an RSRP, measured for a reference signal that is associated with a downlink beam, being smaller than a threshold (e.g., a predetermined or a configurable (e.g., RRC configurable) threshold). The wireless device may maintain a beam failure instance indication counter and may increment the beam failure instance indication counter in response to a beam failure instance indication. The beam failure instance indication counter may be specific to a BWP (e.g., an active BWP of a serving cell) and the wireless device may increment the beam failure instance indication counter in response to a beam failure instance indication for a downlink beam corresponding to the BWP. The wireless device may further start/restart a beam failure detection timer with a value. The beam failure detection timer may be specific to a BWP (e.g., an active BWP of a serving cell) and the wireless device may start/restart the beam failure detection timer in response to a beam failure instance indication for a downlink beam corresponding to the BWP. The wireless device may receive a configuration parameter (e.g., an RRC configuration parameter received via one or more RRC messages) indicating the value of the beam failure detection timer. In response to the beam failure detection timer expiring, the wireless device may set the corresponding beam failure instance indication counter to zero. The wireless device may further receive a configuration parameter (e.g., an RRC configuration parameter received via one or more RRC messages) indicating a threshold (e.g., a beam failure instance max count). In response to the beam failure instance indication counter reaching the threshold, the wireless device may start a beam failure recovery procedure. In an example, a beam failure recovery procedure may be based on whether the beam failure recovery is for a primary cell (e.g., PCell/PSCell) or for a secondary cell (SCell). In response to the beam failure recovery being for the primary cell, the wireless device may start a random access procedure for the beam failure recovery. A random access preamble/resource/occasion of the random access process may indicate a new downlink beam and its corresponding SSB or CSI-RS compared to a current serving downlink beam (e.g., the downlink beam for which beam failure is detected) and its corresponding SSB or CSI-RS. In response to the beam failure being detected for a SCell, the wireless device may trigger a BFR and may transmit a BFR MAC CE.

Figure 17:
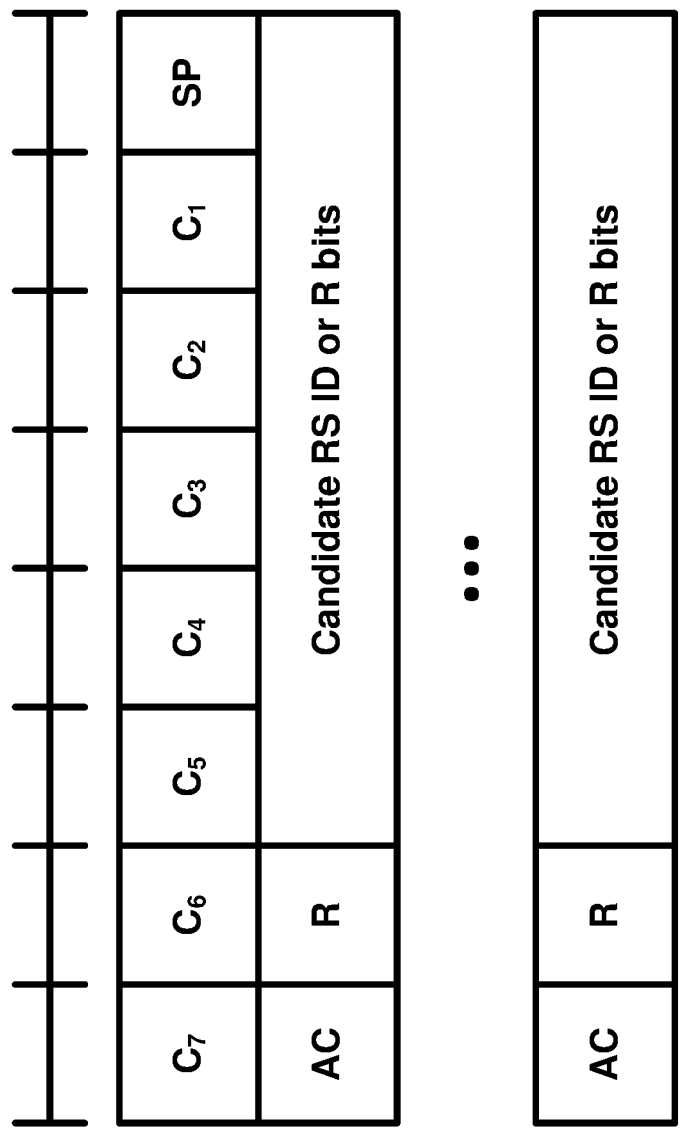
FIG. 17 shows an example medium access control (MAC) control element (CE) in accordance with several of various embodiments of the present disclosure.
Figure 18:
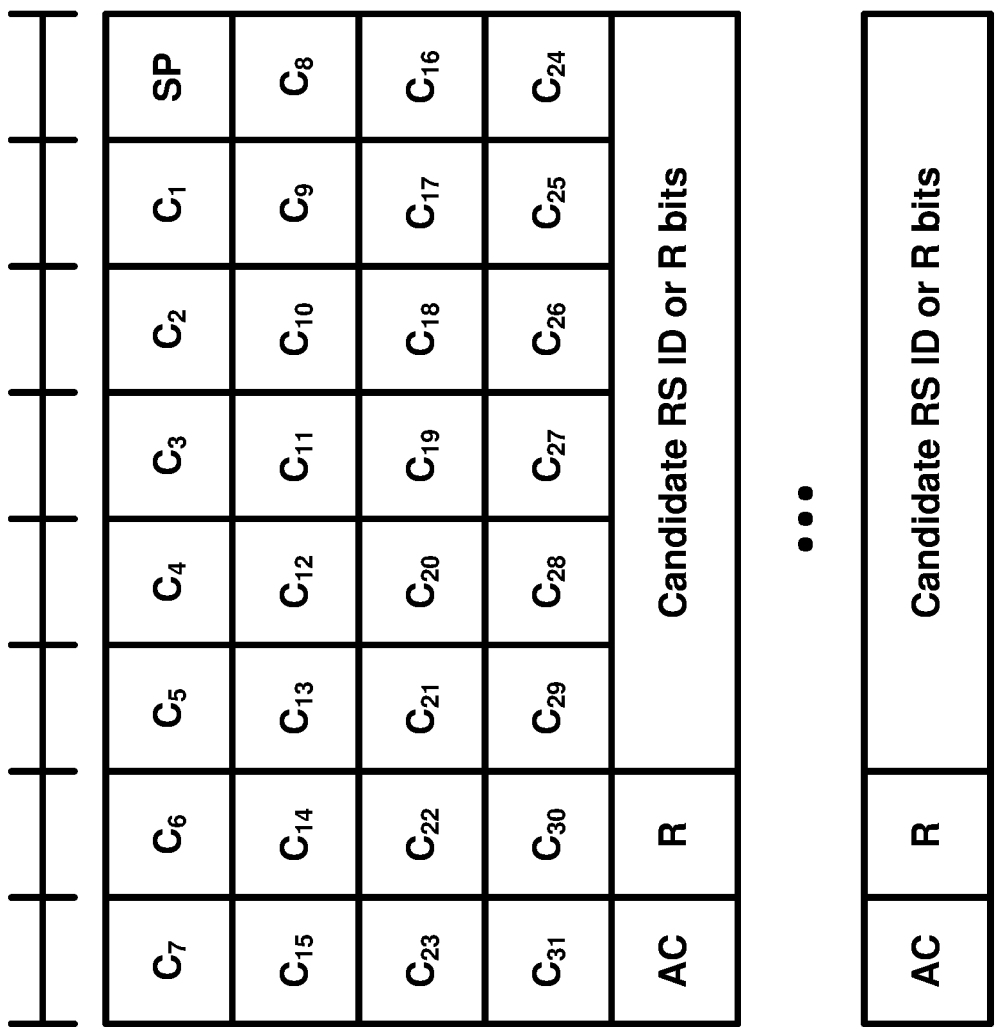
FIG. 18 shows an example MAC CE in accordance with several of various embodiments of the present disclosure.

In example embodiments, the MAC CEs for BFR may comprise of either: BFR MAC CE; or Truncated BFR MAC CE. FIG. 17 shows BFR and Truncated BFR MAC CE with one octet Ci field. FIG. 18 shows BFR and Truncated BFR MAC CE with four octets Ci field.

In example embodiments, the BFR MAC CE and Truncated BFR MAC CE may be identified by a MAC subheader with a corresponding LCID/eLCID.

In example embodiments, the BFR MAC CE and Truncated BFR MAC CE may have a variable size. They may include a bitmap and in ascending order based on the ServCellIndex, beam failure recovery information e.g., octets containing candidate beam availability indication (AC) for SCells indicated in the bitmap. For BFR MAC CE, a single octet bitmap may be used when the highest Serv- CellIndex of this MAC entity's SCell for which beam failure is detected and the evaluation of the candidate beams has been completed is less than 8, otherwise four octets may be used. In an example, a MAC PDU may contain at most one BFR MAC CE.

In example embodiments, for Truncated BFR MAC CE, a single octet bitmap may be used for the following cases, otherwise four octets may be used: the highest ServCellIndex of this MAC entity's SCell for which beam failure is detected and the evaluation of the candidate beams has been completed is less than 8; or beam failure is detected for SpCell and the SpCell is to be indicated in a Truncated BFR MAC CE and the UL-SCH resources available for transmission cannot accommodate the Truncated BFR MAC CE with the four octets bitmap plus its subheader as a result of LCP.

In example embodiments, the fields in the BFR MAC CEs may be defined as follows.

SP field may indicate beam failure detection for the SpCell of this MAC entity. The SP field may be set to 1 to indicate that beam failure is detected for SpCell when BFR MAC CE or Truncated BFR MAC CE is to be included into a MAC PDU as part of Random Access Procedure, otherwise, it may be set to 0.

Ci (BFR MAC CE) field may indicate beam failure detection and the presence of an octet containing the AC field for the SCell with ServCellIndex i. The Ci field set to 1 may indicate that beam failure is detected, the evaluation of the candidate beams has been completed, and the octet containing the AC field is present for the SCell with ServCellIndex i. The Ci field set to 0 may indicate that the beam failure is either not detected or the beam failure is detected but the evaluation of the candidate beams has not been completed, and the octet containing the AC field may not be present for the SCell with ServCellIndex i. The octets containing the AC field may be present in ascending order based on the ServCellIndex.

Ci (Truncated BFR MAC CE) field may indicate beam failure detection for the SCell with ServCellIndex i. The Ci field set to 1 may indicate that beam failure is detected, the evaluation of the candidate beams has been completed, and the octet containing the AC field for the SCell with ServCellIndex i may be present. The Ci field set to 0 may indicate that the beam failure is either not detected or the beam failure is detected but the evaluation of the candidate beams has not been completed, and the octet containing the AC field is not present for the SCell with ServCellIndex i. The octets containing the AC field, if present, may be included in ascending order based on the ServCellIndex. The number of octets containing the AC field included may be maximised, while not exceeding the available grant size.

AC field may indicate the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field may be set to 1; otherwise, it may be set to 0. If the AC field set to 1, the Candidate RS ID field may be present. If the AC field set to 0, R bits may be present instead.

Candidate RS ID field may be set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. Index of an SSB or CSI-RS may be the index of an entry in candidateBeamRSSCellList corresponding to the SSB or CSI-RS. Index 0 may correspond to the first entry in the candidateBeamRSSCellList, index 1 may correspond to the second entry in the list and so on. The length of this field may be 6 bits.

Small data transmission based on configured grants or random access may be used by a wireless device in RRC_INACTIVE state. Existing beam failure detection and recovery procedures may not be efficient for a wireless device in the RRC_INACTIVE state and may lead to excessive UE power consumption and/or inefficiencies in wireless device and wireless network performance. There is a need to enhance the existing beam failure detection and recovery procedures for data transmission in the RRC_INACTIVE state. Example embodiments enhance the beam failure detection and recovery procedures in the RRC_INACTIVE state.

In example embodiments, a wireless device may receive one or more messages (e.g., one or more RRC messages) comprising configuration parameters. The one or more messages may comprise configuration parameters of one or more cells. For example, in case of carrier aggregation, the one or more cells may comprise a primary cell and one or more secondary cells. The one or more cells may be provided for the wireless device by a single base station or multiple base stations. For example, in case of multi-connectivity (e.g., dual connectivity), one or more first cells, of the one or more cells configured for the wireless device, may be provided by a first base station (e.g., a master base station) and one or more second cells, of the one or more cells configured for the wireless device, may be provided by a second base station (e.g., a secondary base station). The one or more RRC messages may comprises one or more information elements (e.g., BeamFailureRecoveryConfig, BeamFailureRecoverySCell Config, etc.) associated with beam failure detection and/or recovery. The one or more information elements for beam failure detection and/or recovery may be BWP-specific (e.g., for an active BWP of a serving cell). The one or more information elements may comprise configuration parameters used in beam failure detection and/or recovery procedures, for example, a beam failure instance threshold (e.g., beam failure max count), a beam failure detection timer value, a beam failure recovery timer, etc. In an example, the configuration parameters used in beam failure detection and/or recovery procedures may be used by the wireless device in an RRC_CONNECTED state.

Figure 19:
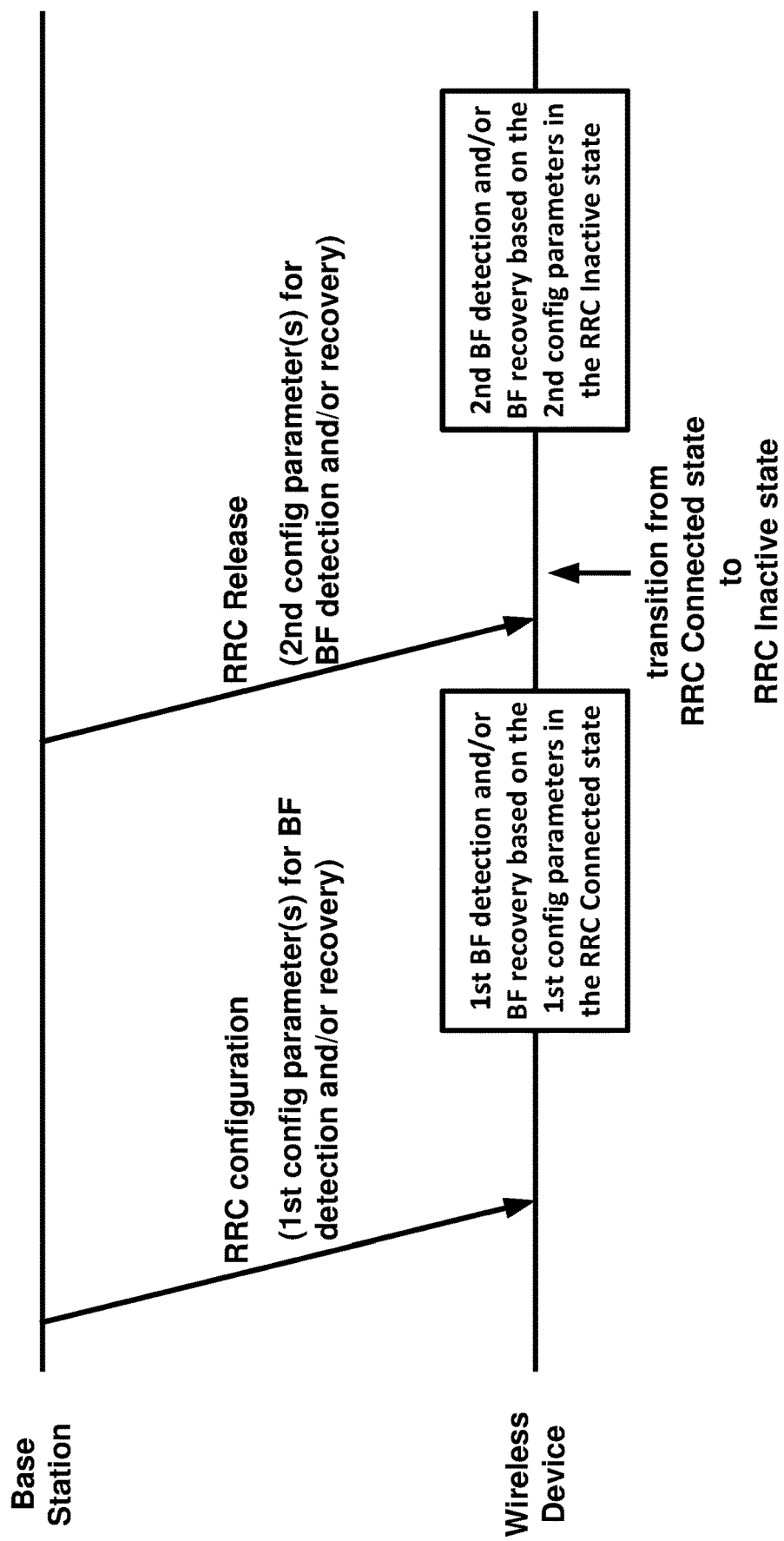
FIG. 19 shows an example process in accordance with several of various embodiments of the present disclosure.

In an example embodiment as shown in FIG. 19, a wireless device may receive one or more messages (e.g., one or more RRC messages) comprising first configuration parameters for beam failure detection and/or beam failure recovery. The first configuration parameters may be for beam failure detection and/or beam failure recovery in an RRC_CONNECTED state. The wireless device may perform beam failure detection and/or beam failure recovery during the RRC_CONNECTED state using the first configuration parameters. The wireless device may receive an RRC release message indicating transitioning of the wireless device from the RRC_CONNECTED state to the RRC_INACTIVE state. For example, the RRC release message may comprise a suspend config information element indicating transitioning of the wireless device from the RRC_CONNECTED state to the RRC_INACTIVE state. The suspend config IE may comprise configuration parameters used by the wireless device in the RRC_INACTIVE state. The RRC release message (e.g., the suspend config IE in the RRC release message) may comprise second configuration parameters used by the wireless device for beam failure detection and/or beam failure recovery during the RRC_INACTIVE state. The wireless device may perform beam failure detection and/or beam failure recovery during the RRC_INACTIVE state using the second configuration parameters.

In an example, a first configuration parameter of the first configuration parameters may indicate a first threshold for number of beam failure instance indications used in beam failure detection during the RRC_CONECTED state (e.g., a first beam failure instance max count) and a second configuration parameter of the second configuration parameters may indicate a second threshold for number of beam failure instance indications used in beam failure detection during the RRC_INACTIVE state (e.g., a second beam failure instance max count). During the RRC_CONNECTED state, the wireless device may determine/detect beam failure based on a number of beam failure instance indications reaching the first threshold (e.g., the first beam failure instance max count). During the RRC_INACTIVE state, the wireless device may determine/detect beam failure based on a number of beam failure instance indications reaching the second threshold (e.g., the second beam failure instance max count). In an example, the second threshold may be smaller than the first threshold.

In an example, a third configuration parameter of the first configuration parameters may indicate a first beam failure detection timer value of a first beam failure detection timer used in beam failure detection during the RRC_CONECTED state and a fourth configuration parameter of the second configuration parameters may indicate a second beam failure detection timer value of a beam failure detection timer used in beam failure detection during the RRC_INACTIVE state. During the RRC_CONNECTED state, the wireless device may start/restart a first beam failure detection timer with the first beam failure detection timer value in response to a beam failure instance indication. The wireless device may set a first beam failure instance indication counter, used during the RRC_CONNECTED state, to zero based on the first beam failure detection timer expiring. During the RRC_INACTIVE state, the wireless device may start/restart a second beam failure detection timer with the second beam failure detection timer value in response to a beam failure instance indication. The wireless device may set a second beam failure instance indication counter, used in the RRC_INACTIVE state, to zero based on the second beam failure detection timer expiring.

In an example, a fifth configuration parameter of the first configuration parameters may indicate a first beam failure recovery timer value of a first beam failure recovery timer used in beam failure recovery during the RRC_CONNECTED state. For example, a first beam failure recovery during the RRC_CONNECTED state may comprise initiating a first random access process in response to determining to perform beam failure recovery. The wireless device may start a beam failure recovery timer with the first beam failure recovery timer value in response to initiating the first random access process for beam failure recovery during the RRC_CONNECTED state. The wireless device may stop the first beam failure recovery timer in response to the first random access process being successfully completed. A sixth configuration parameter of the second configuration parameters may indicate a second beam failure recovery timer value of a second beam failure recovery timer used in beam failure recovery during the RRC_INACTIVE state. For example, a second beam failure recovery during the RRC_INACTIVE state may comprise initiating a second random access process in response to determining to perform beam failure recovery. The wireless device may start a beam failure recovery timer with the second beam failure recovery timer value in response to initiating the second random access process for beam failure recovery during the RRC_INACTIVE state. The wireless device may stop the second beam failure recovery timer in response to the second random access process being successfully completed.

In an example, a seventh configuration parameter of the first configuration parameters may indicate a first RSRP threshold used in beam failure recovery during the RRC_CONNECTED state. For example, a first beam failure recovery during the RRC_CONNECTED state may comprise initiating a first random access process in response to determining to perform beam failure recovery. In an example, the first RSRP threshold may be used for the selection of the SSB for the first random access (e.g., a four-step random access or a two-step random access). The selection of the SSB may be from a list of reference signals associated with candidate beams. In an example, the first RSRP threshold may be used for the selection of the CSI-RS for the first random access process (e.g., a four-step random access or two-step random access). In an example, the first RSRP threshold may be used for the selection between a NUL carrier and a SUL carrier. In an example, the first RSRP threshold may be used for the selection between a two-step random access and a four-step random access. An eighth configuration parameter of the first configuration parameters may indicate a second RSRP threshold used in beam failure recovery during the RRC_INACTIVE state. For example, a second beam failure recovery during the RRC_INACTIVE state may comprise initiating a second random access process in response to determining to perform beam failure recovery. In an example, the second RSRP threshold may be used for the selection of the SSB for the second random access (e.g., a four-step random access or a two-step random access). The selection of the SSB may be from a list of reference signals associated with candidate beams. In an example, the second RSRP threshold may be used for the selection of the CSI-RS for the first random access process (e.g., a four-step random access or two-step random access). In an example, the second RSRP threshold may be used for the selection between a NUL carrier and a SUL carrier. In an example, the second RSRP threshold may be used for the selection between a two-step random access and a four-step random access.

In an example, a first beam failure recovery process during the RRC_CONNECTED state may comprise initiating a first random access process in response to beam failure detection, wherein the beam failure detection and/or the beam failure recovery during the RRC_CONNECTDE state may be based on the first configuration parameters. The first random access process may comprise transmitting a first random access preamble via a first random access resource/occasion. The first random access preamble may be associated with a new beam compared to a current serving beam (e.g., the serving beam for which the beam failure is detected).

In an example, a second beam failure recovery process during the RRC_INACTIVE state may comprise initiating a second random access process in response to beam failure detection, wherein the beam failure detection and/or the beam failure recovery during the RRC_INACTIVE state may be based on the second configuration parameters (e.g., received via the RRC release message, e.g., the suspend config IE of the RRC release message). The second random access process may comprise transmitting a second random access preamble via a second random access resource/occasion. The second random access preamble may be associated with a new beam compared to a current serving beam (e.g., the serving beam for which the beam failure is detected).

In an example, the RRC release message (e.g., a suspend config IE of the RRC release message) may comprise third configuration parameters of one or more configured grant configurations, wherein the one or more configured grant configurations may be configured for data transmissions (e.g., small data transmissions, e.g., transmission of data packets with limited size) during the RRC inactive state. The wireless device may transmit data (e.g., small data) during the RRC inactive state using the radios resources associated with the one or more configured grant configurations and based on the third configuration parameters.

In an example, the RRC release message (e.g., a suspend config IE of the RRC release message) may comprise random access configuration parameters associated with random access processes used for data transmissions (e.g., small data transmissions, e.g., transmission of data packets with limited size) during the RRC_INACTIVE state. For example, the random access configuration parameters may indicate random access resources and/or random access occasions and/or random access preambles used by the wireless device for the random access processes associated with data transmissions (e.g., small data transmissions) during the RRC_INACTIVE state.

In an example, a beam failure recovery process performed in response to a beam failure detection during the RRC_INACTIVE state may comprise switching from a first configured grant configuration to a second configured grant configuration, wherein the first configured grant configuration may be associated with a first synchronization signal block (SSB) and the second configured grant configuration may be associated with a second SSB. In an example, the first SSB may be associated with/received via a first beam (e.g., downlink beam) and the second SSB may be associated with/received via a second beam (e.g., downlink beam). In an example, the RRC configuration parameters (e.g., the third configuration parameters of the one or more configured grant configurations configured for small data transmission during the RRC_INACTIVE state and received, for example, via the RRC release message) may indicate that the first configured grant configuration is associated with the first SSB/beam and the second configured grant configuration is associated with the second SSB/beam. The switching from the first configured grant configuration to the second configured grant configuration may be based on beam measurements indicating that RSRP associated with the second SSB (received via the second beam) being higher than an RSRP threshold and the RSRP associated with the first SSB (e.g., received via the first beam) being smaller than the RSRP threshold.

In an example, a beam failure recovery process performed in response to a beam failure detection during the RRC_INACTIVE state may comprise switching from a first configured grant configuration to a second configured grant configuration, wherein the first configured grant configuration may be associated with a first channel state information reference signal (CSI-RS) and the second configured grant configuration may be associated with a second channel state information (CSI-RS). In an example, the first CSI-RS may be associated with/received via a first beam (e.g., downlink beam) and the second CSI-RS may be associated with/received via a second beam (e.g., downlink beam). In an example, the RRC configuration parameters (e.g., the third configuration parameters of the one or more configured grant configurations configured for small data transmission during the RRC_INACTIVE state and received, for example, via the RRC release message) may indicate that the first configured grant configuration is associated with the first CSI-RS/beam and the second configured grant configuration is associated with the second CSI-RS/beam. The switching from the first configured grant configuration to the second configured grant configuration may be based on beam measurements indicating that RSRP associated with the second CSI-RS (received via the second beam) being higher than an RSRP threshold and the RSRP associated with the first CSI-RS (e.g., received via the first beam) being smaller than the RSRP threshold.

In an example, a beam failure recovery process performed in response to a beam failure detection during the RRC_INACTIVE state may comprise switching from a first configured grant resource to a second configured grant resource, wherein the first configured grant resource may be associated with a first synchronization signal block (SSB) and the second configured grant resource may be associated with a second SSB. In an example, the first SSB may be associated with/received via a first beam (e.g., downlink beam) and the second SSB may be associated with/received via a second beam (e.g., downlink beam). In an example, the RRC configuration parameters (e.g., the third configuration parameters of the one or more configured grant configurations configured for small data transmission during the RRC_INACTIVE state and received, for example, via the RRC release message) may indicate that the first configured grant resource is associated with the first SSB/beam and the second configured grant resource is associated with the second SSB/beam. In an example, the first configured grant resource and the second configured grant resource may be for the same configuration. In an example, the first configured grant resource and the second configured grant resource may be for different configurations. The switching from the first configured grant resource to the second configured grant resource may be based on beam measurements indicating that RSRP associated with the second SSB (received via the second beam) being higher than an RSRP threshold and the RSRP associated with the first SSB (e.g., received via the first beam) being smaller than the RSRP threshold.

In an example, a beam failure recovery process performed in response to a beam failure detection during the RRC_INACTIVE state may comprise switching from a first configured grant resource to a second configured grant resource, wherein the first configured grant resource may be associated with a first channel state information reference signal (CSI-RS) and the second configured grant resource may be associated with a second channel state information (CSI-RS). In an example, the first CSI-RS may be associated with/received via a first beam (e.g., downlink beam) and the second CSI-RS may be associated with/received via a second beam (e.g., downlink beam). In an example, the RRC configuration parameters (e.g., the third configuration parameters of the one or more configured grant configurations configured for small data transmission during the RRC_INACTIVE state and received, for example, via the RRC release message) may indicate that the first configured grant resource is associated with the first CSI-RS/beam and the second configured grant resource is associated with the second CSI-RS/beam. In an example, the first configured grant resource and the second configured grant resource may be for the same configuration. In an example, the first configured grant resource and the second configured grant resource may be for different configurations. The switching from the first configured grant resource to the second configured grant resource may be based on beam measurements indicating that RSRP associated with the second CSI-RS (received via the second beam) being higher than an RSRP threshold and the RSRP associated with the first CSI-RS (e.g., received via the first beam) being smaller than the RSRP threshold.

In an example, a beam failure recovery process performed in response to a beam failure detection during the RRC_INACTIVE state may comprise initiating a random access process. In an example, a random access preamble/occasion/resource used in the random access process may be associated with a new SSB wherein the new SSB may be changed compared to a current serving SSB (e.g., the SSB of the beam for which beam failure is detected). The current serving SSB may be associated with/received via the current serving beam and the new SSB may be associated with/received via the new serving beam. In an example, a random access preamble/occasion/resource of the random access process may be associated with a new CSI-RS wherein the new CSI-RS may be changed compared to a current serving CSI-RS (e.g., the CSI-RS of the beam for which beam failure is detected). The current serving CSI-RS may be associated with/received via the current serving beam and the new CSI-RS may be associated with/received via the new serving beam.

Figure 20:
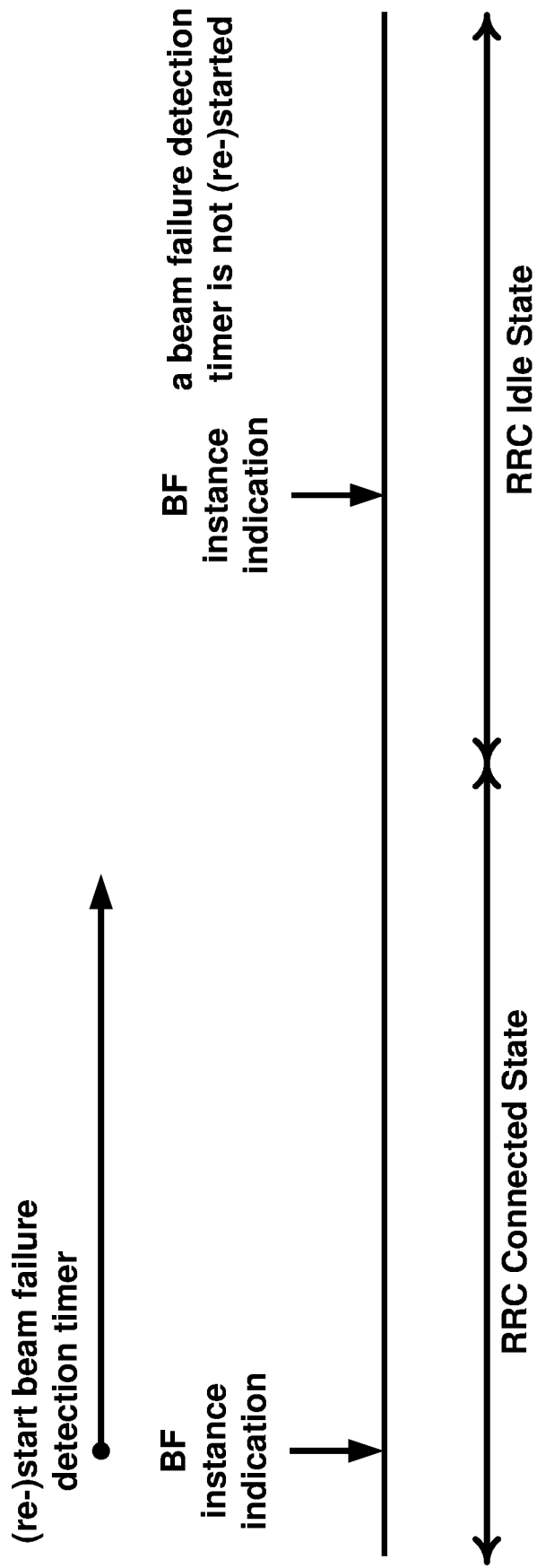
FIG. 20 shows an example process in accordance with several of various embodiments of the present disclosure.

In an example embodiment as shown in FIG. 20, a wireless device may receive one or more messages (e.g., one or more RRC messages) comprising a first configuration parameter of a beam failure detection timer value of a beam failure detection timer. The first configuration parameter may be used by the wireless device for beam failure detection during an RRC_CONNECTED state. While in the RRC_CONNECTED state and in response to reception of a beam failure instance indication, the wireless device may start a beam failure detection timer with the beam failure detection timer value. The wireless device may receive an RRC release message indicating transitioning of the wireless device from the RRC_CONNECTED state to an RRC_INACTIVE state. For example, the RRC release message may comprise a suspend config IE indicating the transitioning of the wireless device from the RRC_CONNECTED state to the RRC_INACTIVE state and comprising configuration parameters used by the wireless device while in the RRC_INACTIVE state. In response to a beam failure instance indication and while in the RRC_INACTIVE state, the wireless device may not start a beam failure detection timer. In an example, the beam failure detection during the RRC_INACTIVE state may not be based on and/or may not utilize a beam failure detection timer. A first beam failure detection during the RRC_CONNECTD state may be based on and/or utilize the beam failure detection timer and a second beam failure detection during the RRC_INACTIVE state may not be based on and/or may not utilize a beam failure detection timer.

In an example, the wireless device may increment a first beam failure instance indication counter in response to a beam failure instance indication during the RRC_CONNECTED state. The wireless device may start the beam detection timer with the value of the beam failure detection timer indicated by the first configuration parameter in response to the beam failure instance indication. In response to the beam failure detection timer expiring, the wireless device may set the beam failure instance indication counter to zero. A beam failure detection during the RRC_CONNECTED state may be based on a value of the first beam failure instance indication counter and comparing the value with a threshold (e.g., a first beam failure instance max count). In response to the first beam failure instance indication counter reaching the threshold, the wireless device may start a first beam failure recovery process. The wireless device may increment a second beam failure instance indication counter in response to a beam failure instance indication during the RRC_INACTIVE state. In an example, the wireless device may not start a beam failure detection timer in response to the beam failure instance indication. A beam failure detection during the RRC_INACTIVE state may be based on a value of the second beam failure instance indication counter and comparing the value with a threshold (e.g., a second beam failure instance max count). In response to the second beam failure instance indication counter reaching the threshold, the wireless device may start a second beam failure recovery process.

In an example, the first beam failure recovery process may comprise initiating a first random access process. In an example, a random access preamble/occasion/resource used in the first random access process may be associated with a SSB and may indicate a new serving beam, wherein the SSB may be received via the new serving beam. In an example, a random access preamble/occasion/resource used in the first random access process may be associated with a CSI-RS and may indicate a new serving beam, wherein the CSI-RS may be received via the new serving beam.

In an example, the second beam failure recovery process may comprise initiating a second random access process. In an example, a random access preamble/occasion/resource used in the second random access process may be associated with a SSB and may indicate a new serving beam, wherein the SSB may be received via the new serving beam. In an example, a random access preamble/occasion/resource used in the second random access process may be associated with a CSI-RS and may indicate a new serving beam, wherein the CSI-RS may be received via the new serving beam.

In an example, the RRC release message (e.g., a suspend config IE of the RRC release message) may comprise configuration parameters of one or more configured grant configurations used for data transmission (e.g., small data transmission, e.g., transmission of packets with limited size) during the RRC_INACTIVE state. A configured grant configuration of the one or more configured grant configurations and/or a configured grant resource associated with a configured grant configuration may be associated with a reference signal/beam (e.g., an SSB or a CSI-RS received via the beam).

In an example, the second beam failure recovery process may comprise switching from a first configured grant configuration to a second configured grant configuration, wherein the first configured grant configuration may be associated with a first synchronization signal block (SSB) and the second configured grant configuration may be associated with a second SSB. In an example, the first SSB may be associated with/received via a first beam (e.g., downlink beam) and the second SSB may be associated with/received via a second beam (e.g., downlink beam). In an example, the RRC configuration parameters (e.g., the configuration parameters of the one or more configured grant configurations configured for small data transmission during the RRC_INACTIVE state and received, for example, via the RRC release message) may indicate that the first configured grant configuration is associated with the first SSB/beam and the second configured grant configuration is associated with the second SSB/beam. The switching from the first configured grant configuration to the second configured grant configuration may be based on beam measurements indicating that RSRP associated with the second SSB (received via the second beam) being higher than an RSRP threshold and the RSRP associated with the first SSB (e.g., received via the first beam) being smaller than the RSRP threshold.

In an example, the second beam failure recovery process may comprise switching from a first configured grant configuration to a second configured grant configuration, wherein the first configured grant configuration may be associated with a first channel state information reference signal (CSI-RS) and the second configured grant configuration may be associated with a second channel state information (CSI-RS). In an example, the first CSI-RS may be associated with/received via a first beam (e.g., downlink beam) and the second CSI-RS may be associated with/received via a second beam (e.g., downlink beam). In an example, the RRC configuration parameters (e.g., the third configuration parameters of the one or more configured grant configurations configured for small data transmission during the RRC_INACTIVE state and received, for example, via the RRC release message) may indicate that the first configured grant configuration is associated with the first CSI-RS/beam and the second configured grant configuration is associated with the second CSI-RS/beam. The switching from the first configured grant configuration to the second configured grant configuration may be based on beam measurements indicating that RSRP associated with the second CSI-RS (received via the second beam) being higher than an RSRP threshold and the RSRP associated with the first CSI-RS (e.g., received via the first beam) being smaller than the RSRP threshold.

In an example, the second beam failure recovery process may comprise switching from a first configured grant resource to a second configured grant resource, wherein the first configured grant resource may be associated with a first synchronization signal block (SSB) and the second configured grant resource may be associated with a second SSB. In an example, the first SSB may be associated with/received via a first beam (e.g., downlink beam) and the second SSB may be associated with/received via a second beam (e.g., downlink beam). In an example, the RRC configuration parameters (e.g., the third configuration parameters of the one or more configured grant configurations configured for small data transmission during the RRC_INACTIVE state and received, for example, via the RRC release message) may indicate that the first configured grant resource is associated with the first SSB/beam and the second configured grant resource is associated with the second SSB/beam. In an example, the first configured grant resource and the second configured grant resource may be for the same configuration. In an example, the first configured grant resource and the second configured grant resource may be for different configurations. The switching from the first configured grant resource to the second configured grant resource may be based on beam measurements indicating that RSRP associated with the second SSB (received via the second beam) being higher than an RSRP threshold and the RSRP associated with the first SSB (e.g., received via the first beam) being smaller than the RSRP threshold.

In an example, the second beam failure recovery process may comprise switching from a first configured grant resource to a second configured grant resource, wherein the first configured grant resource may be associated with a first channel state information reference signal (CSI-RS) and the second configured grant resource may be associated with a second channel state information (CSI-RS). In an example, the first CSI-RS may be associated with/received via a first beam (e.g., downlink beam) and the second CSI-RS may be associated with/received via a second beam (e.g., downlink beam). In an example, the RRC configuration parameters (e.g., the third configuration parameters of the one or more configured grant configurations configured for small data transmission during the RRC_INACTIVE state and received, for example, via the RRC release message) may indicate that the first configured grant resource is associated with the first CSI-RS/beam and the second configured grant resource is associated with the second CSI-RS/beam. In an example, the first configured grant resource and the second configured grant resource may be for the same configuration. In an example, the first configured grant resource and the second configured grant resource may be for different configurations. The switching from the first configured grant resource to the second configured grant resource may be based on beam measurements indicating that RSRP associated with the second CSI-RS (received via the second beam) being higher than an RSRP threshold and the RSRP associated with the first CSI-RS (e.g., received via the first beam) being smaller than the RSRP threshold.

Figure 21:
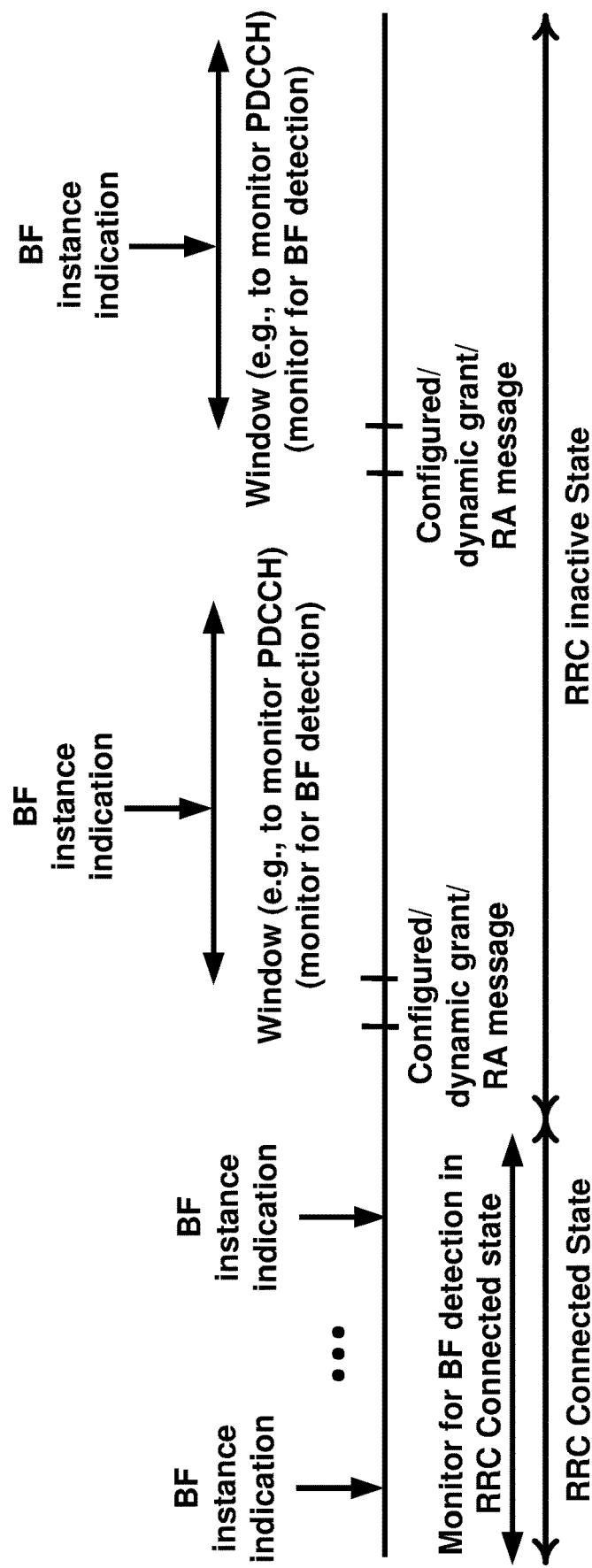
FIG. 21 shows an example process in accordance with several of various embodiments of the present disclosure.

In an example embodiment as shown in FIG. 21, a wireless device may receive one or more messages (e.g., one or more RRC messages) comprising first configuration parameters for beam failure detection and/or beam failure recovery. The first configuration parameters may be used by the wireless device while the wireless device is in an RRC_CONNECTD state. The wireless device may monitor reference signals (e.g., SSB and/or CSI-RS) associated with/received via a plurality of beams and may monitor the reference signals for beam failure detection during the RRC_CONNECTED state. The reference signals monitoring and the beam-related measurements may be continuously performed by the wireless device in the RRC_CONNECTED state. For example, the reference signals monitoring and the beam-related measurements performed in the RRC_CONNECTED state may be independent of uplink transmissions (e.g., uplink packet/TB transmissions, e.g., timings of uplink packets/TBs transmissions) during the RRC_CONNECTED state. The wireless device may receive an RRC release message, wherein the RRC release message (e.g., a suspend config IE of the RRC release message) may indicate transitioning of the wireless device from the RRC_CONNECTED state to an RRC_INACTIVE state. The suspend config IE may comprise configuration parameters for wireless device operation (e.g., beam failure detection and/or recovery, etc.). For example, the RRC release message (e.g., the suspend config IE of the RRC release message) may comprise configuration parameters of one or more configured grant configurations used for data transmission (e.g., small data transmission, e.g., transmission of small packets with limited size) during the RRC_INACTIVE state. For example, the RRC release message (e.g., the suspend config IE of the RRC release message) may comprise random access configuration parameters of random access processes used for data transmission (e.g., small data transmission, e.g., transmission of small packets with limited size) during the RRC_INACTIVE state. While in the RRC_INACTIVE state, the wireless device may transmit a transport block (TB). In an example, the transmission of the TB may be based on a configured grant resource associated with a configured grant configuration of the one or more configured grant configurations. In an example, the transmission of the TB may be based on a random access process (e.g., a Msg A of a two-step random access process or a Msg 3 of a four-step random access process). In an example, transmission of the TB may be based on a dynamic grant. The wireless device may receive a DCI comprising the dynamic grant indicating transmission parameters for transmission of the TB.

The wireless device may determine a time window for beam failure detection and related beam/reference signal measurements, wherein the time window (e.g., a starting time and/or an ending time of the time window) may be based on a timing of transmission of the TB. The wireless device may determine the staring time and/or the ending time of the time window based on the timing of transmission of the TB. For example, the wireless device may transmit the TB via one or more symbols of a slot. A starting time or an ending time of the time window may be based on a first symbols of the one or more symbols. For example, a starting time of the time window may be based on a last symbol of the one or more symbols used in transmission of the TB. For example, a starting time of the time window may be an offset from the last symbol of the one or more symbols used in transmission of the TB. For example, the RRC release message (e.g., a suspend config IE of the RRC release message) may comprise a configuration parameter indicating the offset. For example, the starting time of the time window may be the last symbol of the one or more symbols used in transmission of the TB. A duration of the time window may be a first number of symbols/slots. For example, the RRC release message (e.g., a suspend config IE of the RRC release message) may comprise a configuration parameter indicating the duration of the time window.

Figure 22:
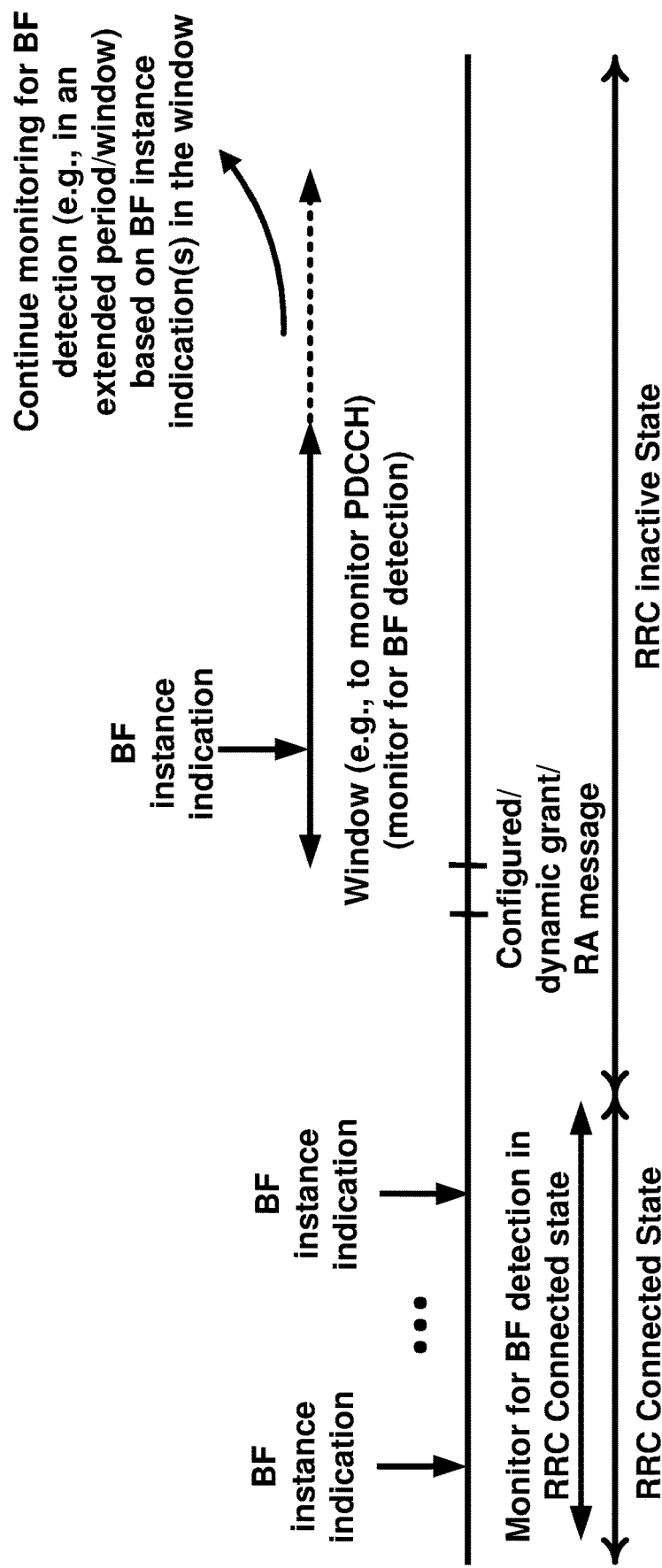
FIG. 22 shows an example process in accordance with several of various embodiments of the present disclosure.

In an example, the time window may comprise a first time window associated with monitoring downlink control channel (e.g., PDCCH) in response to transmission of the TB. The wireless device may monitor the downlink control channel during the first time window to receive a grant for a subsequent transmission (e.g., retransmission of the TB) in response to transmission of the TB, for example due to unsuccessful reception of the TB at the base station. In an example, the time window may be the first time window and the time window for beam failure detection and the related reference signals measurement may be the duration/window/period following the transmission of the TB wherein the PDCCH is monitored for reception of a grant for subsequent transmission/retransmission of the TB. In an example, as shown in FIG. 22, the wireless device may determine to extend the beam failure detection and the related beam/reference signals measurements after the first time window (e.g., the first time window to monitor PDCCH for receiving a grant for subsequent transmission (e.g., retransmission of the TB) in response to transmission of the TB) based on a number of beam failure detections or beam failure instance indications during the first time window. For example, based on the number of beam failure detections or beam failure instance indications during the first time window being equal to or larger than N (e.g., 1, 2, . . . ), the wireless device may continue beam failure detections and the related beam/reference signals measurements after the first time window. In an example, the wireless device may determine to extend the beam failure detection and the related beam/reference signals measurements after the first time window based on at least one beam failure detection or beam failure instance indication during the first time window. In an example, the wireless device may not extend the beam failure detection and the related beam/reference signals measurements in response to no beam failure detection or no beam failure instance indication during the first time window.

The wireless device may monitor for beam failure detection (e.g., may measure reference signals (e.g., SSB and/or CSI-RS) associated with/received via one or more downlink beams) during the time window. The monitoring for beam failure detection may comprise measuring/monitoring one or more reference signals (e.g., SSB and/or CSI-RS) associated with/received via one or more beams comprising one or more current serving beams.

Figure 23:
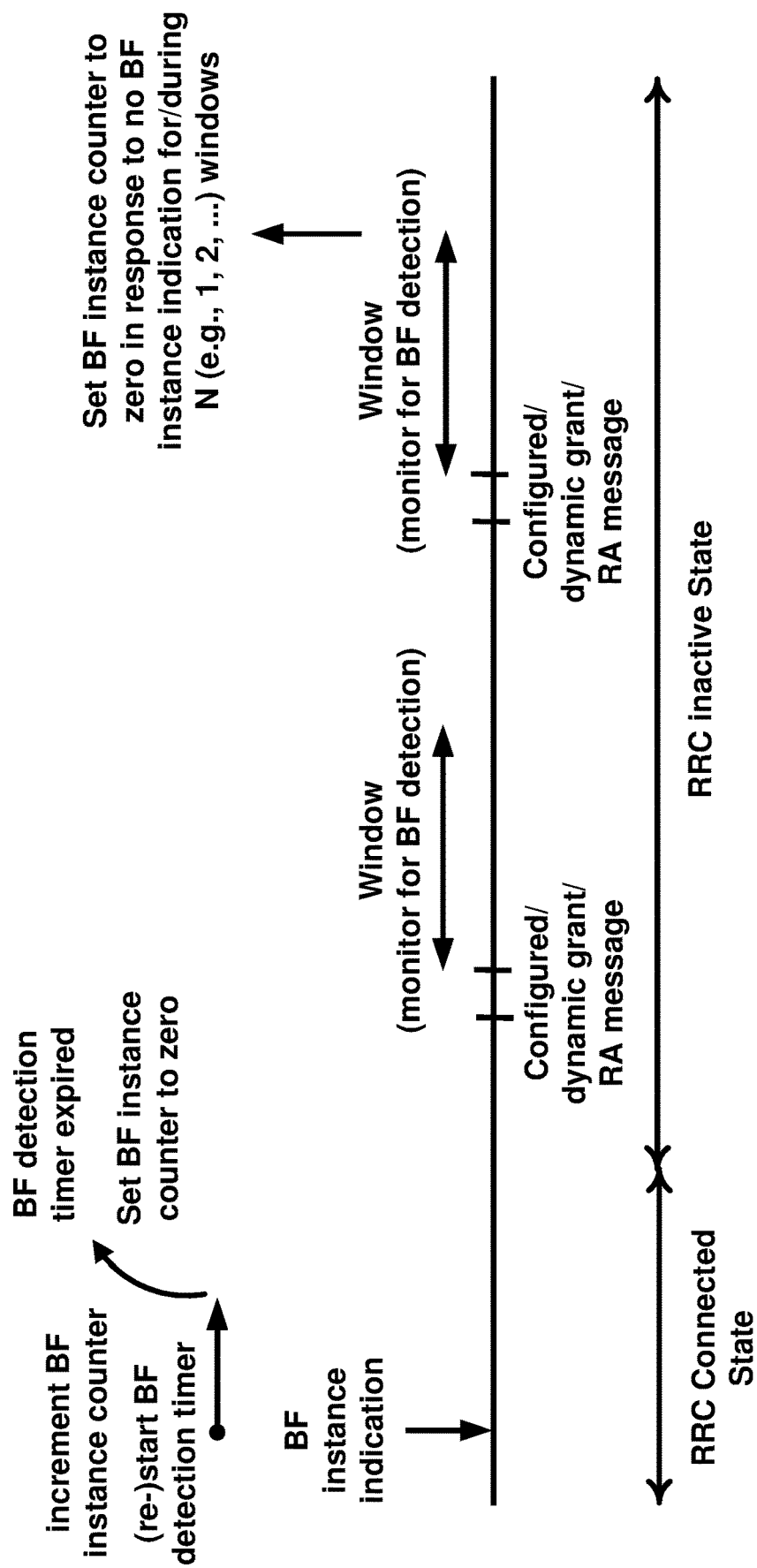
FIG. 23 shows an example process in accordance with several of various embodiments of the present disclosure.

In an example embodiment as shown in FIG. 23, a wireless device may receive one or more messages (e.g., one or more RRC messages) comprising first configuration parameters for beam failure detection and/or beam failure recovery. The first configuration parameters may be used by the wireless device while the wireless device is in an RRC_CONNECTD state. While in the RRC_CONNECTED state, the wireless device may increment a beam failure instance indication counter in response to a beam failure instance indication. The wireless device may start a beam failure detection timer in response to the beam failure instance indication. The wireless device may set the beam failure instance indication counter to zero based on the beam failure detection timer expiring. The wireless device may receive an RRC release message, wherein the RRC release message (e.g., a suspend config IE of the RRC release message) may indicate transitioning of the wireless device from the RRC_CONNECTED state to an RRC_INACTIVE state. The suspend config IE may comprise configuration parameters for wireless device operation (e.g., beam failure detection and/or recovery, etc.). For example, the RRC release message (e.g., the suspend config IE of the RRC release message) may comprise configuration parameters of one or more configured grant configurations used for data transmission (e.g., small data transmission, e.g., transmission of small packets with limited size) during the RRC_INACTIVE state. For example, the RRC release message (e.g., the suspend config IE of the RRC release message) may comprise random access configuration parameters of random access processes used for data transmission (e.g., small data transmission, e.g., transmission of small packets with limited size) during the RRC_INACTIVE state. For example, the random access configuration parameters may indicate random access occasions/resources/preamble for random access processes during the RRC_INACTIVE state. While in the RRC_INACTIVE state, the wireless device may transmit one or more transport blocks (TBs). In an example, transmission of one or more first TBs of the one or more TBs may be based on configuration parameters of the one or more configured grant configurations. In an example, transmission of one or more first TBs of the one or more TBs may be based on one or more random access processes (e.g., Msg A in two-step random access processes or Msg 3 in four-step random access processes) and based on the random access configuration parameters. In an example, transmission of one or more first TBs of the one or more TBs may be based on one or more dynamic grants. The wireless device may receive one or more DCIs indicating the one or more dynamic grants.

The wireless device may determine one or more time windows, corresponding to the one or more TBs, for beam failure detection and related beam/reference signal measurements. The one or more time windows (e.g., starting times and/or an ending times of the one or more time windows) may be based on timings of transmissions of the one or more TBs. The wireless device may determine a staring time and/or an ending time of a time window, in the one or more time windows, based on the timing of transmission of a corresponding TB. For example, the wireless device may transmit a TB, in the one or more TBs, via one or more symbols of a slot. A starting time or an ending time of a time window, corresponding to the TB, may be based on a first symbols of the one or more symbols. For example, a starting time of the time window may be based on a last symbol of the one or more symbols used in transmission of the TB. For example, a starting time of the time window may be an offset from the last symbol of the one or more symbols used in transmission of the TB. For example, the RRC release message (e.g., a suspend config IE of the RRC release message) may comprise a configuration parameter indicating the offset. For example, the starting time of the time window may be the last symbol of the one or more symbols used in transmission of the TB. A duration of the time window may be a first number of symbols/slots. For example, the RRC release message (e.g., a suspend config IE of the RRC release message) may comprise a configuration parameter indicating the duration of the time window.

Figure 24:
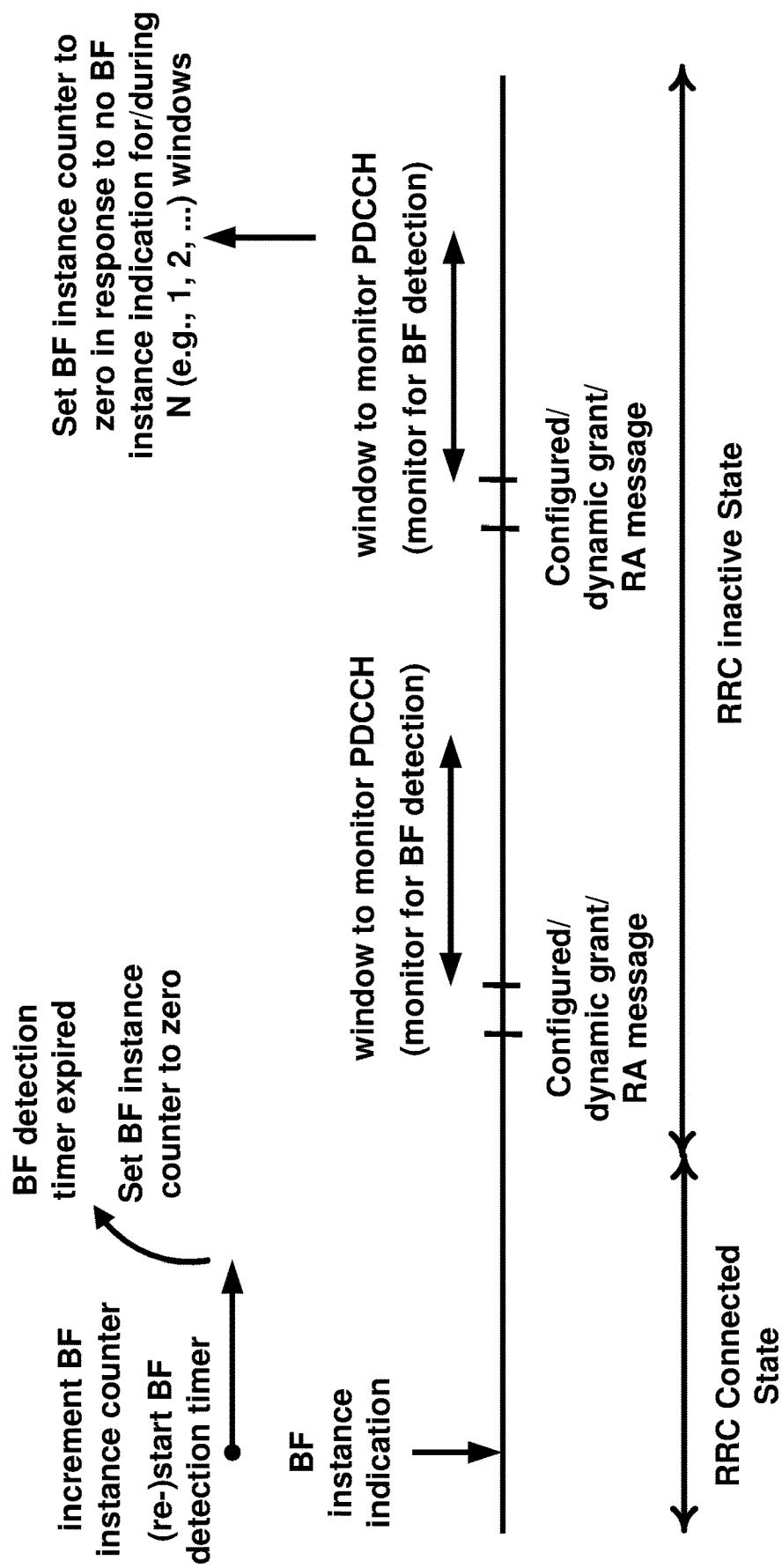
FIG. 24 shows an example process in accordance with several of various embodiments of the present disclosure.

In an example as shown in FIG. 24, a time window, in the one or more time windows, may comprise a first time window associated with monitoring downlink control channel (e.g., PDCCH) in response to transmission of the TB. The wireless device may monitor the downlink control channel during the first time window to receive a grant for a subsequent transmission (e.g., retransmission of the TB) in response to transmission of the TB, for example due to unsuccessful reception of the TB at the base station.

While in the RRC_INACTIVE state, the wireless device may increment a beam failure instance indication counter in response to a beam failure instance indication. The beam failure instance indication may be during the one or more time windows associated with the one or more TBs in which the beam failure detection and beam/reference signal related measurements is performed. The wireless device set the beam failure instance indication counter to zero in response to no beam failure instance indications during the one or more time windows, for example, during N (e.g., 1, 2, . . . ) time windows (e.g., N consecutive time windows) associated with the one or more TBs (e.g., N consecutive TBs) transmitted during the RRC_INACTIVE state. In an example, the RRC release message (e.g., a suspend config IE of the RRC release message) may indicate the value of N.

Figure 25:
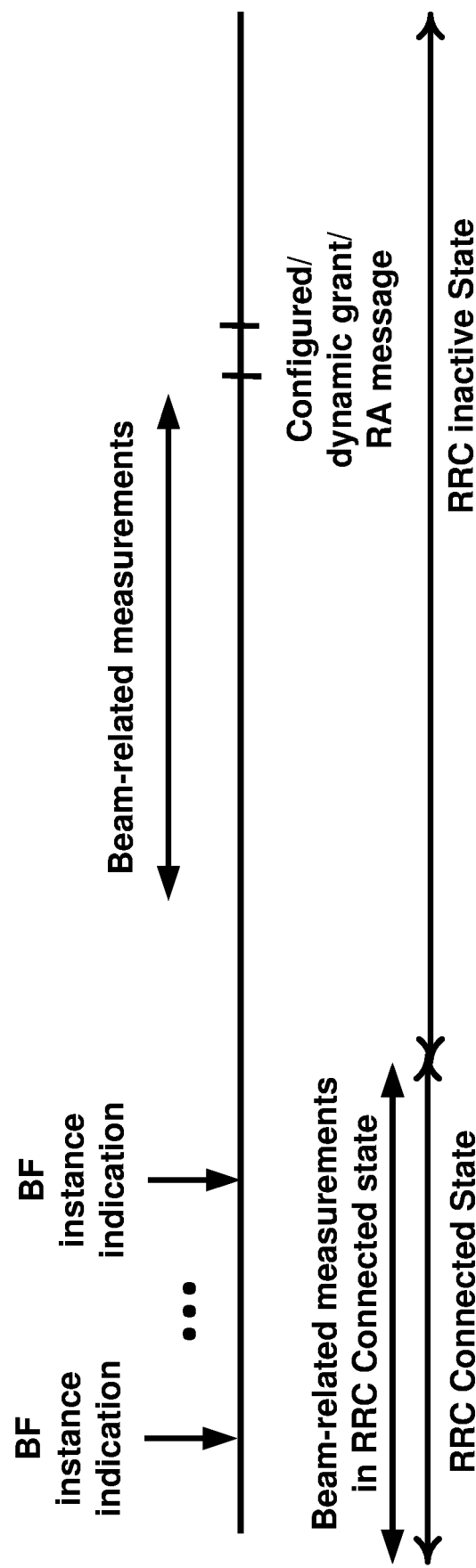
FIG. 25 shows an example process in accordance with several of various embodiments of the present disclosure.

In an example embodiment as shown in FIG. 25, a wireless device may receive one or more messages (e.g., one or more RRC messages) comprising first configuration parameters for beam failure detection and/or beam failure recovery. The first configuration parameters may be used by the wireless device while the wireless device is in an RRC_CONNECTD state. While in the RRC_CONNECTED state, the wireless device may increment a beam failure instance indication counter in response to a beam failure instance indication. The wireless device may receive an RRC release message, wherein the RRC release message (e.g., a suspend config IE of the RRC release message) may indicate transitioning of the wireless device from the RRC_CONNECTED state to an RRC_INACTIVE state. The suspend config IE may comprise configuration parameters for wireless device operation (e.g., beam failure detection and/or recovery, etc.). For example, the RRC release message (e.g., the suspend config IE of the RRC release message) may comprise configuration parameters of one or more configured grant configurations used for data transmission (e.g., small data transmission, e.g., transmission of small packets with limited size) during the RRC_INACTIVE state. For example, the RRC release message (e.g., the suspend config IE of the RRC release message) may comprise random access configuration parameters of random access processes used for data transmission (e.g., small data transmission, e.g., transmission of small packets with limited size) during the RRC_INACTIVE state. For example, the random access configuration parameters may indicate random access occasions/resources/preamble for random access processes during the RRC_INACTIVE state. While in the RRC_INACTIVE state, the wireless device may determine a timing of a scheduled uplink transmission (e.g., a TB). In an example, the wireless device may determine the timing of the scheduled uplink transmission based on the configuration parameters of the one or more configured grant configurations in response to the scheduled uplink transmission being via a configured grant resource. In an example, the wireless device may determine the timing of the scheduled uplink transmission, wherein the scheduled uplink transmission may be via a Msg A (of a two-step random access process) or via a Msg 3 (of a four-step random access process), for example based on the random access configuration parameters. In an example, the wireless device may determine the timing of the scheduled uplink transmission based on a DCI (e.g., resource assignment parameters in the DCI) in response to the scheduled uplink transmission being scheduled by a dynamic grant of the DCI.

The wireless device may perform beam-related measurements, while in the RRC_INACTIVE state, during a time window that is based on the timing of the scheduled uplink transmission. The beam-related measurements may comprise measuring reference signals (e.g., SSB or CSI-RS) associated with/received via a plurality of downlink beams comprising a current serving downlink beam. In an example, the wireless device may perform the beam-related measurements to determine/detect beam failure for a current serving downlink beam or to determine whether the current serving downlink beam is subject to beam failure. In an example, based on the beam-related measurements, the wireless device may determine a first downlink beam from a plurality of downlink beams. In an example, the wireless device may use the determined first downlink beam for reception of downlink control information following transmission of the scheduled uplink transmission. The wireless device may receive PDCCH carrying downlink control information comprising an uplink grant for retransmission/subsequent transmission of the uplink transmission.

The determining the time window may comprise determining a starting time and an ending time of the time window. In an example, the starting time of the time window may be an offset before the starting time of the scheduled uplink transmission. The offset may be a configurable parameter or a pre-determined/pre-configured value. For example, the RRC release message (e.g., a suspend config IE of the RRC release message) may comprise a configuration parameter indicating the offset (for example, in a number of symbols). In an example, the offset may be based on wireless device capability.

In an example, the ending time of the time window may be an offset before the starting time of the scheduled uplink transmission. The offset may be a configurable parameter or a pre-determined/pre-configured value. For example, the RRC release message (e.g., a suspend config IE of the RRC release message) may comprise a configuration parameter indicating the offset (for example, in a number of symbols). In an example, the offset may be based on wireless device capability.

In an example, the transmission of the scheduled uplink transmission (e.g., TB) may be via one or more symbol. The ending time of the time window may be the first/starting symbol of the one or more symbols.

In an example, the transmission of the scheduled uplink transmission (e.g., TB) may be via one or more symbol. The starting time of the time window may be an offset (e.g., in a number of symbols) after the last/ending symbol of the one or more symbols. The offset may be a configurable parameter or a pre-determined/pre-configured value. For example, the RRC release message (e.g., a suspend config IE of the RRC release message) may comprise a configuration parameter indicating the offset (for example, in a number of symbols). In an example, the offset may be based on wireless device capability.

Figure 26:
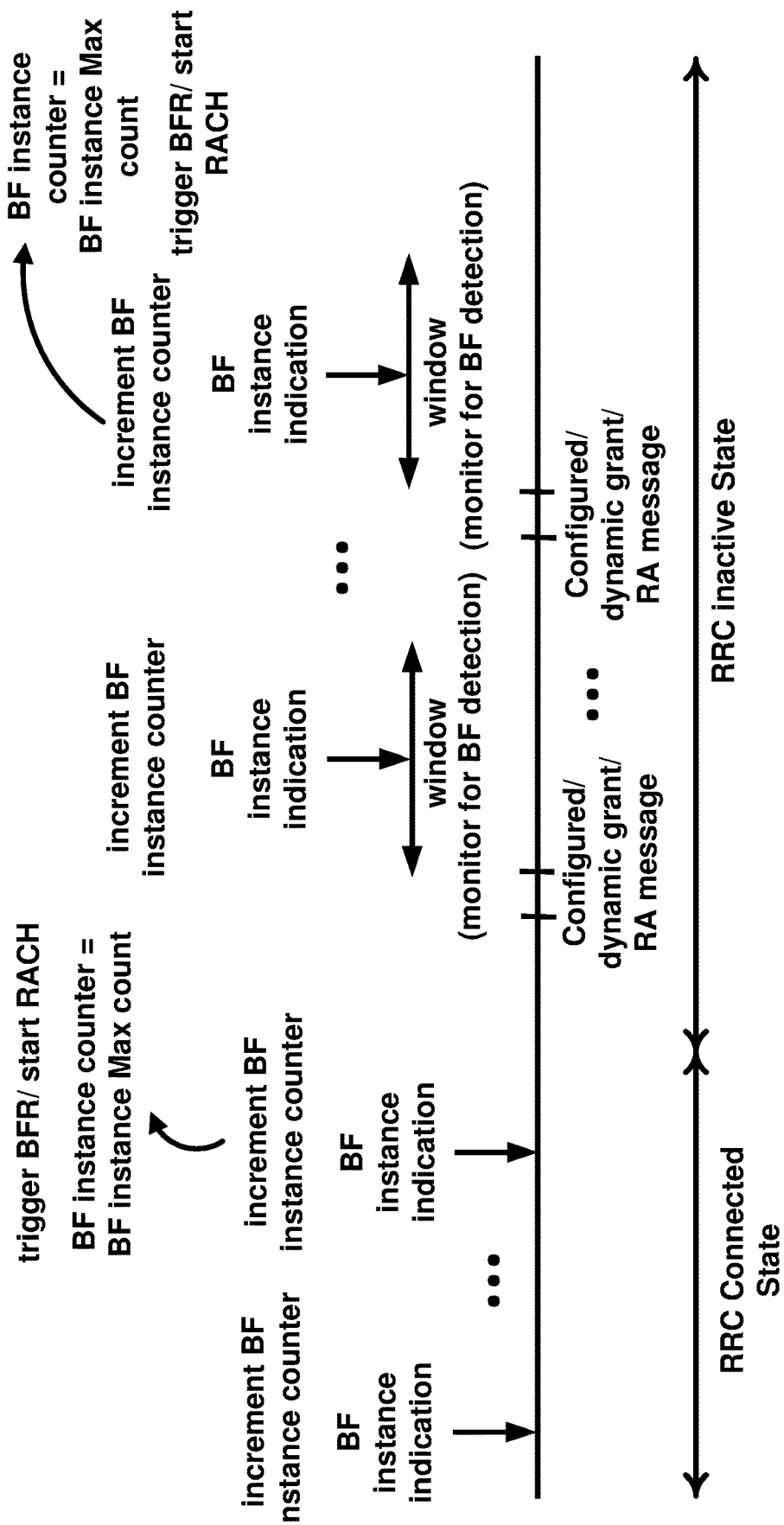
FIG. 26 shows an example process in accordance with several of various embodiments of the present disclosure.

In an example embodiment as shown in FIG. 26, a wireless device may receive one or more messages (e.g., one or more RRC messages) comprising first configuration parameters for beam failure detection and/or beam failure recovery. The first configuration parameters may be used by the wireless device while the wireless device is in an RRC_CONNECTD state. The first configuration parameters may comprise a threshold (e.g., a beam failure instance max count) for beam failure detection. While in the RRC_CONNECTED state, the wireless device may increment a beam failure instance indication counter in response to a beam failure instance indication. In response to the beam failure instance indication counter reaching the threshold, the wireless device start/trigger a beam failure recovery procedure.

The wireless device may receive an RRC release message, wherein the RRC release message (e.g., a suspend config IE of the RRC release message) may indicate transitioning of the wireless device from the RRC_CONNECTED state to an RRC_INACTIVE state. The suspend config IE may comprise configuration parameters for wireless device operation (e.g., beam failure detection and/or recovery, etc.). For example, the RRC release message (e.g., the suspend config IE of the RRC release message) may comprise configuration parameters of one or more configured grant configurations used for data transmission (e.g., small data transmission, e.g., transmission of small packets with limited size) during the RRC_INACTIVE state. For example, the RRC release message (e.g., the suspend config IE of the RRC release message) may comprise random access configuration parameters of random access processes used for data transmission (e.g., small data transmission, e.g., transmission of small packets with limited size) during the RRC_INACTIVE state. For example, the random access configuration parameters may indicate random access occasions/resources/preambles for random access processes during the RRC_INACTIVE state. While in the RRC_INACTIVE state, the wireless device may transmit a TB. In an example, the wireless device may transmit the TB via a configured grant resource based on the configuration parameters of the one or more configured grant configurations. In an example, the wireless device may transmit the TB based on a random access message (e.g., a Msg A of a two-step random access process or a Msg 3 of a four-step random access process) and based on the random access configuration parameters. In an example, the wireless device may transmit the TB based on a dynamic grant and the wireless device may receive a DCI comprising the dynamic grant indicating transmission parameters of the TB.

The wireless device may determine a time window for beam failure detection and related beam/reference signal measurements, wherein the time window (e.g., a starting time and/or an ending time of the time window) may be based on a timing of transmission of the TB. The wireless device may determine the staring time and/or the ending time of the time window based on the timing of transmission of the TB. For example, the wireless device may transmit the TB via one or more symbols of a slot. A starting time or an ending time of the time window may be based on a first symbols of the one or more symbols. For example, a starting time of the time window may be based on a last symbol of the one or more symbols used in transmission of the TB. For example, a starting time of the time window may be an offset from the last symbol of the one or more symbols used in transmission of the TB. For example, the RRC release message (e.g., a suspend config IE of the RRC release message) may comprise a configuration parameter indicating the offset. For example, the starting time of the time window may be the last symbol of the one or more symbols used in transmission of the TB. A duration of the time window may be a first number of symbols/slots. For example, the RRC release message (e.g., a suspend config IE of the RRC release message) may comprise a configuration parameter indicating the duration of the time window.

Figure 27:
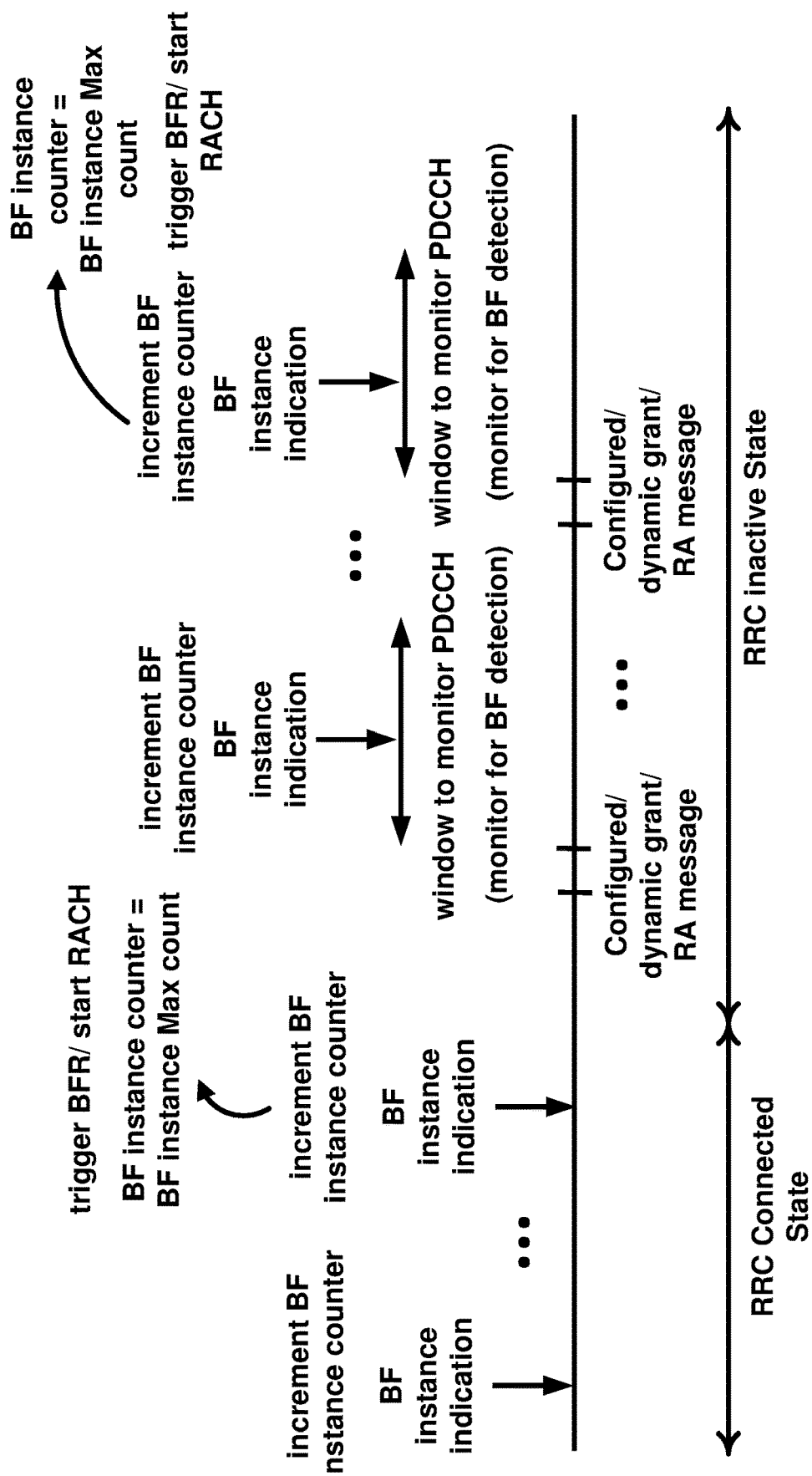
FIG. 27 shows an example process in accordance with several of various embodiments of the present disclosure.

In an example as shown in FIG. 27, the time window may comprise a first time window associated with monitoring downlink control channel (e.g., PDCCH) in response to transmission of the TB. The wireless device may monitor the downlink control channel during the first time window to receive a grant for a subsequent transmission (e.g., retransmission of the TB) in response to transmission of the TB, for example due to unsuccessful reception of the TB at the base station. In an example, the time window may be the first time window and the time window for beam failure detection and the related reference signals measurement may be the duration/window/period following the transmission of the TB wherein the PDCCH is monitored for reception of a grant for subsequent transmission/retransmission of the TB.

While in the RRC_INACTIVE state, the wireless device may monitor for the beam failure detection during the time window. While in the RRC_INACTIVE state, the wireless device may monitor for the beam failure detection during time windows associated with the transmitted TBs. In an example, the time windows associated with the transmitted TBs may be the durations/windows/periods following the transmission of the TBs wherein the PDCCH is monitored for reception of grant for subsequent transmission/retransmission of the TBs.

For example, the wireless device may measure reference signals (e.g., SSB or CSI-RS) associated with/received via one or more downlink beams comprising the current serving downlink beam. The wireless device may increment a beam failure instance indication counter in response to a beam failure instance indication. The wireless device may trigger/initiate a beam failure recovery procedure in response to the beam failure instance indication counter reaching a threshold (e.g., a beam failure instance max count). The beam failure recovery during the RRC_INACTIVE state may be based on switching a configured grant configuration and/or configured grant resource, wherein the configured grant configuration/resource may be associated with a new downlink beam and its corresponding SSB/CSI-RS.

Figure 28:
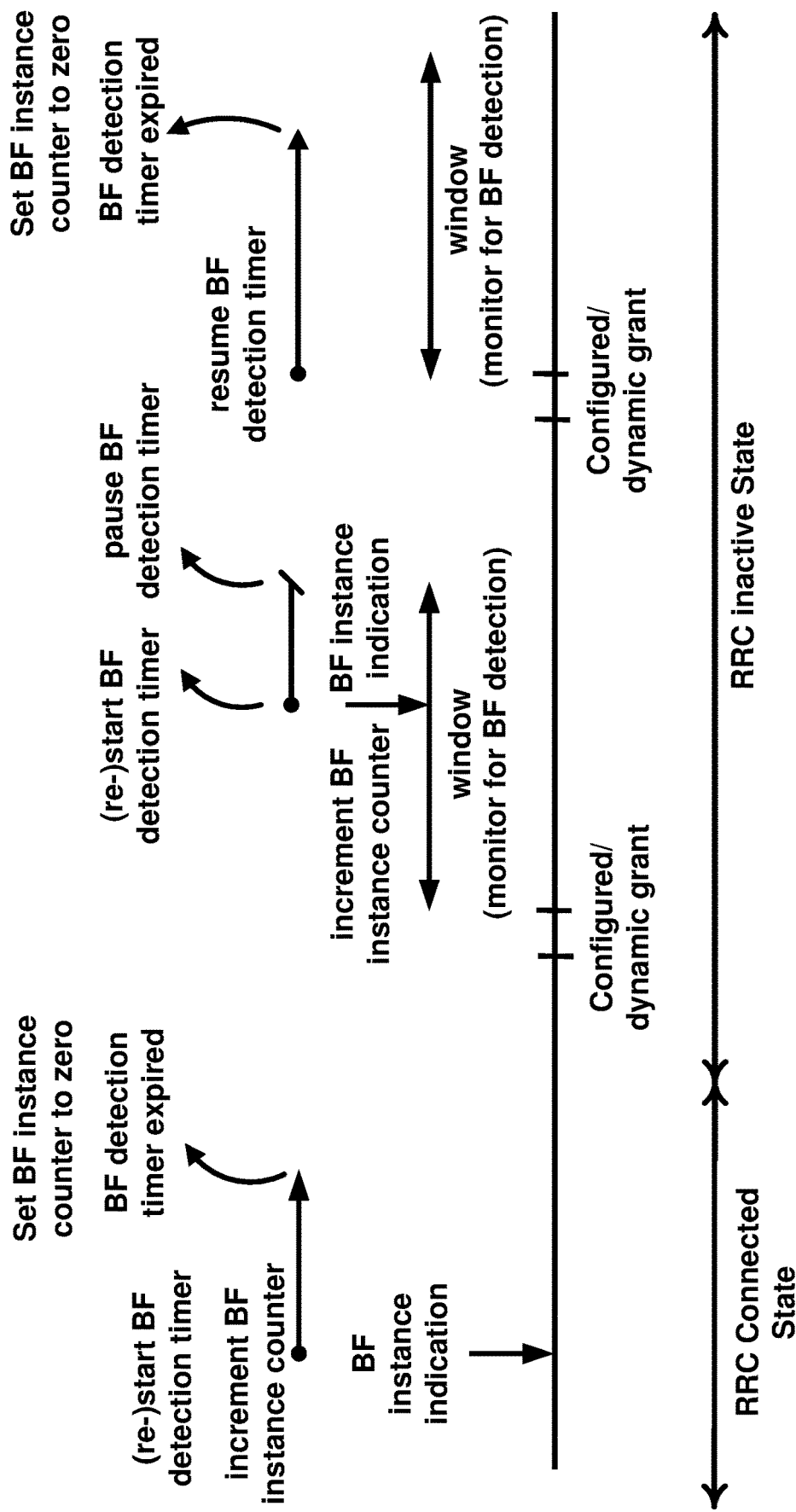
FIG. 28 shows an example process in accordance with several of various embodiments of the present disclosure.

In an example embodiment, as shown in FIG. 28, a wireless device may receive one or more messages (e.g., one or more RRC messages) comprising first configuration parameters for beam failure detection and/or beam failure recovery. The first configuration parameters may be used by the wireless device while the wireless device is in an RRC_CONNECTD state. The first configuration parameters may comprise a first configuration parameter indicating a beam failure detection timer value for a beam failure detection timer. In response to a bam failure instance indication, the wireless device may increment a beam failure instance indication counter and may start the beam failure detection timer with the beam failure detection timer value. The wireless device may set the beam failure instance indication counter to zero in response to the beam failure detection timer expiring. The wireless device may receive an RRC release message, wherein the RRC release message (e.g., a suspend config IE of the RRC release message) may indicate transitioning of the wireless device from the RRC_CONNECTED state to an RRC_INACTIVE state. The suspend config IE may comprise configuration parameters for wireless device operation (e.g., beam failure detection and/or recovery, etc.). For example, the RRC release message (e.g., the suspend config IE of the RRC release message) may comprise configuration parameters of one or more configured grant configurations used for data transmission (e.g., small data transmission, e.g., transmission of small packets with limited size) during the RRC_INACTIVE state. For example, the RRC release message (e.g., the suspend config IE of the RRC release message) may comprise random access configuration parameters of random access processes used for data transmission (e.g., small data transmission, e.g., transmission of small packets with limited size) during the RRC_INACTIVE state. For example, the random access configuration parameters may indicate random access occasions/resources/preambles for random access processes during the RRC_INACTIVE state.

While in the RRC_INACTIVE state, the wireless device may transmit a first TB. In an example, the wireless device may transmit the first TB via a configured grant resource based on the configuration parameters of the one or more configured grant configurations. In an example, the wireless device may transmit the first TB based on a random access message (e.g., a Msg A of a two-step random access process or a Msg 3 of a four-step random access process) and based on the random access configuration parameters. In an example, the wireless device may transmit the first TB based on a dynamic grant and the wireless device may receive a DCI comprising the dynamic grant indicating transmission parameters of the first TB.

The wireless device may determine a first time window for beam failure detection and related beam/reference signal measurements, wherein the first time window (e.g., a starting time and/or an ending time of the first time window) may be based on a timing of transmission of the first TB. The wireless device may determine the staring time and/or the ending time of the first time window based on the timing of transmission of the first TB. For example, the wireless device may transmit the first TB via one or more symbols of a slot. A starting time or an ending time of the first time window may be based on a first symbols of the one or more symbols. For example, a starting time of the first time window may be based on a last symbol of the one or more symbols used in transmission of the first TB. For example, a starting time of the first time window may be an offset from the last symbol of the one or more symbols used in transmission of the first TB. For example, the RRC release message (e.g., a suspend config IE of the RRC release message) may comprise a configuration parameter indicating the offset. For example, the starting time of the first time window may be the last symbol of the one or more symbols used in transmission of the first TB. A duration of the first time window may be a first number of symbols/slots. For example, the RRC release message (e.g., a suspend config IE of the RRC release message) may comprise a configuration parameter indicating the duration of the first time window.

While in the RRC_INACTIVE state, the wireless device may transmit a second TB. In an example, the wireless device may transmit the second TB via a configured grant resource based on the configuration parameters of the one or more configured grant configurations. In an example, the wireless device may transmit the second TB based on a random access message (e.g., a Msg A of a two-step random access process or a Msg 3 of a four-step random access process) and based on the random access configuration parameters. In an example, the wireless device may transmit the second TB based on a dynamic grant and the wireless device may receive a DCI comprising the dynamic grant indicating transmission parameters of the second TB.

The wireless device may determine a second time window for beam failure detection and related beam/reference signal measurements, wherein the second time window (e.g., a starting time and/or an ending time of the second time window) may be based on a timing of transmission of the second TB. The wireless device may determine the staring time and/or the ending time of the second time window based on the timing of transmission of the second TB. For example, the wireless device may transmit the second TB via one or more symbols of a slot. A starting time or an ending time of the second time window may be based on a first symbols of the one or more symbols. For example, a starting time of the second time window may be based on a last symbol of the one or more symbols used in transmission of the second TB. For example, a starting time of the second time window may be an offset from the last symbol of the one or more symbols used in transmission of the second TB. For example, the RRC release message (e.g., a suspend config IE of the RRC release message) may comprise a configuration parameter indicating the offset. For example, the starting time of the second time window may be the last symbol of the one or more symbols used in transmission of the second TB. A duration of the second time window may be a first number of symbols/slots. For example, the RRC release message (e.g., a suspend config IE of the RRC release message) may comprise a configuration parameter indicating the duration of the second time window.

Figure 29:
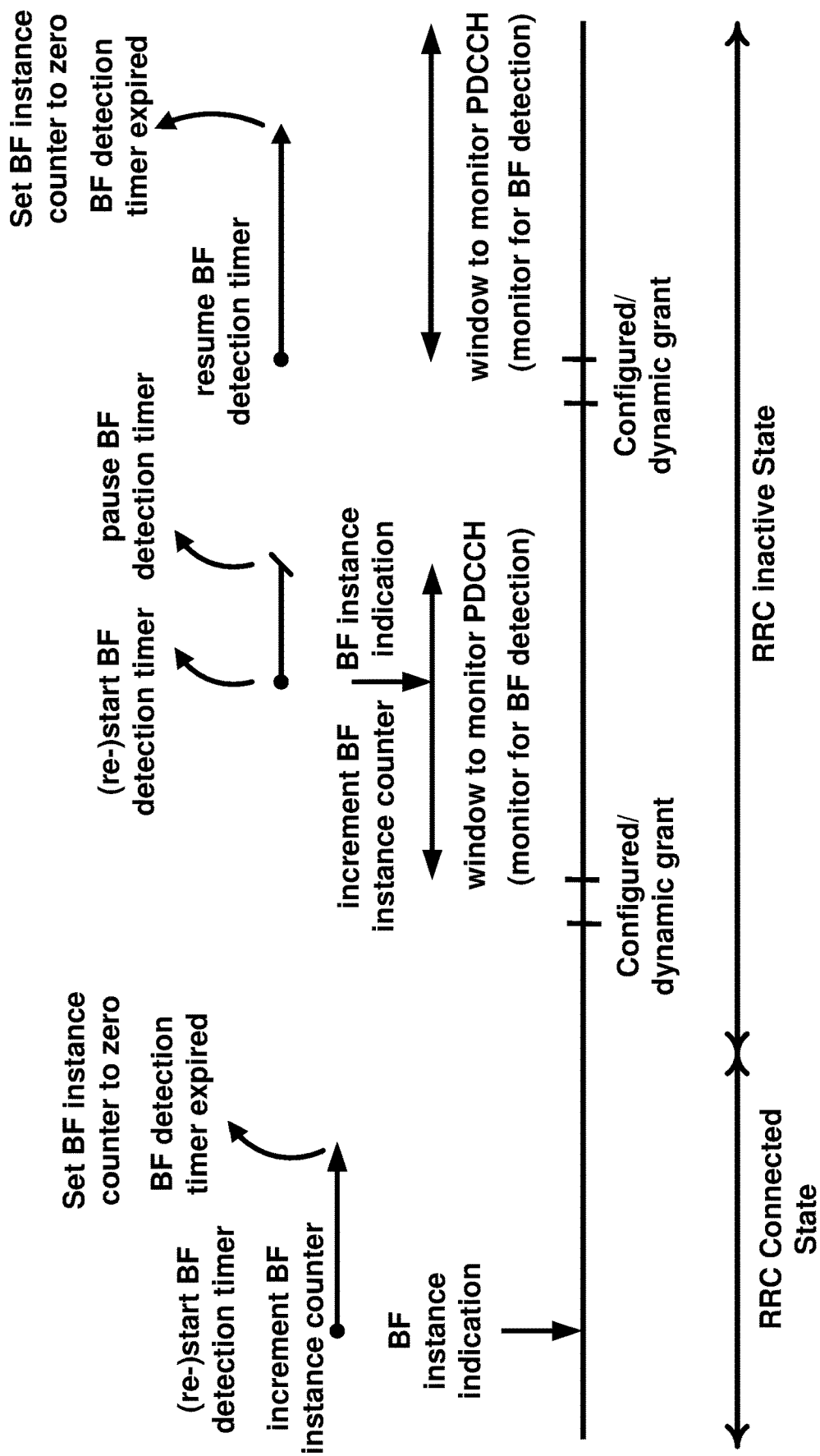
FIG. 29 shows an example process in accordance with several of various embodiments of the present disclosure.

In an example as shown in FIG. 29, the first time window may comprise a first PDCCH monitoring time window associated with monitoring downlink control channel (e.g., PDCCH) in response to transmission of the first TB. The wireless device may monitor the downlink control channel during the first PDCCH monitoring time window to receive a grant for a subsequent transmission (e.g., retransmission of the first TB) in response to transmission of the first TB, for example due to unsuccessful reception of the first TB at the base station. In an example, the first time window may be the first PDCCH monitoring time window and the first time window for beam failure detection and the related reference signals measurement may be the duration/window/period following the transmission of the first TB wherein the PDCCH is monitored for reception of a grant for subsequent transmission/retransmission of the first TB. The second time window may comprise a second PDCCH monitoring time window associated with monitoring downlink control channel (e.g., PDCCH) in response to transmission of the second TB. The wireless device may monitor the downlink control channel during the second PDCCH monitoring time window to receive a grant for a subsequent transmission (e.g., retransmission of the second TB) in response to transmission of the second TB, for example due to unsuccessful reception of the second TB at the base station. In an example, the second time window may be the second PDCCH monitoring time window and the second time window for beam failure detection and the related reference signals measurement may be the duration/window/period following the transmission of the second TB wherein the PDCCH is monitored for reception of a grant for subsequent transmission/retransmission of the second TB.

While in the RRC_INACTIVE state, the wireless device may monitor for the beam failure detection during the first time window. For example, the wireless device may measure reference signals (e.g., SSB or CSI-RS) associated with/received via one or more downlink beams comprising the current serving downlink beam. In response to a beam failure instance indication, the wireless device may increment a beam failure instance indication counter and may start a beam failure detection timer. The wireless device may pause the beam failure detection timer in response to the first time window elapsing. The wireless device may resume the beam failure detection timer at the beginning of the second time window. The wireless device may set the beam failure instance indication counter to zero in response to the beam failure detection timer expiring.

Figure 30A:
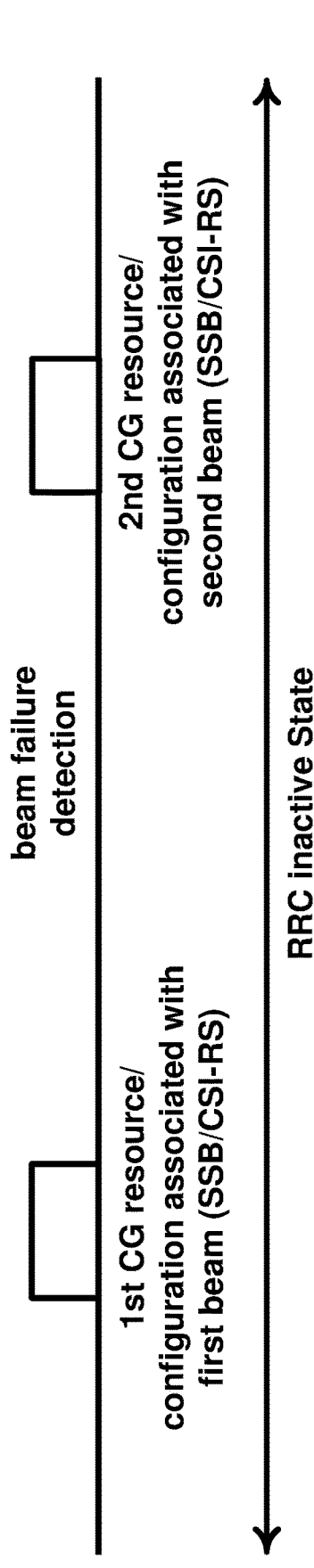
FIG. 30A shows an example process in accordance with several of various embodiments of the present disclosure.
Figure 30B:
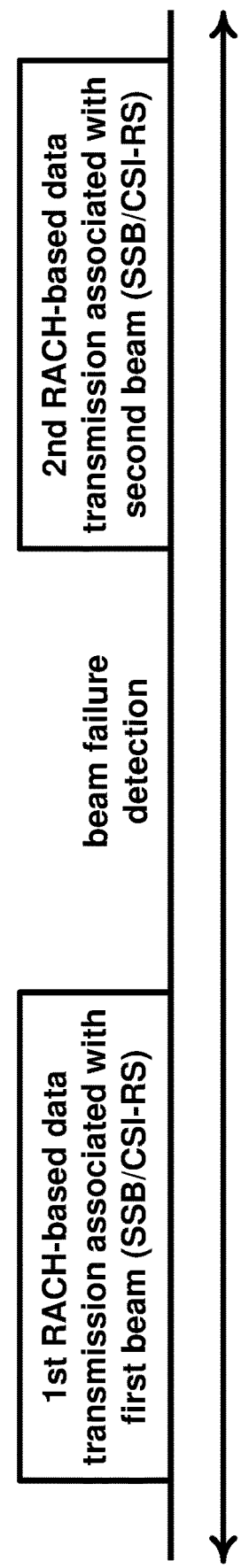
FIG. 30B shows an example process in accordance with several of various embodiments of the present disclosure.

In example embodiments a wireless device may perform a beam failure recovery procedure in the RRC_INACTIVE state. The wireless device may perform the beam failure recovery in response to beam failure detection. Example beam failure recovery procedures in the RRC_INACTIVE state are shown in FIG. 30A and FIG. 30B. The wireless device may receive an RRC release message indicating transitioning of the wireless device from an RRC_CONNECTED state to the RRC_INACTIVE state. A suspend config IE of the RRC release message may comprise configuration parameters for the wireless device operation during the RRC_INACTIVE state. In an example, the suspend config IE may comprise configuration parameters of one or more configured grant configurations. In an example, a configured grant configuration, in the one or more configured grant configurations, may be associated with a downlink beam and/or a reference signal (e.g., SSB, CSI-RS) corresponding to the downlink beam. In an example, a configured grant resource may be associated with a downlink beam and/or a reference signal (e.g., SSB, CSI-RS) corresponding to the downlink beam. In an example beam failure recovery procedure, as shown in FIG. 30A, in response to a beam failure detection for a first downlink beam and its corresponding reference signal (e.g., first SSB or first CSI-RS), the wireless device may determine a second downlink beam and its corresponding reference signal (e.g., second SSB or second CSI-RS). The wireless device may switch from a first configured grant configuration or a first configured grant resource to a second configured grant configuration or a second configured grant resource, wherein the first configured grant configuration/configured grant resource may be associated with the first downlink beam/first SSB/first CSI-RS and the second configured grant configuration/configured grant resource may be associated with the second downlink beam/second SSB/second CSI-RS. The wireless device may indicate the second downlink beam/second SSB/second CSI-RS by switching from the first configured grant configuration/resource to the second configured grant configuration/resource. In an example, a random access preamble/resource/occasion may be associated with a downlink beam and/or reference signal (e.g., SSB, CSI-RS) corresponding to the downlink beam. In an example beam failure recovery procedure, as shown in FIG. 30B, in response to a beam failure detection for a first downlink beam and its corresponding reference signal (e.g., first SSB or first CSI-RS), the wireless device may determine a second downlink beam and its corresponding reference signal (e.g., second SSB or second CSI-RS). Prior to the beam failure detection, the wireless device may use a first random access preamble/resource/occasion in one or more first random access preambles/resources/occasions wherein the one or more first random access preambles/resources/occasions may be associated with a first downlink beam and its corresponding reference signal (e.g., first SSB or first CSI-RS). The wireless device may use the first random access resource/preamble/occasion in a first random access process (e.g., for data transmission, e.g., using a Msg A or a Msg 3). In response to beam failure detection for the first downlink beam and its corresponding reference signal (e.g., first SSB or first CSI-RS), the wireless device may use a second random access resource/preamble/occasion in one or more second random access preambles/resources/occasions, wherein the one or more second random access preambles/resources/occasions may be associated with a second downlink beam and its corresponding reference signal (e.g., second SSB or second CSI-RS). The wireless device may use the second random access resource/preamble/occasion in a second random access process (e.g., for data transmission, e.g., using a Msg A or a Msg 3). The wireless device may indicate the second downlink beam/second SSB/second CSI-RS by using the second random access preamble/resource/occasion in the second random access process.

In an example embodiment, a wireless device may receive one or more radio resource control (RRC) messages comprising first configuration parameters for beam failure detection and/or beam failure recovery. The wireless device may perform a first beam failure detection and/or a first beam failure recovery process based on the first configuration parameters and while in an RRC connected state. The wireless device may receive an RRC release message. The RRC release message may indicate transitioning of the wireless device form the RRC connected state to an RRC inactive state. The RRC release message may comprise second configuration parameters for beam failure detection and/or beam failure recovery. The wireless device may perform a second beam failure detection and/or a second beam failure recovery process based on the second configuration parameters and while in the RRC inactive state.

In an example, the first configuration parameters may comprise a first parameter indicating a first beam failure instance max count. The second configuration parameters may comprise a second parameter indicating a second beam failure instance max count. The first beam failure detection may be based on a beam failure instance indication counter reaching the first beam failure instance max count. The second beam failure detection may be based on a beam failure instance indication counter reaching the second beam failure instance max count.

In an example, the first configuration parameters may comprise a third parameter indicating a first beam failure detection timer value. The second configuration parameters may comprise a fourth parameter indicating a second beam failure detection timer value. The first beam failure detection may comprise starting a beam failure detection timer with the first beam failure detection value in response to a beam failure instance indication. The second beam failure detection may comprise starting a beam failure detection timer with the second beam failure detection value in response to a beam failure instance indication.

In an example, the first configuration parameters may comprise a fifth parameter indicating a first beam failure recovery timer value. The second configuration parameters may comprise a sixth parameter indicating a second beam failure recovery timer value. The first beam failure recovery may comprise initiating a first random access process and starting a beam failure recovery timer with the first beam failure recovery timer value in response to the initiating the first random access process. The second beam failure recovery may comprise initiating a second random access process and starting a beam failure recovery timer with the second beam failure recovery timer value in response to the initiating the second random access process. In an example, the wireless device may stop the first beam failure recovery timer in response to the first random access process being successfully completed. The wireless device may stop the second beam failure recovery timer in response to the first random access process being successfully completed.

In an example, the first beam failure recovery may comprise initiating a first random access process comprising transmitting a first random access preamble associated with a new beam compared to a current serving beam.

In an example, the second beam failure recovery may comprise initiating a second random access process comprising transmitting a second random access preamble associated with a new beam compared to a current serving beam.

In an example, the RRC release message may further comprise third configured grant configuration parameters of one or more configured grant configurations for configured grant transmissions during the RRC inactive state. In an example, the one or more configured grant configurations may be for small data transmission. In an example, the RRC release message may comprise a suspend config information element comprising the third configuration parameters.

In an example, the RRC release message may further comprise random access configuration parameters for random access processes used in small data transmission in the RRC inactive state. In an example, the random access configuration parameters may indicate random access resources and/or random access occasions and/or random access preambles associated with the random access processes used in the small data transmission in the RRC inactive state. In an example, the RRC release message may comprise a suspend config information element comprising the random access configuration parameters.

In an example, the second beam failure recovery process may comprise switching from a first configured grant configuration to a second configured grant configuration. The first configured grant configuration may be associated with a first synchronization signal block (SSB). The second configured grant configuration may be associated with a second SSB. In an example, the first SSB may be received via a first beam. The second SSB may be received via a second beam.

In an example, the second beam failure recovery process may comprise switching from a first configured grant configuration to a second configured grant configuration. The first configured grant configuration may be associated with a first channel state information reference signal (CSI-RS). The second configured grant configuration may be associated with a second CSI-RS. In an example, the first CSI-RS may be received via a first beam. The second CSI-RS may be received via a second beam.

In an example, the second beam failure recovery process may comprise switching from a first configured grant resource to a second configured grant resource. The first configured grant resource may be associated with a first synchronization signal block (SSB). The second configured grant resource may be associated with a second SSB. In an example, the first SSB may be received via a first beam. The second SSB may be received via a second beam.

In an example, the second beam failure recovery process may comprise switching from a first configured grant resource to a second configured grant resource. The first configured grant resource may be associated with a first channel state information reference signal (CSI-RS). The second configured grant resource may be associated with a second CSI-RS. In an example, the first CSI-RS may be received via a first beam. The second CSI-RS may be received via a second beam.

In an example, the second beam failure recovery process may comprise initiating a random access process. In an example, the random access process may comprise transmitting a random access preamble associated with a synchronization signal block (SSB).

In an example, the RRC release message may comprise a suspend config information element indicating transitioning of the wireless device from the RRC connected state to the RRC inactive state. In an example, the suspend config information element may comprise the second configuration parameters for beam failure detection and/or beam failure recovery during the RRC inactive state.

In an example embodiment, a wireless device may receive one or more radio resource control (RRC) messages comprising a first configuration parameter indicating a value for a beam failure detection timer. In response to a beam failure instance indication and while in an RRC connected state, the wireless device may start or restart the beam failure detection timer with the value. The wireless device may receive an RRC release message indicating transitioning of the wireless device form the RRC connected state to an RRC inactive state. In response to a beam failure instance indication and while in the RRC inactive state, the wireless device may not start a beam failure detection timer.

In an example, the RRC release message may comprise a suspend config information element indicating transitioning of the wireless device from the RRC connected state to the RRC inactive state.

In an example, a first beam failure detection, while in the RRC connected state, may be based on the beam failure detection timer. A second beam failure detection, while in the RRC inactive state, may not be based on the beam failure detection timer.

In an example, the wireless device may increment a beam failure instance counter in response to a beam failure instance indication and while in an RRC connected state. The wireless device may increment a beam failure instance counter in response to a beam failure instance indication and while in the RRC inactive state.

In an example, the wireless device may perform a first beam failure recovery process in the RRC connected state. The wireless device may perform a second beam failure recovery in the RRC inactive state. In an example, the performing the first beam failure recovery process may be based on a beam failure instance counter reaching a threshold. The performing the second beam failure recovery process may be based on a beam failure instance counter reaching a threshold. In an example, the first beam failure recovery may comprise initiating a first random access process. In an example, the first random access process may comprise transmitting a random access preamble associated with a synchronization signal block (SSB) and/or beam. In an example, the first random access process may comprise transmitting a random access preamble associated with channel state information reference signal (CSI-RS) and/or beam. In an example, the first beam failure recovery may comprise transmitting a beam failure recovery medium access control (MAC) control element (CE). In an example, the second beam failure recovery may comprise initiating a second random access process. In an example, the second random access process may comprise transmitting a random access preamble associated with a synchronization signal block (SSB) and/or beam. In an example, the second random access process may comprise transmitting a random access preamble associated with channel state information reference signal (CSI-RS) and/or beam. In an example, the second beam failure recovery may comprise switching from a first configured grant configuration to a second configured grant configuration. The first configured grant configuration may be associated with a first synchronization signal block (SSB). The second configured grant configuration may be associated with a second SSB. In an example, the first SSB may be received via a first beam. The second SSB may be received via a second beam. In an example, the second beam failure recovery may comprise switching from a first configured grant configuration to a second configured grant configuration. The first configured grant configuration may be associated with a first channel state information reference signal (CSI-RS). The second configured grant configuration may be associated with a second channel state information reference signal (CSI-RS). In an example, the first CSI-RS may be received via a first beam. The second CSI-RS may be received via a second beam. In an example, the second beam failure recovery may comprise switching from a first configured grant resource to a second configured grant resource. The first configured grant resource may be associated with a first synchronization signal block (SSB). The second configured grant resource may be associated with a second SSB. In an example, the first SSB may be received via a first beam. The second SSB may be received via a second beam. In an example, the second beam failure recovery may comprise switching from a first configured grant resource to a second configured grant resource. The first configured grant resource may be associated with a first channel state information reference signal (CSI-RS). The second configured grant resource may be associated with a second channel state information reference signal (CSI-RS). In an example, the first CSI-RS may be received via a first beam. The second CSI-RS may be received via a second beam.

In an example, the wireless device may set a beam failure instance indication to zero, while in the RRC connected state, based on the beam failure detection timer expiring.

In an example embodiment, a wireless device may receive a radio resource control (RRC) release message indicating transitioning of the wireless device from an RRC connected state to an RRC inactive state. The wireless device may transmit a transport block (TB) while the wireless device is in the RRC inactive state. The wireless device may determine a time window for beam failure detection based on a timing of transmission of the TB. The wireless device may monitor for beam failure detection during the time window.

In an example, the monitoring for the beam failure detection may comprise measuring/monitoring one or more reference signals associated with one or more beams comprising one or more current serving beams. In an example, the one or more reference signals may comprise a synchronization signal block (SSB). In an example, the one or more reference signals may comprise channel state information reference signal (CSI-RS).

In an example, the RRC release message may comprise a suspend config information element indicating transitioning of the wireless device from the RRC connected state to the RRC inactive state.

In an example, the time window may comprise a first period/duration/window for monitoring downlink control channel (e.g., PDCCH) in response to transmission of the TB. In an example, a duration of the time window may be longer than (e.g., may be extended from) the first period/duration/window in response to a first number (e.g., 1, 2, . . . ) of beam failure instance indications during the first period/duration/window. In an example, a duration of the time window may be longer than (e.g., may be extended from) the first period/duration/window in response to at least one beam failure instance indication during the first period/duration/window. In an example, a duration of the time window may be equal to the first period/duration/window in response to no beam failure instance indication during the first period/duration/window.

In an example, the RRC release message may comprise first configuration parameters of one or more configured grant configurations for configured grant/small data transmissions during the RRC inactive state. In an example, the transmitting the TB may be via a configured resource based on the first configuration parameters.

In an example, the transmitting the TB may be based on a dynamic grant. In an example, the wireless device may receive a downlink control information (DCI) indicating the dynamic grant.

In an example, transmitting the TB may be based on a random access message. In an example, the random access message may be a Msg A in a two-step random access process or a Msg 3 in a four-step random access process. In an example, the RRC release message (e.g., a suspend config IE of the RRC release message) may comprise random access configuration parameters. The transmitting the TB/random access message may be based on the random access configuration parameters.

In an example, the determining the time window may comprise determining a starting time of the time window and an ending time of the time window. The determining the starting time of the time window and the ending time of the time window may be based on the timing of the transmission of the TB.

In an example, transmitting the TB may be via one or more symbols. A starting time of the time window may be based on a last symbol of the one or more symbols. A duration of the time window may be a first number of slots/symbols. In an example, the RRC release message (e.g., a suspend config IE of the RRC release message) may comprise a first configuration parameter indicating the duration of the time window. In an example, the starting time of the time window may be an offset from the last symbol of the one or more symbols. In an example, the RRC release message (e.g., a suspend config IE of the RRC release message) may comprise a first configuration parameter indicating the offset. In an example, the starting time of the time window is the last symbol of the one or more symbols.

In an example, the wireless device may monitor for beam failure detection during the RRC connected state. The monitoring for beam failure detection during the RRC connected state may not be based on uplink transmissions (e.g., timings of the uplink transmissions/TBs) during the RRC connected state.

In an example embodiment, a wireless device may receive a radio resource control (RRC) release message indicating transitioning of the wireless device from an RRC connected state to an RRC inactive state. The wireless device may transmit one or more transport blocks (TBs) while the wireless device is in the RRC inactive state. The wireless device may determine one or more time windows based on timings of transmissions of the one or more TBs. The wireless device may set a beam failure instance counter to zero in response to no beam failure instance indications during the one or more time windows.

In an example, a number of the one or more time windows may be a first number. In an example, the RRC release message (e.g., a suspend config IE in the RRC release message) may comprise a first configuration parameter indicating the first number.

In an example, a time window, in the one or more time windows, may comprise a period/duration/window for monitoring downlink control channel (e.g., PDCCH) in response to transmission of a corresponding TB in the one or more TBs.

In an example, the determining the one or more time windows may comprise determining one or more starting times of the one or more time windows and one or more ending times of the one or more time windows. The determining the one or more starting times of the one or more time windows and the one or more ending times of the one or more time windows may be based on the timings of the transmissions of the one or more TBs.

In an example, transmitting a TB, in the one or more TBs, may be via one or more symbols. A starting time of a time window, corresponding to the TB, may be based on a last symbol of the one or more symbols. A duration of the time window may be a first number of slots/symbols. In an example, the RRC release message (e.g., a suspend config IE in the RRC release message) may comprise a first configuration parameter indicating the duration of the time window. In an example, the starting time of the time window may be an offset from the last symbol of the one or more symbols. In an example, the RRC release message (e.g., a suspend config IE of the RRC release message) may comprise a first configuration parameter indicating the offset. In an example, the starting time of the time window may be the last symbol of the one or more symbols.

In an example, the RRC release message may comprise a suspend config information element indicating transitioning of the wireless device from the RRC connected state to the RRC inactive state.

In an example, the RRC release message (e.g., a suspend config IE of the RRC release message) may comprise first configuration parameters of one or more configured grant configurations for configured grant/small data transmissions during the RRC inactive state. In an example, the transmitting the one or more TBs may be based on the first configuration parameters. In an example, transmitting one or more first TBs of the one or more TBs is based on the first configuration parameters.

In an example, transmitting one or more first TBs of the one or more TBs may be based on one or more first dynamic grants. In an example, the wireless device may receive one or more DCIs indicating the one or more dynamic grants.

In an example, the RRC release message may comprise random access configuration parameters for random access processes used for small data transmission during the RRC inactive state. In an example, transmitting one or more first TBs of the one or more TBs may be based on one or more random access messages. In an example, the random access parameters may indicate random access resources/occasions/preambles for the random access processes used for small data transmission during the RRC inactive state.

In an example embodiment, a wireless device may receive a radio resource control (RRC) release message indicating transitioning of the wireless device from an RRC connected state to an RRC inactive state. The wireless device may perform beam-related measurements, while in the RRC inactive state, in a time window that is based on a timing of a scheduled uplink transmission in the RRC inactive state. The wireless device may perform the uplink transmission.

In an example, the RRC release message may comprise a suspend config IE indicating transitioning of the wireless device from the RRC connected state to the RRC inactive state.

In an example, the scheduled uplink transmission may be for transmission of a TB.

In an example, the beam-related measurements may comprise measuring reference signals for determining a beam associated with the scheduled uplink transmission. In an example, the reference signals may be associated with a plurality of beams comprising a current serving downlink beam. In an example, the beam associated with the scheduled uplink transmission may be used for reception of PDCCH (e.g., PDCCH via which DCI indicating scheduling information for subsequent transmission/retransmission of the TB is received) following the scheduled uplink transmission. In an example, the reference signals may comprise synchronization signal block (SSB). In an example, the reference signals may comprise channel state information reference signal (CSI-RS).

In an example, the beam-related measurements may comprise monitoring for detecting beam failure of a current serving downlink beam.

In an example, a starting time of the time window may be an offset before a starting time of the timing of the scheduled uplink transmission. In an example, the RRC release message (e.g., a suspend config IE of the RRC release message) may comprise a configuration parameter indicating the offset.

In an example, an ending time of the time window may be an offset before a starting time of the timing of the scheduled uplink transmission. In an example, the RRC release message (e.g., a suspend config IE of the RRC release message) may comprise a configuration parameter indicating the offset.

In an example, an ending time of the time window may be a starting time/symbol of the timing of the scheduled uplink transmission.

In an example, a starting time of the time window may be an offset after an ending time of the timing of the scheduled uplink transmission. In an example, the RRC release message (e.g., a suspend config IE of the RRC release message) may comprise a configuration parameter indicating the offset.

In an example, the RRC release message (e.g., a suspend config IE of the RRC release message) may comprise a configuration parameter indicating a duration of the time window.

In an example, the RRC release message (e.g., a suspend config IE of the RRC release message) may comprise first configuration parameters of one or more configured grant configurations for configured grant/small data transmissions during the RRC inactive state. In an example, the performing the scheduled uplink transmission may be based on the first configuration parameters.

In an example, the performing the scheduled uplink transmission may be based on a first dynamic grant. In an example, the wireless device may receive a DCI indicating the first dynamic grant.

In an example, the RRC release message (e.g., a suspend config IE of the RRC release message) may comprise random access configuration parameters for random access processes used for small data transmission during the RRC inactive state. In an example, the performing the scheduled uplink transmission may be based on one or more random access messages. In an example, the random access parameters may indicate random access resources/occasions/preambles for the random access processes used in small data transmission during the RRC inactive state.

In an example embodiment, a wireless device may receive a radio resource control (RRC) release message indicating transitioning of the wireless device from an RRC connected state to an RRC inactive state. The wireless device may transmit a TB in the RRC inactive state. The wireless device may determine a time window for beam failure detection based on a timing of transmission of the TB. The wireless device may monitor for beam failure detection during the time window. The wireless device may increment a beam failure instance counter in response to a beam failure instance indication. The wireless device may trigger a beam failure recovery process in response to the beam failure instance counter reaching a first number.

In an example, the RRC release message may comprise a suspend config IE indicating transitioning of the wireless device from the RRC connected state to the RRC inactive state.

In an example, the time window may comprise a period/duration/window for monitoring downlink control channel (e.g., PDCCH) in response to transmission of the TB.

In an example, the RRC release message may comprise first configuration parameters of one or more configured grant configurations for configured grant/small data transmissions during the RRC inactive state.

In an example, the transmitting the TB may be via a configured resource based on the first configuration parameters.

In an example, the transmitting the TB may be based on a dynamic grant. In an example, the wireless device may receive a DCI indicating the dynamic grant.

In an example, the RRC release message may comprise random access configuration parameters for random access processes used for small data transmission during the RRC inactive state. In an example, the transmitting the TB may be based on a random access message. In an example, the random access message may be a Msg A in a two-step random access process or a Msg 3 in a four-step random access process. In an example, the random access parameters may indicate random access resources/occasions/preambles for the random access processes used in small data transmission during the RRC inactive state.

In an example, transmitting the TB may be in one or more symbols. A starting time of the time window may be based on a last symbol of the one or more symbols. A duration of the time window may be a first number of symbols/slots. In an example, the RRC release message (e.g., a suspend config IE of the RRC release message) may comprise a configuration parameter indicating the first number. In an example, a starting time of the time window may be an offset (e.g., in number of symbols) from the last symbol of the one or more symbols. In an example, the RRC release message (e.g., a suspend config IE of the RRC release message) may comprise a configuration parameter indicating the offset.

In an example, monitoring for beam failure detection may comprise measuring reference signals comprising first reference associated with a current serving downlink beam. In an example, the first reference signals may comprise SSB. In an example, the first reference signals may comprise CSI-RS.

In an example embodiment, a wireless device may receive a radio resource control (RRC) release message indicating transitioning of the wireless device from an RRC connected state to an RRC inactive state. The wireless device may transmit a first TB in the RRC inactive state. The wireless device may determine a first time window for beam failure detection based on a first transmission timing of the first TB. The wireless device may monitor for beam failure detection during the first time window. The wireless device may start a beam failure detection timer in response to a beam failure instance indication. The wireless device may pause the beam failure detection timer in response to the first time window elapsing. The wireless device may transmit a second TB in the RRC inactive state. The wireless device may determine a second time window for beam failure detection based on a second transmission timing of the second TB. The wireless device may resume the beam failure detection timer at the beginning of the second time window. The wireless device may set a beam failure instance counter to zero based on the beam failure detection timer expiring.

In an example, the first time window may comprise a first period/duration/window for monitoring downlink control channel (e.g., PDCCH) in response to transmission of the first TB. The second time window may comprise a second period/duration/window for monitoring downlink control channel in response to transmission of the second TB.

In an example, the RRC release message (e.g., a suspend config IE of the RRC release message) may comprise first configuration parameters of one or more configured grant configurations for configured grant/small data transmissions during the RRC inactive state. In an example, the transmitting the first TB may be via a first configured resource based on the first configuration parameters. The transmitting the second TB may be via a second configured resource based on the first configuration parameters.

In an example, the transmitting the first TB may be based on a dynamic grant. In an example, the wireless device may receive a first DCI indicating the dynamic grant.

In an example, the transmitting the second TB may be based on a dynamic grant. In an example, the wireless device may receive a second DCI indicating the dynamic grant.

In an example, transmitting the first TB may be based on a random access message (e.g., a Msg A in a two-step random access process or a Msg 3 in a four-step random access process).

In an example, transmitting the second TB may be based on a random access message (e.g., a Msg A in a two-step random access process or a Msg 3 in a four-step random access process).

In an example, the RRC release message (e.g., a suspend config IE of the RRC release message) may comprise random access configuration parameters for random access processes used for small data transmission during the RRC inactive state.

In an example, the wireless device may transmit the first TB may be in one or more first symbols. A first starting time of the first time window may be based on a last symbol of the one or more first symbols. A duration of the first time window may be a first number of symbols/slots. The wireless device may transmit the second TB is in one or more second symbols. A second starting time of the second time window may be based on a last symbol of the one or more second symbols. A duration of the second time window may be a second number of symbols/slots. In an example, the RRC release message (e.g., a suspend config IE of the RRC release message) may comprise a configuration parameter indicating the first number and the second number. In an example, a starting time of the first time window may be an offset (e.g., in number of symbols) from the last symbol of the one or more first symbols. A starting time of the second time window may be an offset (e.g., in number of symbols) from the last symbol of the one or more second symbols. In an example, the RRC release message (e.g., a suspend config IE of the RRC release message) may comprise a configuration parameter indicating the offset.

Figure 31:
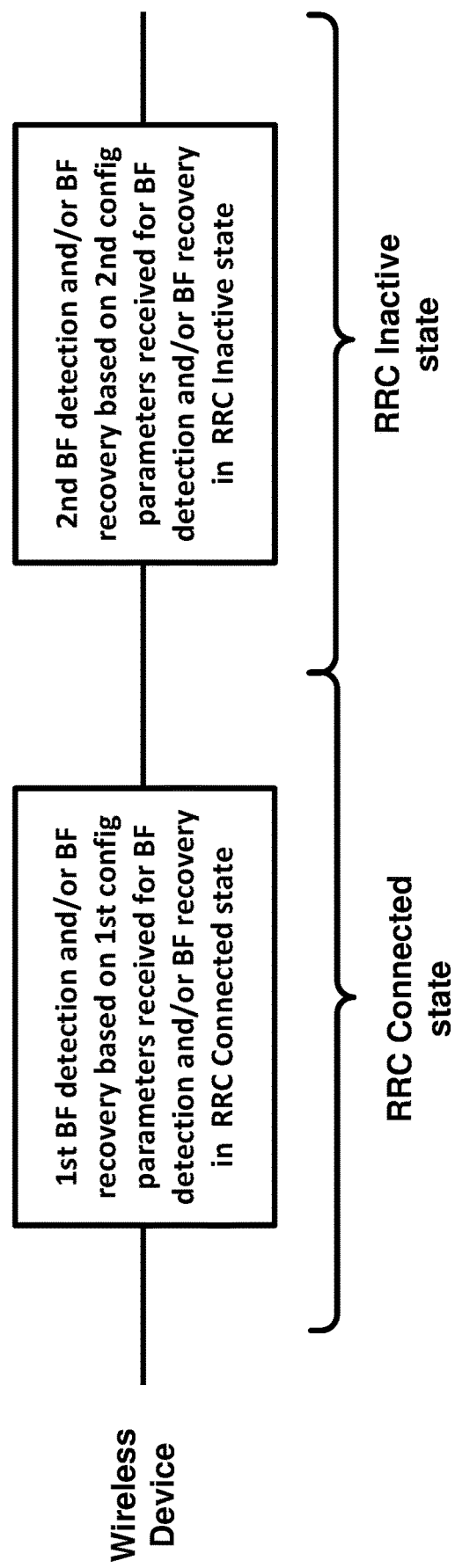
FIG. 31 shows an example process in accordance with several of various embodiments of the present disclosure.

In an example embodiment as shown in FIG. 31, a wireless device may receive one or more messages comprising configuration parameters. The one or more messages may comprise one or more first configuration parameters and one or more second configuration parameters. In an example, the one or more messages may comprise one or more first messages and one or more second messages. In an example, the one or more first messages may comprise the one or more first configuration parameters and the one or more second messages may comprise the one or more second configuration parameters. In an example, the one or more first messages may comprise an RRC configuration message and/or an RRC reconfiguration message. The one or more first messages may comprise parameters for wireless device operation while in the RRC connected state. In an example, the one or more second messages may comprise an RRC release message. The RRC release message may indicate transitioning of the wireless device from the RRC connected state to the RRC inactive state. For example, a suspend config IE of the RRC release message may comprise parameters for wireless device operation during the RRC inactive state and the parameters in the suspend config IE may comprise the one or more second configuration parameters. For example, the one or more second configuration parameters (e.g., included in the suspend config IE of the RRC release message) may comprise configured grant configuration parameters of one or more configured grant configurations for data transmission during the RRC inactive state. For example, the one or more second configuration parameters may comprise random access configuration parameters for random access processes during the RRC inactive state that are used for data transmission during the RRC inactive state.

The one or more first configuration parameters may be associated with at least one of a beam failure detection and a beam failure recovery. The one or more first configuration parameters may be applicable while the wireless device is/operates in the RRC connected state, e.g., may be for at least one of the beam failure detection and the beam failure recovery while the wireless device is/operates in the RRC connected state. For example, the wireless device may initiate a first random access process for beam failure recovery based on the one or more first configuration parameters while in the RRC connected state. For example, the wireless device may transmit a scheduling request based on the one or more first configuration parameters while in the RRC connected state. The one or more second configuration parameters may be associated with at least one of a beam failure detection and a beam failure recovery. The one or more second configuration parameters may be applicable while the wireless device is/operates in the RRC inactive state, e.g., may be for at least one of the beam failure detection and the beam failure recovery while the wireless device is/operates in the RRC inactive state. For example, the wireless device may initiate a second random access process for beam failure recovery based on the one or more second configuration parameters while in the RRC inactive state. For example, the wireless device may transmit a scheduling request based on the one or more second configuration parameters while in the RRC inactive state.

While the wireless device is/operates in the RRC connected state, the wireless device may perform the beam failure detection (e.g., may detect beam failure) and/or may trigger beam failure recovery (e.g., based on a random access process or based on a scheduling request) based on the one or more first configuration parameters. For example, the one or more first configuration parameters may comprise a first parameter indicating a first threshold number of beam failure instance indications (e.g., a first beamFailureInstanceMaxCount value) that is applicable for beam failure detection while the wireless device is/operates in the RRC connected state. The wireless device may increment a beam failure instance indication counter in response to a beam failure instance indication (e.g., received from the lower layer/physical layer) while in the RRC connected state. The wireless device may, while in the RRC connected state, detect/determine beam failure and may trigger/initiate a beam failure recovery procedure in response to the beam failure instance indication counter reaching the first threshold number (e.g., the first beamFailureInstanceMaxCount value) while in the RRC connected state. While the wireless device is in RRC inactive state, the wireless device may perform the beam failure detection (e.g., may detect beam failure) and/or may trigger beam failure recovery based on the one or more second configuration parameters. For example, the one or more second configuration parameters may comprise a second parameter indicating a second threshold number of beam failure instance indications (e.g., a second beamFailureInstanceMaxCount value) that is applicable for beam failure detection while the wireless device is/operates in the RRC inactive state. The wireless device may increment a beam failure instance indication counter in response to a beam failure instance indication (e.g., received from the lower layer/physical layer) while in the RRC inactive state. The wireless device may, while in the RRC inactive state, detect/determine beam failure and may trigger/initiate a beam failure recovery procedure in response to the beam failure instance indication counter reaching the second threshold number (e.g., the second beamFailureInstanceMaxCount value) while in the RRC inactive state.

For example, the one or more first configuration parameters may comprise a third parameter indicating a first beam failure detection timer value (e.g., a first beamFailureDetectionTimer value) that is applicable while the wireless device is in the RRC connected state. The wireless device may start a beam failure detection timer with the first beam failure detection timer value in response to a beam failure instance indication (e.g., received from the lower layer/physical layer) while in the RRC connected state. The wireless device may set a beam failure instance indication counter to zero in response to the beam failure detection timer expiring. For example, the one or more second configuration parameters may comprise a fourth parameter indicating a second beam failure detection timer value (e.g., a second beamFailureDetectionTimer value) that is applicable while the wireless device is/operates in the RRC inactive state. The wireless device may start a beam failure detection timer with the second beam failure detection timer value in response to a beam failure instance indication (e.g., received from the lower layer/physical layer) while in the RRC inactive state. The wireless device may set a beam failure instance indication counter to zero in response to the beam failure detection timer expiring.

For example, the one or more first configuration parameters may comprise a fifth parameter indicating a first beam failure recovery timer value (e.g., a first beamFailureRecoveryTimer value) that is applicable for beam failure recovery while the wireless device is/operates in the RRC connected state. The wireless device may start a first beam failure recovery timer with the first beam failure recovery timer value in response to initiating a beam failure recovery procedure while in the RRC connected state. The beam failure recovery procedure may comprise initiating a random access process. The wireless device may stop the beam failure recovery timer in response to successful completion of the beam failure recovery (e.g., successful completion of the random access initiated for the beam failure recovery). For example, the one or more second configuration parameters may comprise a sixth parameter indicating a second beam failure recovery timer value (e.g., a second beamFailureRecoveryTimer value) that is applicable for beam failure recovery while the wireless device is/operates in the RRC inactive state. The wireless device may start a second beam failure recovery timer with the second beam failure recovery timer value in response to initiating a beam failure recovery procedure while in the RRC inactive state. The beam failure recovery procedure may comprise initiating a random access process. The wireless device may stop the beam failure recovery timer in response to successful completion of the beam failure recovery (e.g., successful completion of the random access initiated for the beam failure recovery).

For example, the one or more first configuration parameters may comprise a seventh parameter indicating a first RSRP threshold that is applicable while the wireless device is/operates in the RRC connected state. The wireless device may select, while in the RRC connected state, a SSB or a reference signal or an uplink carrier (e.g., a normal uplink carrier (NUL) or a supplementary uplink carrier (SUL)) based on the first RSRP threshold. For example, the first RSRP threshold may be an RSRP threshold for the SpCell beam failure recovery while in the RRC connected state. For example, the first RSRP threshold may be an RSRP threshold for the SCell beam failure recovery while in the RRC connected state. For example, the first RSRP threshold may be used for selection of SSB for a first random access process (e.g., a first random access process for beam failure recovery) while the wireless device is in the RRC connected state. For example, the first RSRP threshold may be used for selection of CSI-RS for a first random access process (e.g., a first random access process for beam failure recovery) while the wireless device is in the RRC connected state. For example, the first RSRP threshold may be for selection between a two-step random access process or a four-step random access process (e.g., for beam failure recovery) while in the RRC connected state. For example, the first RSRP threshold may be for selection between a normal uplink carrier or a supplementary uplink carrier for a random access process (e.g., for beam failure recovery) while in the RRC connected state. For example, the one or more second configuration parameters may comprise an eighth parameter indicating a second RSRP threshold that is applicable while the wireless device is/operates in the RRC inactive state. The wireless device may select, while in the RRC inactive state, a SSB or a reference signal or an uplink carrier (e.g., a normal uplink carrier (NUL) or a supplementary uplink carrier (SUL)) based on the second RSRP threshold. For example, the second RSRP threshold may be an RSRP threshold for the SpCell beam failure recovery while in the RRC inactive state. For example, the second RSRP threshold may be an RSRP threshold for the SCell beam failure recovery while in the RRC inactive state. For example, the second RSRP threshold may be used for selection of SSB for a second random access process (e.g., a second random access process for beam failure recovery) while the wireless device is in the RRC inactive state. For example, the second RSRP threshold may be used for selection of CSI-RS for a second random access process (e.g., a second random access process for beam failure recovery) while the wireless device is in the RRC inactive state. For example, the second RSRP threshold may be for selection between a two-step random access process or a four-step random access process (e.g., for beam failure recovery) while in the RRC inactive state. For example, the second RSRP threshold may be for selection between a normal uplink carrier or a supplementary uplink carrier for a random access process (e.g., for beam failure recovery) while in the RRC inactive state.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 32:
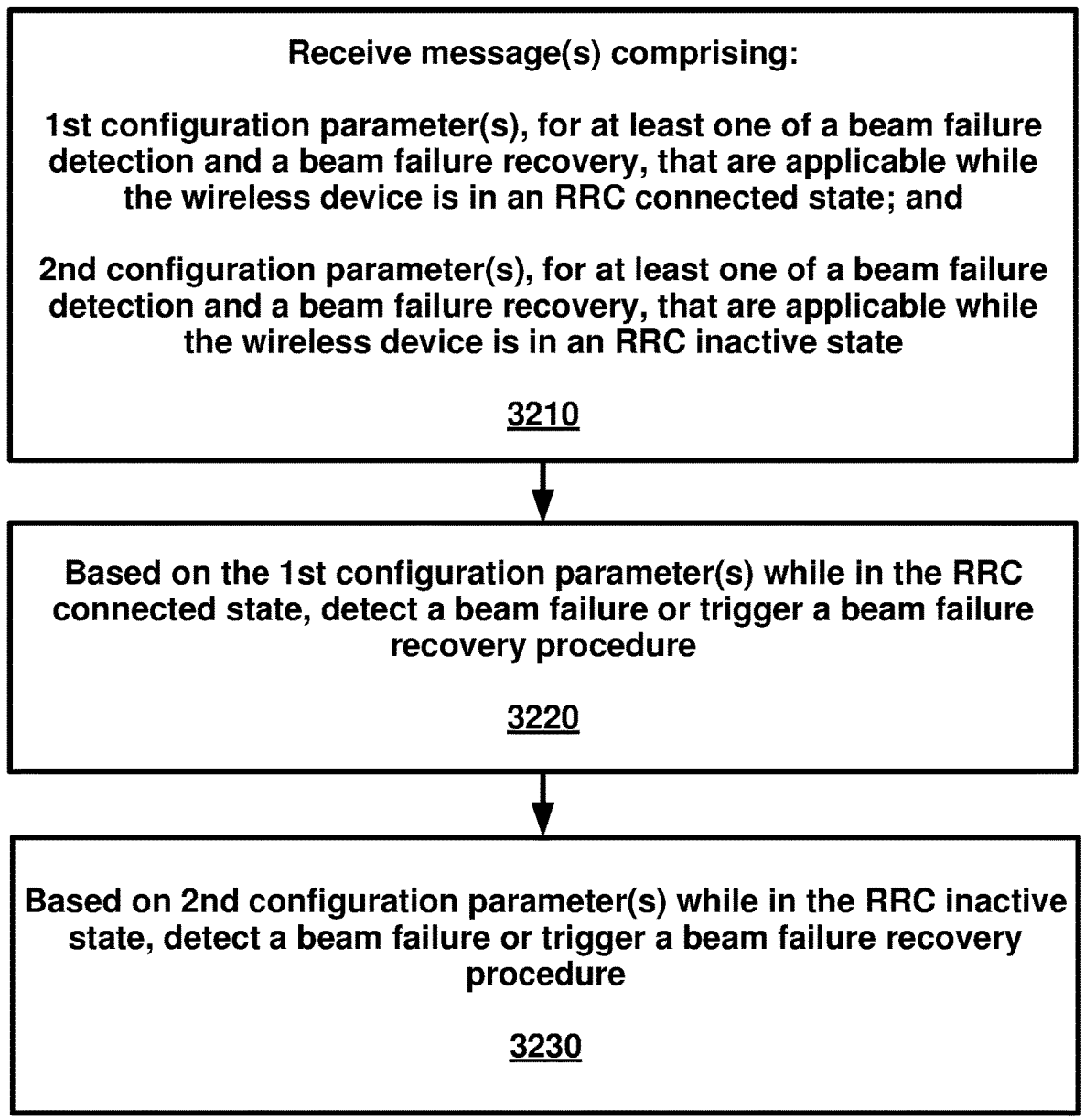
FIG. 32 shows an example flow diagram in accordance with several of various embodiments of the present disclosure.

FIG. 32 shows an example flow diagram in accordance with several of various embodiments of the present disclosure. At 3210, a wireless device may receive one or more messages comprising one or more first configuration parameters and one or more second configuration parameters. The one or more first configuration parameters may be for at least one of a beam failure detection and a beam failure recovery and may be applicable while the wireless device is in a radio resource control (RRC) connected state. The one or more second configuration parameters may be for at least one of a beam failure detection and a beam failure recovery and may be applicable while the wireless device is in an RRC inactive state. At 3220, based on the one or more first configuration parameters while in the RRC connected state, the wireless device may detect a beam failure or may trigger a beam failure recovery procedure. At 3230, based on the one or more second configuration parameters while in the RRC inactive state, the wireless device may detect a beam failure or may trigger a beam failure recovery procedure.

In an example embodiment, the one or more messages, received at 3210, may comprise an RRC release message comprising the one or more second configuration parameters. The RRC release message may indicate transitioning from the RRC connected state to the RRC inactive state.

In an example embodiment, the one or more first configuration parameters, that are included in the one or more messages received at 3210, may comprise a first parameter indicating a first threshold number of beam failure instance indications. The one or more second configuration parameters, that are included in the one or more messages received at 3210, may comprise a second parameter indicating a second threshold number of beam failure instance indications. In an example embodiment, while in the RRC connected state, triggering a beam failure recovery may be based on a beam failure instance indication counter reaching the first threshold number. While in the RRC inactive state, triggering a beam failure recovery may be based on a beam failure instance indication counter reaching the second threshold number.

In an example embodiment, the one or more first configuration parameters, that are included in the one or more messages received at 3210, may comprise a third parameter indicating a first beam failure detection timer value. The one or more second configuration parameters, that are included in the one or more messages received 3210, may comprise a fourth parameter indicating a second beam failure detection timer value. In an example embodiment, the wireless device may start, while in the RRC connected state, a beam failure detection timer with the first beam failure detection timer value in response to a beam failure instance indication. The wireless device may start, while in the RRC inactive state, a beam failure detection timer with the second beam failure detection timer value in response to a beam failure instance indication.

In an example embodiment, the one or more first configuration parameters, that are included in the one or more messages received at 3210, may comprise a fifth parameter indicating a first beam failure recovery timer value. The one or more second configuration parameters, that are included in the one or more messages received 3210, may comprise a sixth parameter indicating a second beam failure recovery timer value. In an example embodiment, the wireless device may start, while in the RRC connected state, a beam failure recovery timer with the first beam failure recovery timer value in response to initiating a first random access process for beam failure recovery. The wireless device may start, while in the RRC inactive state, a beam failure recovery timer with the second beam failure recovery timer value in response to initiating a second random access process for beam failure recovery.

In an example embodiment, the one or more first configuration parameters, that are included in the one or more messages received at 3210, may comprise a seventh parameter indicating a first received signal received power (RSRP) threshold. The one or more second configuration parameters, that are included in the one or more messages received 3210, may comprise an eighth parameter indicating a second RSRP threshold. In an example embodiment, the wireless device may select, while in the RRC connected state and based on the first RSRP threshold, a synchronization signal block (SSB) or a reference signal or an uplink carrier. The wireless device may select, while in the RRC inactive state and based on the second RSRP threshold, a SSB or a reference signal or an uplink carrier.

In an example embodiment, a beam failure recovery procedure, while in the RRC connected state, may comprise a first random access process based on one or more first configuration parameters. A beam failure recovery procedure, while in the RRC inactive state, may comprise a second random access process based on one or more second configuration parameters. In an example embodiment, the one or more messages, received at 3210, may comprise an RRC release message comprising the one or more second configuration parameters.

In an example embodiment, the one or more messages, received at 3210, may comprise an RRC release message comprising configured grant configuration parameters of one or more configured grant configurations for data transmission during an RRC inactive state. In an example embodiment, the beam failure recovery procedure may comprise switching from a first configured grant configuration of the one or more configured grant configurations to a second configured grant configuration of the one or more configured grant configurations.

In an example embodiment, the one or more messages, received at 3210, may comprise an RRC release message comprising random access configuration parameters associated with random access processes used for data transmission during an RRC inactive state.

Figure 33:
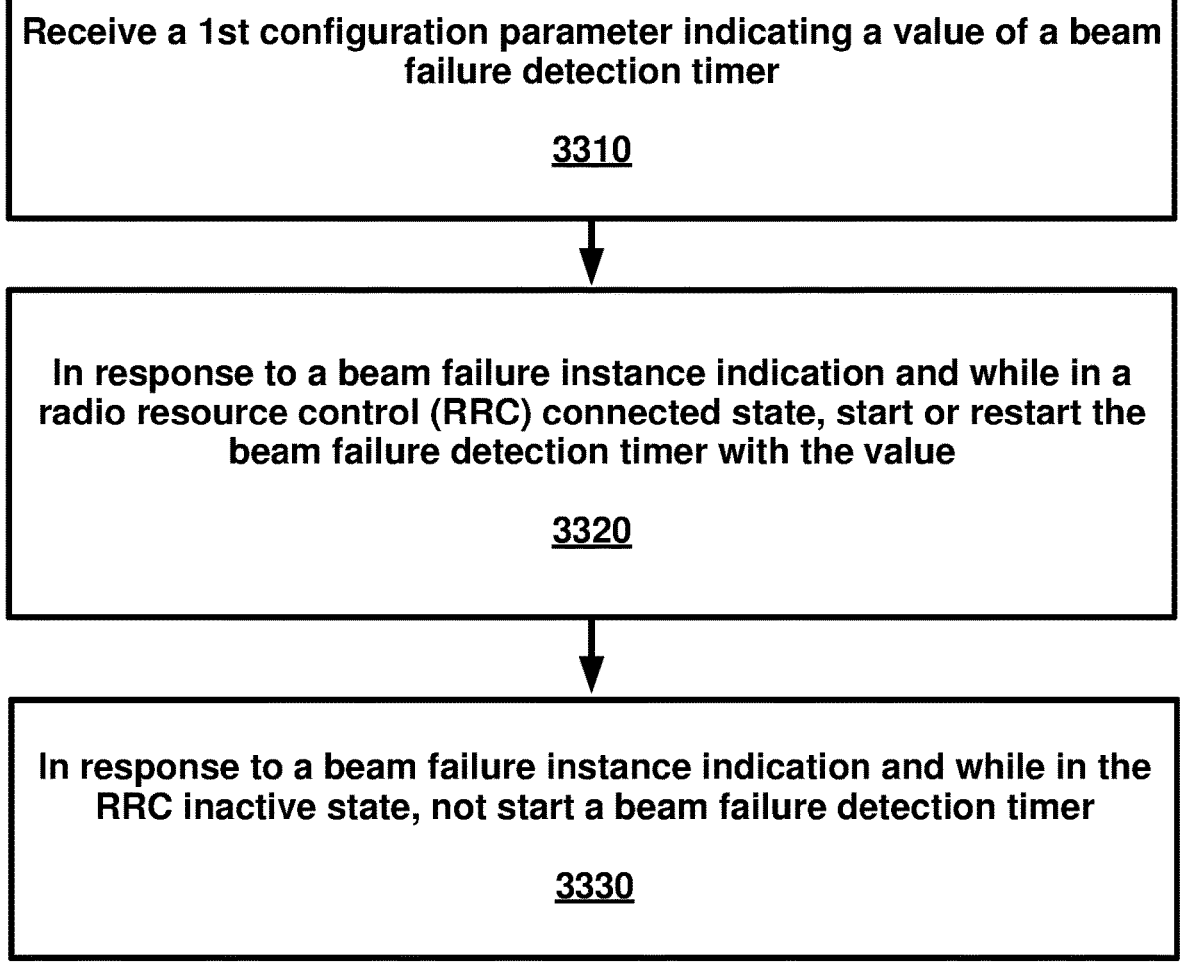
FIG. 33 shows an example flow diagram in accordance with several of various embodiments of the present disclosure.

FIG. 33 shows an example flow diagram in accordance with several of various embodiments of the present disclosure. At 3310, a wireless device may receive a first configuration parameter indicating a value of a beam failure detection timer. At 3320, in response to a beam failure instance indication and while in a radio resource control (RRC) connected state, the wireless device may start or may restart the beam failure detection timer with the value. At 3330, in response to a beam failure instance indication and while in the RRC inactive state, the wireless device may not start a beam failure detection timer.

In an example embodiment, the wireless device may receive an RRC release message indicating transitioning of the wireless device from the RRC connected state to an RRC inactive state.

Figure 34:
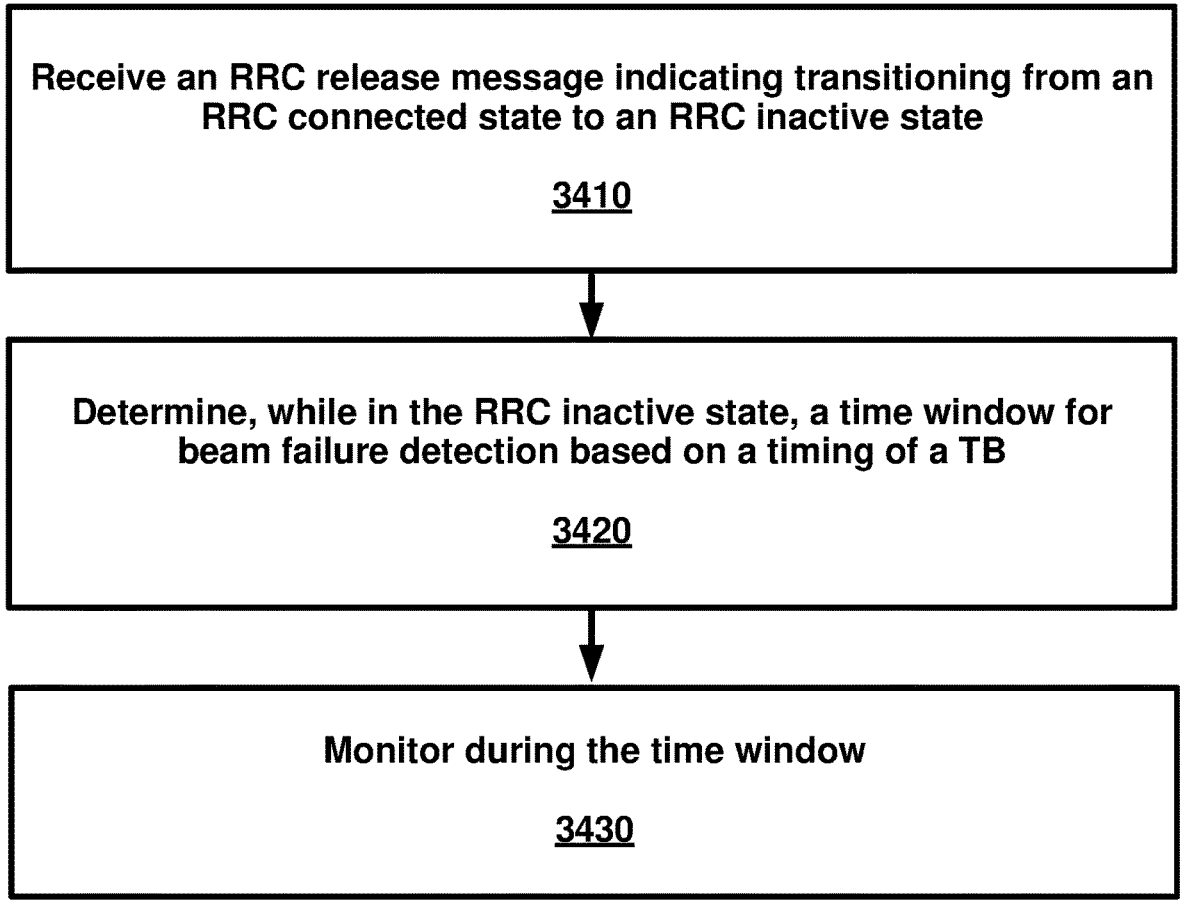
FIG. 34 shows an example flow diagram in accordance with several of various embodiments of the present disclosure.

FIG. 34 shows an example flow diagram in accordance with several of various embodiments of the present disclosure. At 3410, a wireless device may receive a radio resource control (RRC) release message indicating transitioning of the wireless device from an RRC connected state to an RRC inactive state. At 3420, the wireless device may determine, while in the RRC inactive state, a time window for beam failure detection based on a timing of a transport block (TB). At 3430, the wireless device may monitor during the time window.

In an example embodiment, the monitoring, at 3430, may be for beam failure detection.

In an example embodiment, the wireless device may transmit the TB in the RRC inactive state.

In an example embodiment, the monitoring, at 3430, may be for a downlink control channel.

In an example embodiment, the monitoring, at 3430, may be for one or more reference signals. In an example embodiment, the one or more reference signals may comprise a channel state information reference signal (CSI-RS).

In an example embodiment, the monitoring, at 3430, may be for a synchronization signal block (SSB).

In an example embodiment, the monitoring, at 3430, may be for beam failure detection.

Figure 35:
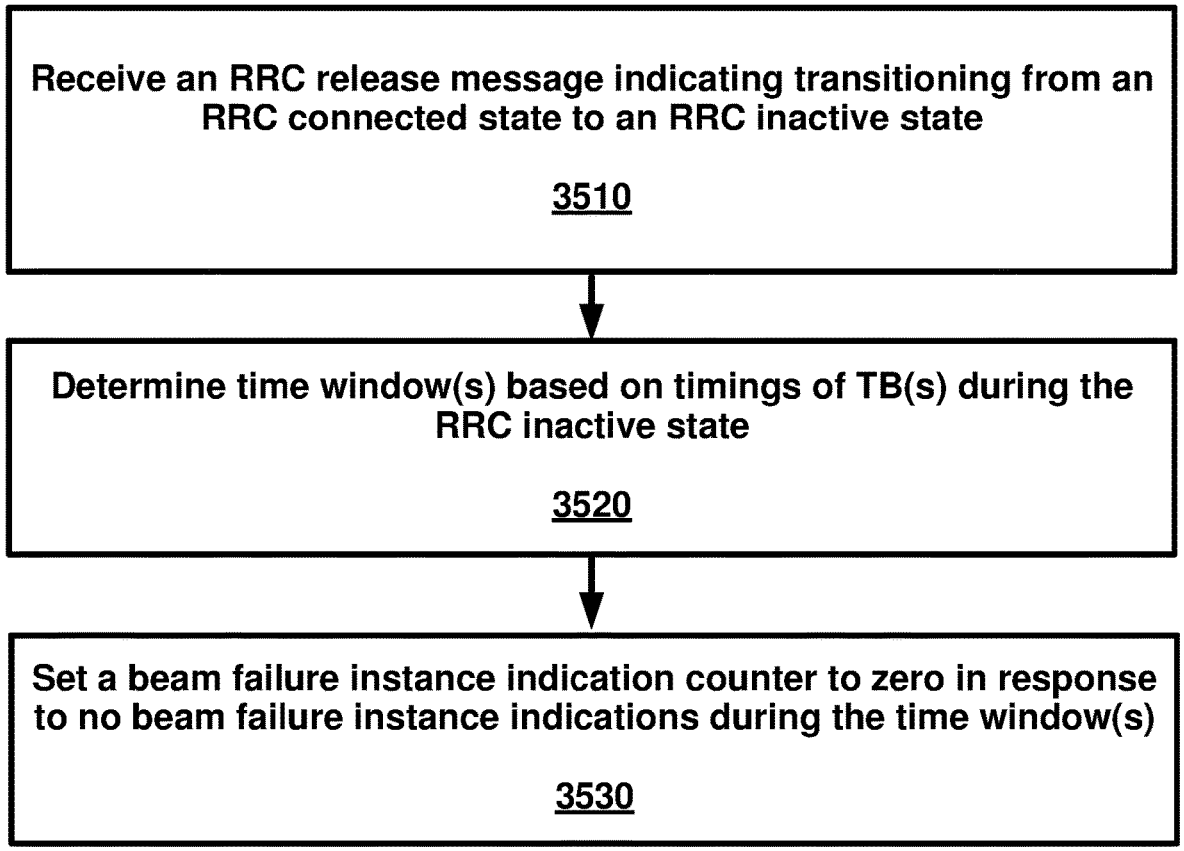
FIG. 35 shows an example flow diagram in accordance with several of various embodiments of the present disclosure.

FIG. 35 shows an example flow diagram in accordance with several of various embodiments of the present disclosure. At 3510, a wireless device may receive a radio resource control (RRC) release message indicating transitioning of the wireless device from an RRC connected state to an RRC inactive state. At 3520, the wireless device may determine one or more time windows based on timings of one or more transport blocks (TBs) during the RRC inactive state. At 3530, the wireless device may set a beam failure instance indication counter to zero in response to no beam failure instance indications during the one or more time windows.

In an example embodiment, a number of the one or more time windows may be a first number.

In an example, the wireless device may transmit the one or more TBs.

Figure 36:
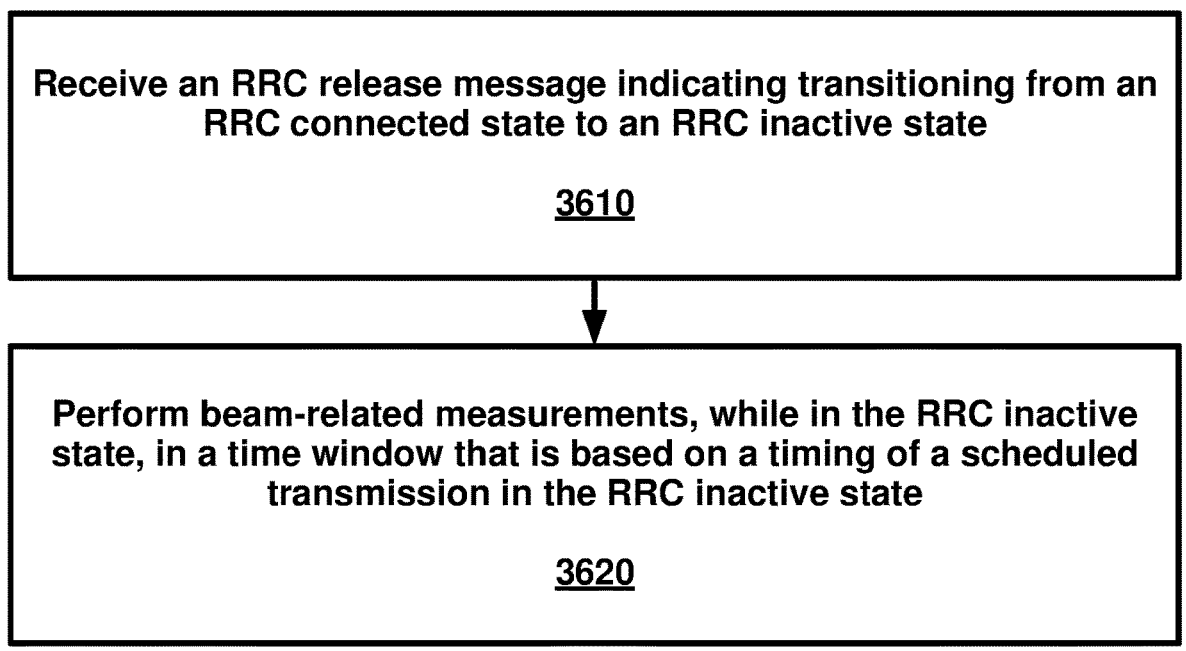
FIG. 36 shows an example flow diagram in accordance with several of various embodiments of the present disclosure.

FIG. 36 shows an example flow diagram in accordance with several of various embodiments of the present disclosure. At 3610, a wireless device may receive a radio resource control (RRC) release message indicating transitioning of the wireless device from an RRC connected state to an RRC inactive state. At 3620, the wireless device may perform beam-related measurements, while in the RRC inactive state, in a time window that is based on a timing of a scheduled transmission in the RRC inactive state.

In an example embodiment, the scheduled transmission may be for a transport block (TB).

In an example embodiment, the beam-related measurements may comprise measuring one or more reference signals for determining a beam associated with the scheduled transmission.

In an example embodiment, the wireless device may perform the scheduled transmission.

Figure 37:
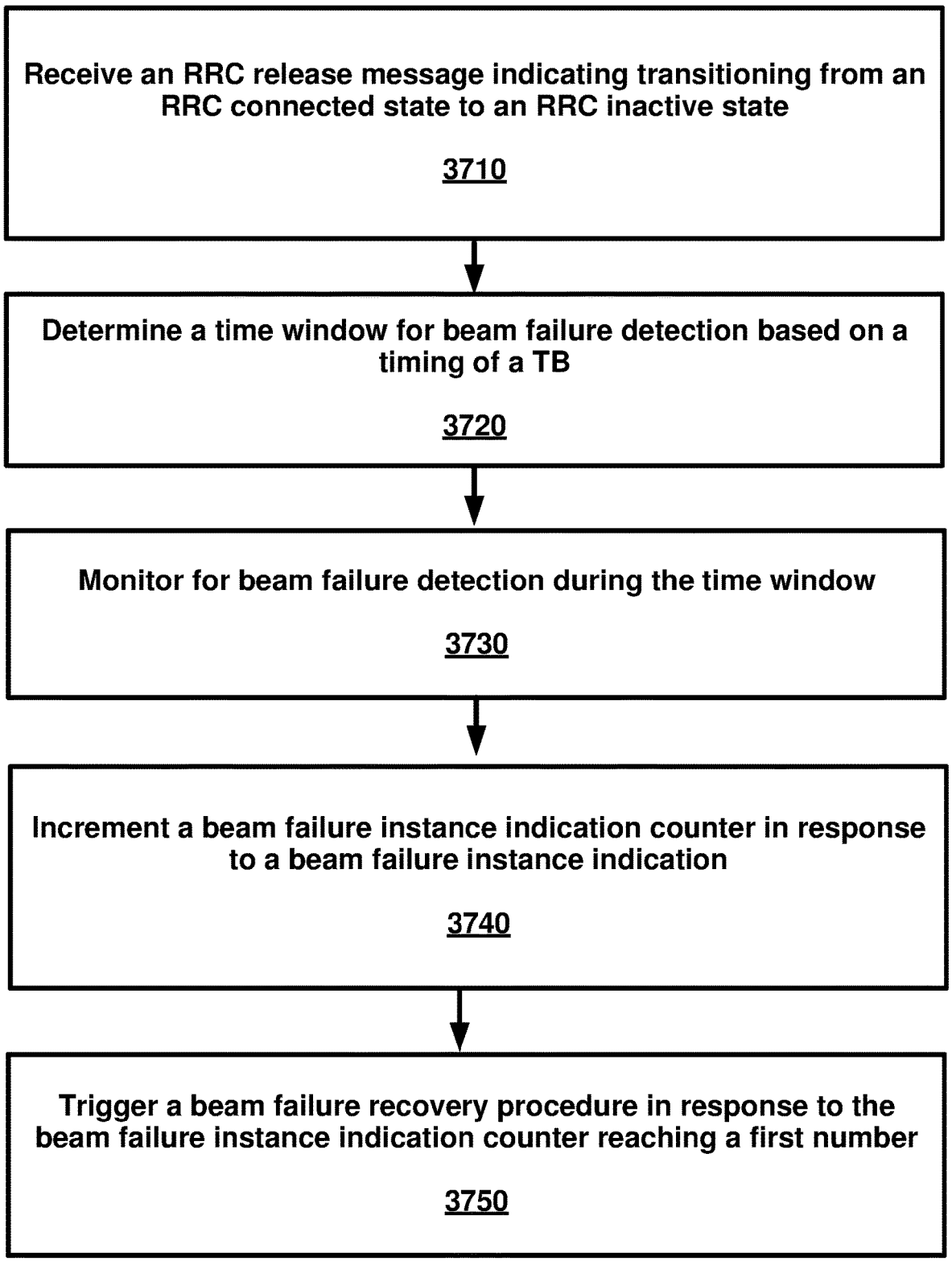
FIG. 37 shows an example flow diagram in accordance with several of various embodiments of the present disclosure.

FIG. 37 shows an example flow diagram in accordance with several of various embodiments of the present disclosure. At 3710, a wireless device may receive a radio resource control (RRC) release message indicating transitioning of the wireless device from an RRC connected state to an RRC inactive state. At 3720, the wireless device may determine a time window for beam failure detection based on a timing of a transport block (TB). At 3730, the wireless device may monitor for beam failure detection during the time window. At 3740, the wireless device may increment a beam failure instance indication counter in response to a beam failure instance indication. At 3750, the wireless device may trigger a beam failure recovery procedure in response to the beam failure instance indication counter reaching a first number.

Figure 38:
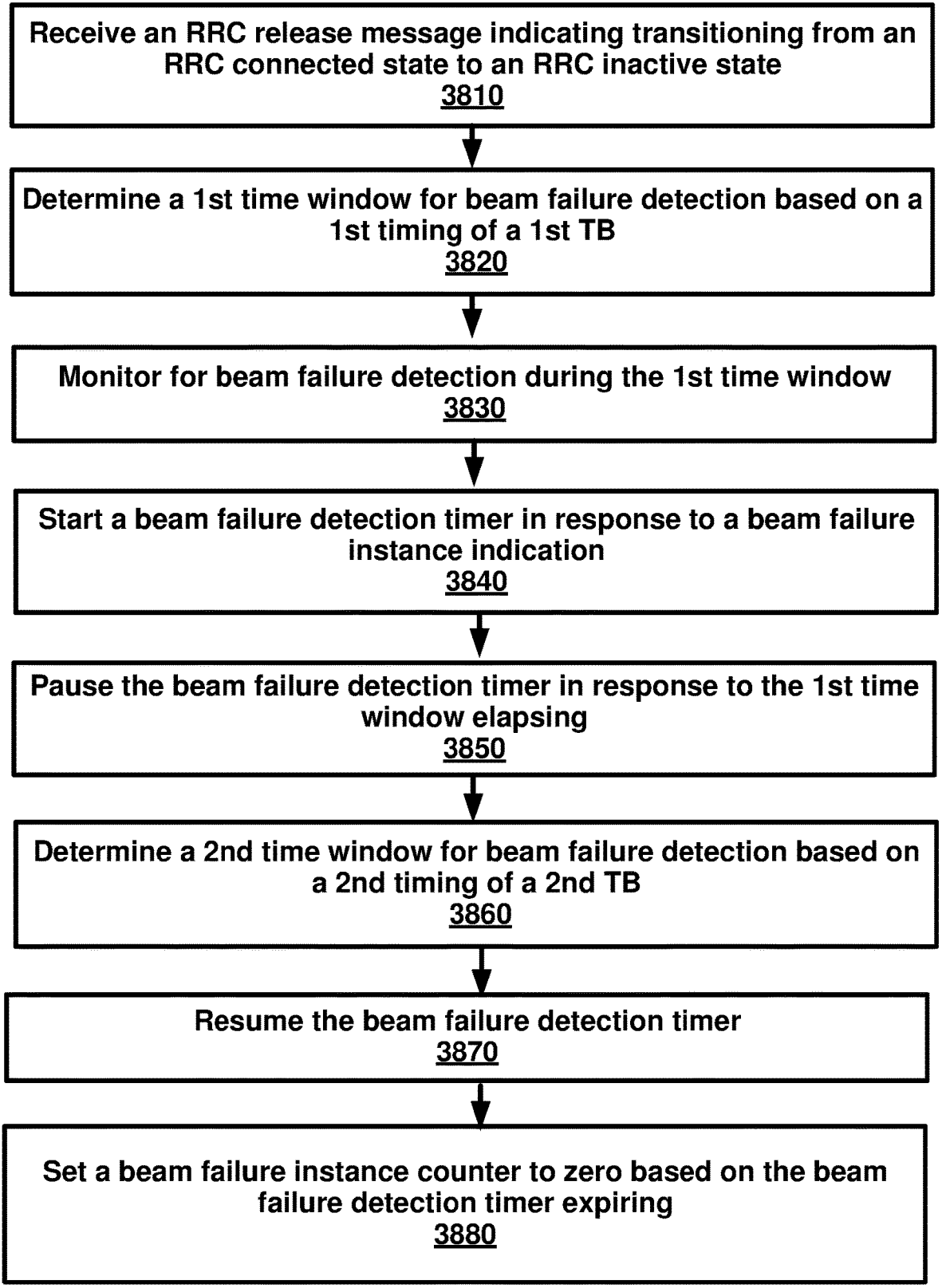
FIG. 38 shows an example flow diagram in accordance with several of various embodiments of the present disclosure.

FIG. 38 shows an example flow diagram in accordance with several of various embodiments of the present disclosure. At 3810, a wireless device may receive a radio resource control (RRC) release message indicating transitioning of the wireless device from an RRC connected state to an RRC inactive state. At 3820, the wireless device may determine a first time window for beam failure detection based on a first timing of a first transport block (TB). At 3830, the wireless device may monitor for beam failure detection during the first time window. At 3840, the wireless device may start a beam failure detection timer in response to a beam failure instance indication. At 3850, the wireless device may pause the beam failure detection timer in response to the first time window elapsing. At 3860, the wireless device may determine a second time window for beam failure detection based on a second timing of a second TB. At 3870, the wireless device may resume the beam failure detection timer. At 3880, the wireless device may set a beam failure instance counter to zero based on the beam failure detection timer expiring.

Figure 39:
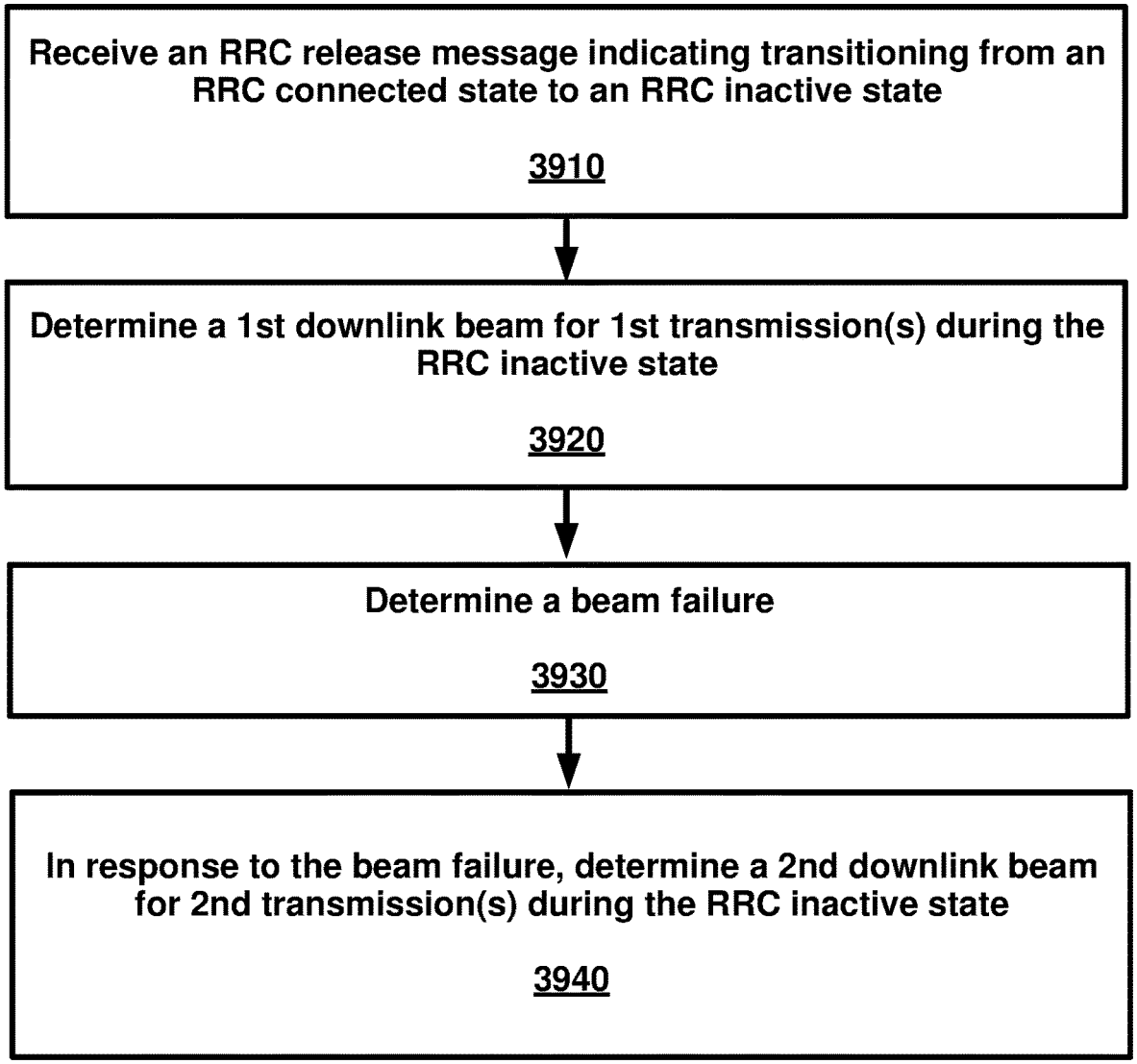
FIG. 39 shows an example flow diagram in accordance with several of various embodiments of the present disclosure.

FIG. 39 shows an example flow diagram in accordance with several of various embodiments of the present disclosure. At 3910, a wireless device may receive a radio resource control (RRC) release message indicating transitioning of the wireless device from an RRC connected state to an RRC inactive state. At 3920, the wireless device may determine a first downlink beam for first transmission(s) during the RRC inactive state. At 3930, the wireless device may determine a beam failure. At 3940, in response to the beam failure, the wireless device may determine a second downlink beam for second transmission(s) during the RRC inactive state.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
   receiving, by a wireless device, one or more messages comprising:
      one or more first configuration parameters, for at least one of a beam failure detection and a beam failure recovery, that are applicable while the wireless device is in a radio resource control (RRC) connected state; and
      one or more second configuration parameters, for at least one of a beam failure detection and a beam failure recovery, that are applicable while the wireless device is in an RRC inactive state;
   based on the one or more first configuration parameters while in the RRC connected state, detecting a beam failure or triggering a beam failure recovery procedure; and
   based on the one or more second configuration parameters while in the RRC inactive state, detecting a beam failure or triggering a beam failure recovery procedure.

2. The method of claim 1, wherein:
   the one or more messages comprise an RRC release message comprising the one or more second configuration parameters; and
   the RRC release message indicates transitioning from the RRC connected state to the RRC inactive state.

3. The method of claim 1, wherein:
   the one or more first configuration parameters comprise a first parameter indicating a first threshold number of beam failure instance indications; and
   the one or more second configuration parameters comprise a second parameter indicating a second threshold number of beam failure instance indications.

4. The method of claim 3, wherein:
   while in the RRC connected state, triggering a beam failure recovery is based on a beam failure instance indication counter reaching the first threshold number; and
   while in the RRC inactive state, triggering a beam failure recovery is based on a beam failure instance indication counter reaching the second threshold number.

5. The method of claim 1, wherein:
   the one or more first configuration parameters comprise a third parameter indicating a first beam failure detection timer value; and
   the one or more second configuration parameters comprise a fourth parameter indicating a second beam failure detection timer value.

6. The method of claim 5, further comprising:
   starting, while in the RRC connected state, a beam failure detection timer with the first beam failure detection timer value in response to a beam failure instance indication; and
   starting, while in the RRC inactive state, a beam failure detection timer with the second beam failure detection timer value in response to a beam failure instance indication.

7. The method of claim 1, wherein:
   the one or more first configuration parameters comprise a fifth parameter indicating a first beam failure recovery timer value; and
   the one or more second configuration parameters comprise a sixth parameter indicating a second beam failure recovery timer value.

8. The method of claim 7, further comprising:
   starting, while in the RRC connected state, a beam failure recovery timer with the first beam failure recovery timer value in response to initiating a first random access process for beam failure recovery; and
   starting, while in the RRC inactive state, a beam failure recovery timer with the second beam failure recovery timer value in response to initiating a second random access process for beam failure recovery.

9. The method of claim 1, wherein:
   the one or more first configuration parameters comprise a seventh parameter indicating a first received signal received power (RSRP) threshold; and
   the one or more second configuration parameters comprise an eighth parameter indicating a second RSRP threshold.

10. The method of claim 9, further comprising:
    selecting, while in the RRC connected state and based on the first RSRP threshold, a synchronization signal block (SSB) or a reference signal or an uplink carrier; and
    selecting, while in the RRC inactive state and based on the second RSRP threshold, a SSB or a reference signal or an uplink carrier.

11. A wireless device comprising:
    one or more processors; and
    memory storing instructions that, when executed by the one or more processors, cause the wireless device to:
       receive one or more messages comprising:
          one or more first configuration parameters, for at least one of a beam failure detection and a beam failure recovery, that are applicable while the wireless device is in a radio resource control (RRC) connected state; and one or more second configuration parameters, for at least one of a beam failure detection and a beam failure recovery, that are applicable while the wireless device is in an RRC inactive state;

based on the one or more first configuration parameters while in the RRC connected state, detect a beam failure or trigger a beam failure recovery procedure; and based on the one or more second configuration parameters while in the RRC inactive state, detect a beam failure or trigger a beam failure recovery procedure.

12. The wireless device of claim 11, wherein:

the one or more messages comprise an RRC release message comprising the one or more second configuration parameters; and the RRC release message indicates transitioning from the RRC connected state to the RRC inactive state.

13. The wireless device of claim 11, wherein:

the one or more first configuration parameters comprise a first parameter indicating a first threshold number of beam failure instance indications; and the one or more second configuration parameters comprise a second parameter indicating a second threshold number of beam failure instance indications.

14. The wireless device of claim 13, wherein:

while in the RRC connected state, triggering a beam failure recovery is based on a beam failure instance indication counter reaching the first threshold number; and while in the RRC inactive state, triggering a beam failure recovery is based on a beam failure instance indication counter reaching the second threshold number.

15. The wireless device of claim 11, wherein:

the one or more first configuration parameters comprise a third parameter indicating a first beam failure detection timer value; and the one or more second configuration parameters comprise a fourth parameter indicating a second beam failure detection timer value.

16. The wireless device of claim 15, wherein the instructions, when executed by the one or more processes, further cause the wireless device to:

start, while in the RRC connected state, a beam failure detection timer with the first beam failure detection timer value in response to a beam failure instance indication; and start, while in the RRC inactive state, a beam failure detection timer with the second beam failure detection timer value in response to a beam failure instance indication.

17. The wireless device of claim 11, wherein:

the one or more first configuration parameters comprise a fifth parameter indicating a first beam failure recovery timer value; and the one or more second configuration parameters comprise a sixth parameter indicating a second beam failure recovery timer value.

18. The wireless device of claim 17, wherein the instructions, when executed by the one or more processes, further cause the wireless device to:

start, while in the RRC connected state, a beam failure recovery timer with the first beam failure recovery timer value in response to initiating a first random access process for beam failure recovery; and start, while in the RRC inactive state, a beam failure recovery timer with the second beam failure recovery timer value in response to initiating a second random access process for beam failure recovery.

19. The wireless device of claim 11, wherein:

the one or more first configuration parameters comprise a seventh parameter indicating a first received signal received power (RSRP) threshold; and the one or more second configuration parameters comprise an eighth parameter indicating a second RSRP threshold.

20. The wireless device of claim 19, wherein the instructions, when executed by the one or more processes, further cause the wireless device to:

select, while in the RRC connected state and based on the first RSRP threshold, a synchronization signal block (SSB) or a reference signal or an uplink carrier; and select, while in the RRC inactive state and based on the second RSRP threshold, a SSB or a reference signal or an uplink carrier.

* * * * *